(12) United States Patent
Garthwaite

(10) Patent No.: US 7,519,640 B1
(45) Date of Patent: Apr. 14, 2009

(54) BETTER PLACEMENT OF DYING OBJECTS IN A GENERATION MANAGED BY THE TRAIN ALGORITHM

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 354 days.

(21) Appl. No.: 10/881,100

(22) Filed: Jun. 30, 2004

(51) Int. Cl.
*G06F 7/00* (2006.01)

(52) U.S. Cl. .................................... 707/206
(58) Field of Classification Search ............. 707/206
See application file for complete search history.

(56) References Cited

U.S. PATENT DOCUMENTS

| | | | | |
|---|---|---|---|---|
| 5,845,298 | A * | 12/1998 | O'Connor et al. | 707/206 |
| 6,148,310 | A * | 11/2000 | Azagury et al. | 707/206 |
| 6,567,905 | B2 * | 5/2003 | Otis | 711/170 |
| 2001/0044856 | A1 * | 11/2001 | Agesen et al. | 709/315 |
| 2002/0019716 | A1 * | 2/2002 | Agesen et al. | 702/83 |
| 2004/0073764 | A1 * | 4/2004 | Andreasson | 711/170 |

OTHER PUBLICATIONS

Jacob Seligmann & Steffen Grarup, "Incremental Mature Garbage Collection Using the Train Algorithm", Proceedings of ECOOP'95, Ninth European Conference on Object-Oriented Programming, Lecture Notes in Computer Science, vol. 952, pp. 235-252, Springer Verlag, 1995.*
Jacob Seligmann and Steffen Grarup, "Incremental Mature Garbage Collection Using the Train Algorithm," 1995.*
Venners, "Garbage Collection," Inside the Java 2 Virtual Machine, May 23, 2000 <http://www.cs.wright.edu/~tkprasad/courses/cs884/GCinJava.html>.*
Venners, "Garbage Collection," Inside the Java 2 Virtual Machine, May 23, 2000.*

* cited by examiner

*Primary Examiner*—Tim T Vo
*Assistant Examiner*—Aaron Sanders
(74) *Attorney, Agent, or Firm*—Osha • Liang LLP

(57) ABSTRACT

In a garbage collector that employs the train algorithm, some objects in the collection set are evacuated from the collection set, even though they are referred to only by weak references, in order to keep the data that they contain available for postmortem processing. The destinations to which at least some such objects are evacuated are chosen independently of where the weak references to them are located.

11 Claims, 48 Drawing Sheets

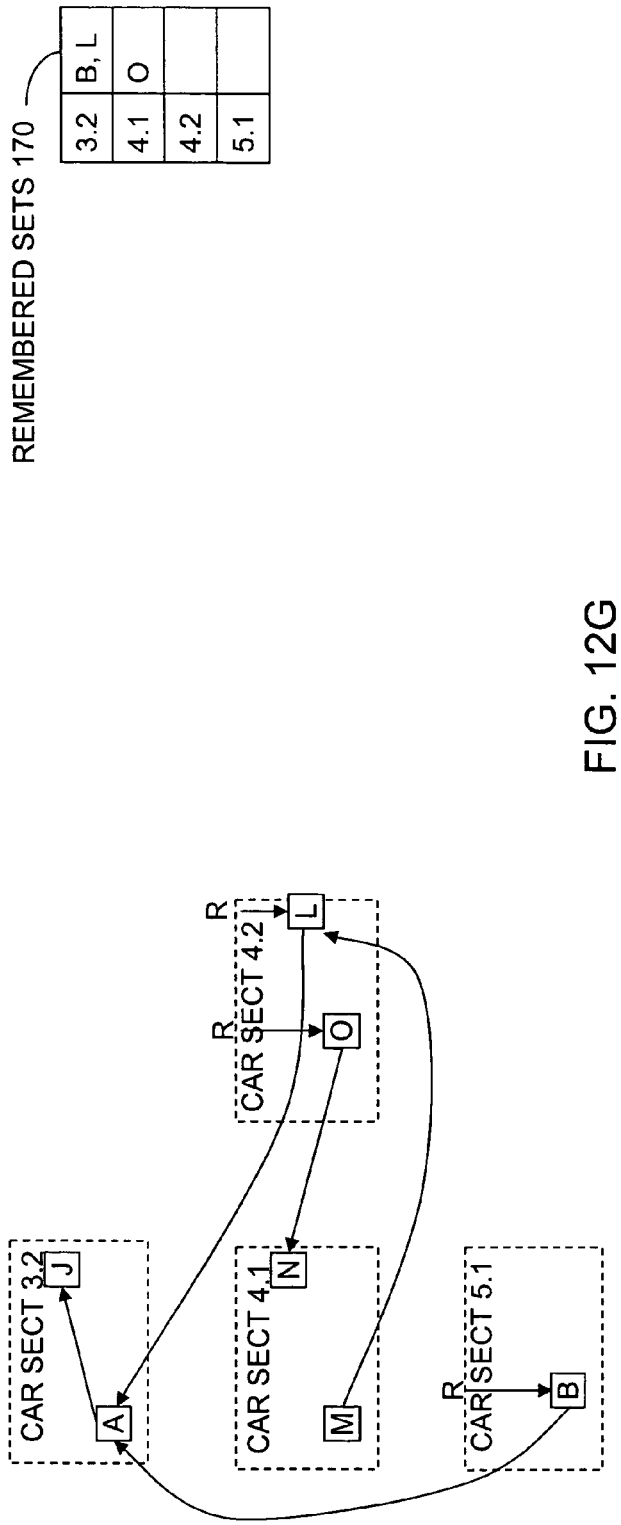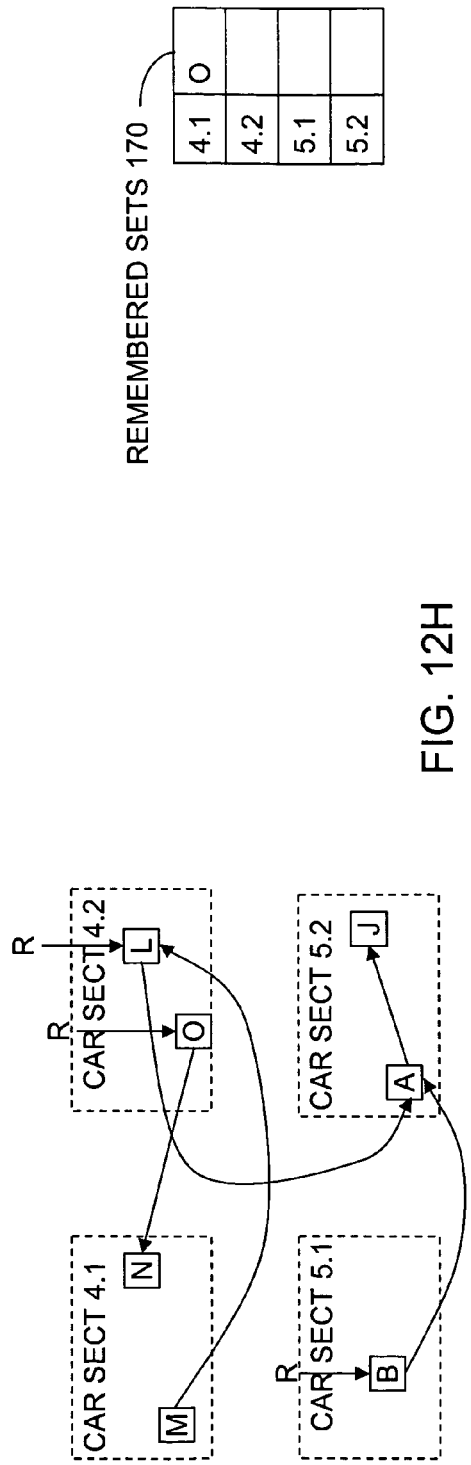
FIG. 12G
FIG. 12H

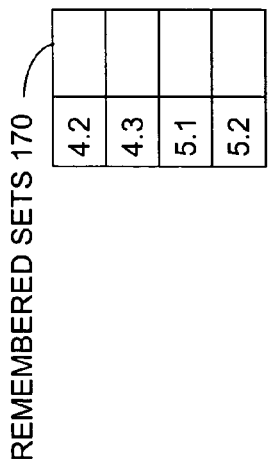
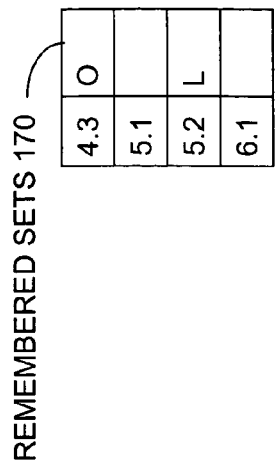
FIG. 12I
FIG. 12J
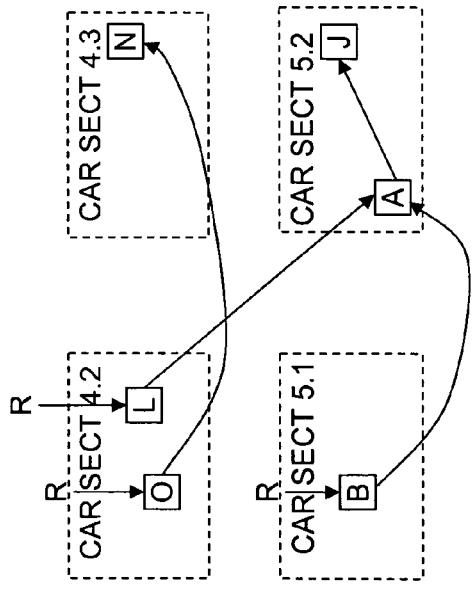
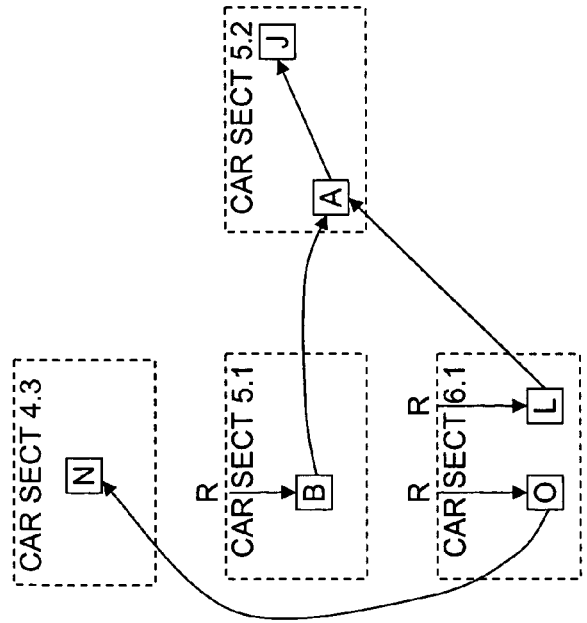

```
1   public class DisplayImage extends Applet {
2
3       SoftReference sr = null;
4
5       public void init() {
6           System.out.println("Initializing");
7       }
8
9       public void paint(Graphics g) {
10          Image im = (sr == null) ? null : (Image)(sr.get());
11          if (im == null) {
12              System.out.println("Fetching image");
13              im = getImage(getCodeBase(), "truck1.gif");
14              sr = new SoftReference(im);
15          }
16          System.out.println("Painting");
17          g.drawImage(im, 25, 25, this);
18      }
19
20      public void start() {
21          System.out.println("Starting");
22      }
23
24      public void stop() {
25          System.out.println("Stopping");
26      }
27
28  }
```

FIG. 13

BETTER PLACEMENT OF DYING OBJECTS IN A GENERATION MANAGED BY THE TRAIN ALGORITHM

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the JAVA™ programming language. (JAVA™ is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modern systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "space-incremental." In space-incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating such objects so that the collection-set space they previously occupied can be reclaimed with the space that recognizedly unreachable objects occupy.

By thus culling objects referenced by reference chains that do not necessarily originate in the basic root set, the collector can be thought of as expanding the root set to include as roots some locations that may not be reachable. Although space-incremental collection thereby leaves "floating garbage," it can result in relatively low pause times even if entire collection increments are completed during respective single collection intervals.

Most collectors that employ space-incremental collection operate in "generations" although this is not necessary in principle. Different portions, or generations, of the heap are subject to different collection policies. New objects are allocated in a "young" generation, and young-generation objects that have remained reachable are eventually "promoted" from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and, although FIG. 6 shows three, most generational garbage collectors use only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection interval to collect the entire mature generation. So some garbage collectors may collect the mature generation space-incrementally; that is, they may perform only a part of the mature generation's collection during any particular collection cycle. Space-incremental collection presents the problem that, since the generation's unreachable objects outside the "collection set" of objects processed during that cycle cannot be recognized as unreachable, collection-set objects to which they refer tend not to be, either.

There are many way to reduce the adverse effect this would otherwise have on collection efficiency. For example, commonly assigned copending U.S. patent application Ser. No. 10/799,049, which was filed on Mar. 12, 2004, by Detlefs et al. for Garbage-First Garbage Collection, describes an approach in which the results of a heap-wide marking performed largely concurrently with mutator operation are used to help identify as unreachable some objects that, since they are referred to from outside the collection set, would otherwise be considered potentially reachable.

For the sake of example, though, we will consider in some detail another approach. FIG. 7 depicts this approach, which is often referred to as the "train algorithm." A generation to be collected space-incrementally is divided into sections, which for reasons about to be described are referred to as "car sections." Conventionally, a generation's space-incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

For reasons that will become apparent in due course, the train algorithm groups car sections into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. This tends to reduce the amount of floating garbage because, as will now be explained, the train algorithm so operates that inter-car references tend to be grouped into trains.

The train algorithm is like some other approaches to space-incremental collection in that its implementations typically employ "remembered sets" to identify references into the car from outside of it. As card tables do, remembered sets keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection interval. To illustrate how such updating and other collection operations may be carried out, FIG. 8 depicts an operational sequence in a system of the typical type mentioned above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All space occupied by cars belonging to a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from reachable young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 16 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings indicate, the remembered set may similarly need to be updated even if the referred-to object is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A-12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, only inter-generational references refer to objects in the next car to be processed. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

The discussion so far has been somewhat simplified in that it has treated all references as the same. In fact, though, many garbage collectors are arranged to treat some references as weak: they sometimes collect memory space occupied by objects reached only through reference chains include such references.

FIG. 13 gives an example of how a programmer employing the JAVA™ programming language might employ a weak reference explicitly. The listing set forth in that drawing defines a subclass of the Applet class. A browser that instantiates an Applet subclass may repeatedly call the paint( ) method set forth in the ninth through eighteenth lines. The heart of that method is its seventeenth-line instruction, which calls upon the browser to draw onto the computer's monitor screen an image referred to by the reference contained in local variable im. The thirteenth-line instruction shows that the paint( ) method initially performed an I/O operation in which it loaded an Image object from persistent storage and placed the reference to it in im.

Since the browser may cause the virtual machine to execute the paint( ) method many times during the course of the applet's display, performing this I/O operation in each call of the paint( ) method can be expensive. Rather than place the reference to the Image object in local variable im, which goes out of scope (and thus leaves the root set) when the paint( ) method returns, therefore, one might be inclined to store the reference to that Image object in a variable that remains in scope between paint-method calls. But Image objects tend to be large, a web page may have many applets, and many applets may have many images. So keeping such Image objects loaded may place excessive pressure on heap space. It is therefore desirable to allow the garbage collector to reclaim the image's space if necessary between paint-method calls. This is why the program is so written that the Image object is no longer reachable through the im reference when paint( ) returns.

Still, thus reclaiming the object's space imposes a performance penalty: an I/O operation will need to be performed when the paint( ) method is next called. To avoid such a penalty when heap space is not currently at a premium, the applet provides a static variable sr, as the listing's third line indicates, and the paint( ) method's fourteenth-line instruction (1) allocates space for an object of the SoftReference class, (2) places a reference to the SoftReference object in sr, and (3) places a reference to the Image object into the so-called Referent field of the SoftReference object to which the static variable sr refers. The Referent field of a SoftReference object is one that the virtual machine's garbage collector has been arranged to treat as one of several types of weak reference. As was stated above, this means that, if every reference chain from the root set to an object (such as the Image object) includes such a reference, the garbage collector will not necessarily refrain from reclaiming that object's memory space. If heap space is running low, for example, the collector may reclaim the referred-to object's space (and set the SoftReference object's Referent field to null to avoid a dangling reference) despite the reference chain from the root set through the weak reference to the object. If there is no pressure on the heap space, on the other hand, the garbage collector may refrain from reclaiming the Image object's space, so the paint( ) method will be able to read the Image object without reloading it.

The listing shows this. When paint( ) is called for the first time and the fourteenth-line instruction therefore has never previously been executed, reference variable sr still contains a null value when the tenth-line instruction is executed, so that instructions gives im a null value. In every subsequent call, though, sr refers to the SoftReference object, and the reference variable im receives as its contents those of SoftReference's Referent field. This means that im receives a reference to the Image object if the collector has not reclaimed that object's memory space. As the eleventh-line test indicates, the paint( ) method can therefore avoid the expensive I/O operation. If that memory space has already been reclaimed, though, presumably because of pressure on heap space, the value of im is null, so the block set forth in the twelfth through fourteenth lines loads the image and places references to it in reference variable im and in the Referent field of the SoftReference object to which reference variable sr refers.

As shown in FIG. 29, the behavior just described is typical of the way in which an implementation of the JAVA™ virtual machine treats the Referent field of a SoftReference object: if the only reference chain from the root set to an object includes a reference in a SoftReference object's Referent field (Step 502), the collector will refrain from reclaiming the referred-to object's memory space only if there is plenty of heap space left (Step 504) but will otherwise reclaim that space despite the reference chain from the root set (Step 512). But other types of weak references may be treated differently. In the case of a reference contained in a WeakReference object's Referent field, for example, the collector will always reclaim the referred-to object's space, independently of how much heap space is left. (JAVA™-virtual-machine implementations recognize a reference contained in a JAVA™ object as weak only if it is found in the Referent field of an object belonging to a subclass of the Reference class. SoftReference and WeakReference are such subclasses.) That is, if there are no regular, "strong" reference chains to the object, the object will remain reachable only until it comes up for collection.

Although there are several varieties of weak reference, all weak references share the characteristic that space occupied by the objects to which they refer can be reclaimed only if there are no strong-reference chains to the same objects. For a collector that employs the train algorithm, this means that processing remembered-set entries representing weak references into the collection set must await processing of strong references; what happens to a collection-set object referred to by a weak reference depends on whether that object is also referred to by any strong references. Also, there may be a hierarchy among weak references, so that processing of "stronger" weak references must precede processing of "weaker" ones.

Another feature sometimes possessed by objects that contain weak references is the need for some type of processing when the objects to which they refer are found no longer to be reachable through strong-reference chains. Objects of the JAVA™ programming language's FinalReference class are a case in point. When a programmer includes a finalize( ) method in a class definition, he is specifying that certain things should happen when the object's memory space is reclaimed. For example, the object may be associated with non-heap resources that can be released when the object dies, and the finalize( ) method would specify how to handle the resource-release operation. When the user defines a non-trivial finalize( ) method for a given class, he implicitly requires that each instantiation of the class be accompanied by an instantiation of a FinalReference object that "guards" the new instance, i.e., whose Referent field points to it.

In the case of this particular type of weak reference, a collection-set object to which it refers is not immediately reclaimed even if there are no stronger references to it; that is, it will be evacuated just as though it were reachable through a strong-reference chain. But a Next field in the FinalReference object containing the reference to the collection-set object is used to place the FinalReference object in a queue of Reference objects similarly discovered to be guarding "dying" objects. Typically, a separate thread of execution processes the entries in that queue to perform the appropriate clean-up operations. These should include changing the FinalReference object's Referent field so that it no longer refers to the guarded object. The referred-to object's memory space will therefore be reclaimed when it next comes up for collection if, as is typical, it has not acquired an additional reference in the interim.

SUMMARY OF THE INVENTION

In general, in one aspect, the invention relates to a computer system that includes a memory, a mutator and a garbage collector. Further, the garbage collector treats a generation of a heap in the memory as divided into a number of car sections grouped into a number of trains, where each of the trains is ordered in a collection order and configured to collect in collection increments respective collection sets of those car sections in accordance with a train algorithm. The invention also includes a method, in which, in at least one of the collection increments the garbage collector performs the following: the garbage collector evacuates a first object from a respective collection set in response to at least one of the existence of a strong reference associated with the first object and the existence of a weak reference associated with the first object; the garbage collector selects one of the trains into which the first object is evacuated from the respective collection set in response to determining the existence of a reference to the object located in the generation, where the particular train is selected in accordance with the reference's location if the reference corresponds to a strong reference and wherein the one of the plurality of trains is selected independently of the reference's location if the reference corresponds to a weak reference; and the garbage collector thereafter reclaims the respective collection set as allocatable memory.

In general, in one aspect, the invention relates to a storage medium that includes instructions readable by a computer system. The computer system includes a memory, a mutator and a garbage collector. Further, the garbage collector treats a generation of a heap in the memory as divided into a number of car sections grouped into a number of trains, where each of the trains is ordered in a collection order and configured to collect in collection increments respective collection sets of those car sections in accordance with a train algorithm. The invention also includes a method, in which, in at least one of the collection increments the garbage collector performs the following: the garbage collector evacuates a first object from a respective collection set in response to at least one of the existence of a strong reference associated with the first object and the existence of a weak reference associated with the first object; the garbage collector selects one of the trains into which the first object is evacuated from the respective collection set in response to determining the existence of a reference to the object located in the generation, where the particular train is selected in accordance with the reference's location if the reference corresponds to a strong reference and wherein the one of the plurality of trains is selected independently of the reference's location if the reference corresponds to a weak reference; and the garbage collector thereafter reclaims the respective collection set as allocatable memory.

In general, in one aspect, the invention relates to a garbage collector. The garbage collector includes a first means for treating a generation of a heap in a memory associated with a computer system, wherein the memory is divided into a plurality of car sections and grouped into a plurality of trains ordered in a collection order. The garbage collector further includes a second means for collecting in collection increments respective collection sets of those car sections in accordance with a train algorithm by, in at least one of the collection increments: evacuating a first object from the a respective collection set in response to at least one selected from a group consisting of the existence of a strong reference associated with the first object and the existence of a weak reference associated with the first object; selecting one of the plurality of trains into which the first object is evacuated from the respective collection set in response to determining the existence of a reference to the object located in the generation, wherein the one of the plurality of trains is selected in accordance with the reference's location if the reference corresponds to a strong reference and wherein the one of the plurality of trains is selected independently of the reference's location if the reference corresponds to a weak reference, and thereafter reclaiming the collection set as allocatable memory.

Other aspects and advantages of the invention will be apparent from the following description and the appended claims.

BRIEF DESCRIPTION OF THE DRAWINGS

The invention description below refers to the accompanying drawings, of which:

FIGS. 12A-12J, discussed above, are diagrams that illustrate a collection scenario that can result from using the train algorithm;

FIG. 13, discussed above, is a listing of source code that illustrates the use of a weak reference;

DETAILED DESCRIPTION OF AN ILLUSTRATIVE EMBODIMENT

Although the present invention deals with the train algorithm, it need not be practiced in a collector that restricts collection activity to intervals dedicated only to collection. Nor, if it does so, need a full collection increment be performed entirely within a single such interval. Even if a full collection increment is performed within a single interval, the implementation of the algorithm need not be the same as the one described above in connection with FIGS. 8A, 8B, and 9-11.

Figure 14A:
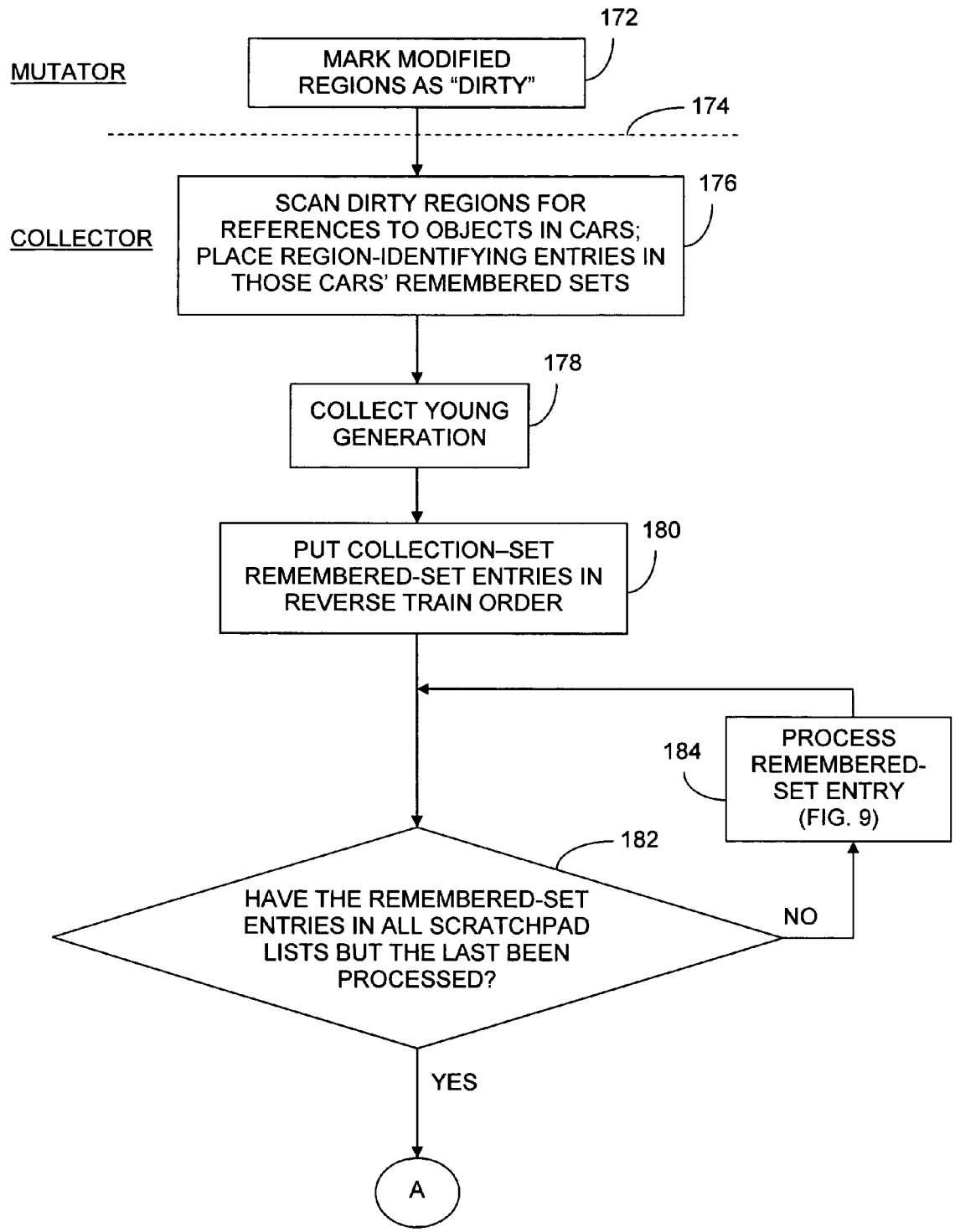
FIGS. 14A and 14B together constitute a flow chart that illustrates a collection interval, as FIGS. 8A and 8B do, but illustrates optimizations that FIGS. 8A and 8B do not include.
Figure 14B:
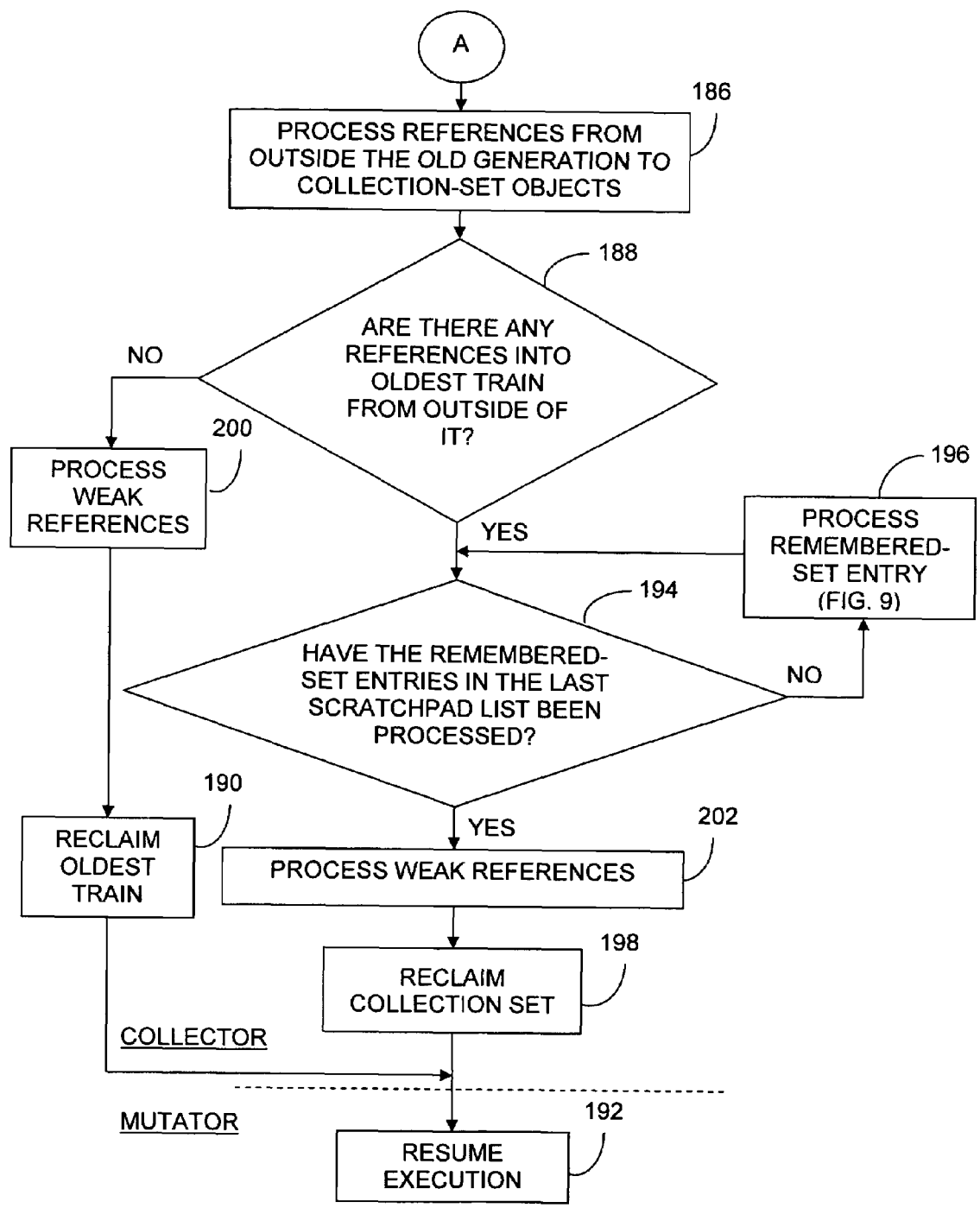

For example, I prefer to employ the present invention's teachings in a collector whose strong-reference-processing sequence is more like the one that FIGS. 14A and 14B (together, "FIG. 14") depict. Those drawings illustrate a collection operation that is similar to the one that FIG. 8 depicts, but FIG. 14 reflects the possibility of multiple-car collection sets and depicts certain optimizations that some of the invention's embodiments may employ.

Blocks 172, 176, and 178 represent operations that correspond to those that FIG. 8's blocks 102, 106, and 108 do, and dashed line 174 represents the passage of control from the mutator to the collector, as FIG. 8's dashed line 104 does. For the sake of efficiency, though, the collection operation of FIG. 14 includes a step represented by block 180. In this step, the collector reads the remembered set of each car in the collection set to determine the location of each reference into the collection set from a car outside of it, it places the address of each reference thereby found into a scratch-pad list associated with the train that contains that reference, and it places the scratch-pad lists in reverse-train order. As blocks 182 and 184 indicate, it then processes the entries in all scratch-pad lists but the one associated with the oldest train.

Before the collector processes references in that train's scratch-pad list, the collector evacuates any objects referred to from outside the old generation, as block 186 indicates. To identify such objects, the collector scans the root set. In some generational collectors, it may also have to scan other generations for references into the collection set. For the sake of example, though, we have assumed the particularly common scheme in which a generation's collection in a given interval is always preceded in the same interval by complete collection of every younger generation (of which, in this case, there is only one). If, in addition, the collector's promotion policy is to promote all surviving younger-generation objects into older generations, it is necessary only to scan older generations, of which there are none in the example; i.e., some embodiments may not require that the young generation be scanned in the block-186 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated. When it does evacuate an object to a train, it additionally evacuates to the same train each collection-set object to which a reference in the thus-evacuated object refers. In any case, the collector updates the reference to the evacuated object.

When the inter-generational references into the generation have thus been processed, the garbage collector determines whether there are any references into the oldest train from outside that train. If there are none, the entire train can be reclaimed, as blocks 188 and 190 indicate.

As block 192 indicates, the collector interval typically ends when a train has thus been collected. If the oldest train cannot be collected in this manner, though, the collector proceeds to evacuate any collection-set objects referred to by references whose locations the oldest train's scratch-pad list includes, as blocks 194 and 196 indicate. It removes them to younger cars in the oldest train, again updating references, avoiding duplicate evacuations, and evacuating any collection-set objects to which the evacuated objects refer. When this process has been completed, the collection set can be reclaimed, as block 198 indicates, since no remaining object is referred to from outside the collection set: any remaining collection-set object is unreachable. The collector then relinquishes control to the mutator.

As was just explained, most train-algorithm implementations maintain for each train a set of information by which the collector can readily determine whether any references located outside the train refer to locations within the train. If the collector infers from this information that there are no such references into the train, then the train's memory space can be reclaimed without inspecting all of the locations that all of the train's remembered sets identify. My commonly assigned copending U.S. patent application Ser. No. 10/313,878 for Detection of Dead Regions During Incremental Collection, which was filed on Dec. 6, 2002, and is hereby incorporated by reference, extends that concept. It describes techniques for identifying individual cars whose memory space can similarly be reclaimed without laboriously processing their entire remembered sets.

The general approach employed there is to maintain a "youngest-car indicator" and an "oldest-car indicator" for each car. Together these indicators define a maximum car range outside which it can be guaranteed that no references to the associated car are located. During a collection increment, the collector marks as potentially reachable all the cars in the generation that are identified as containing locations referred from outside the generation. It also marks as potentially reachable any car whose car range includes a potentially reachable car. Cars that are not thereby found to be reachable can be recognized as dead and their memory space reclaimed without the need to inspect the locations that their remembered sets identify. Cars thus identified as dead will often be collected before "older" cars, i.e., before cars that are ahead of them in the nominal collection order.

Figure 15A:
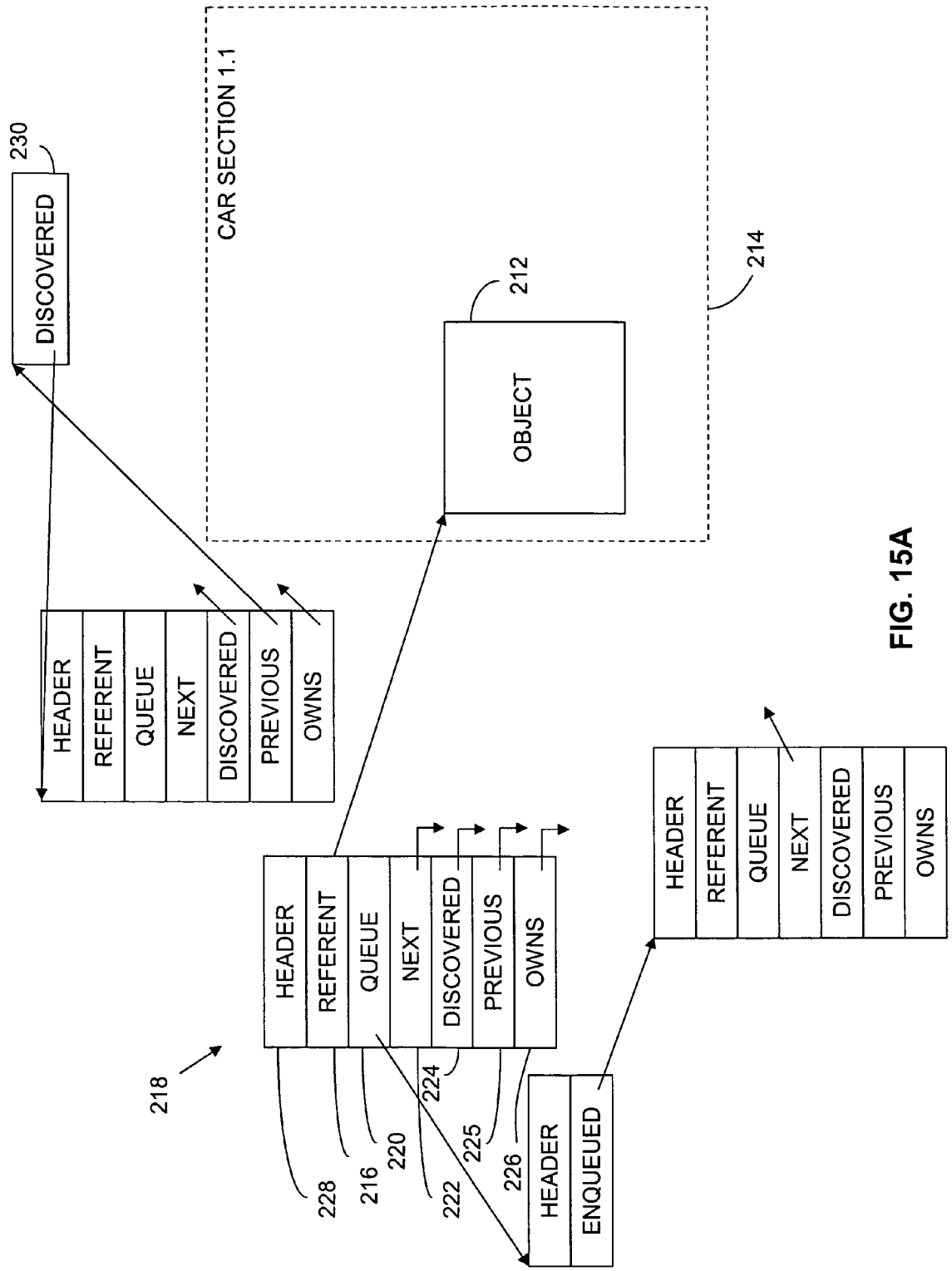
FIGS. 15A, 15B, and 15C are data-structure diagrams that illustrate weak-reference discovery and processing.
Figure 15B:
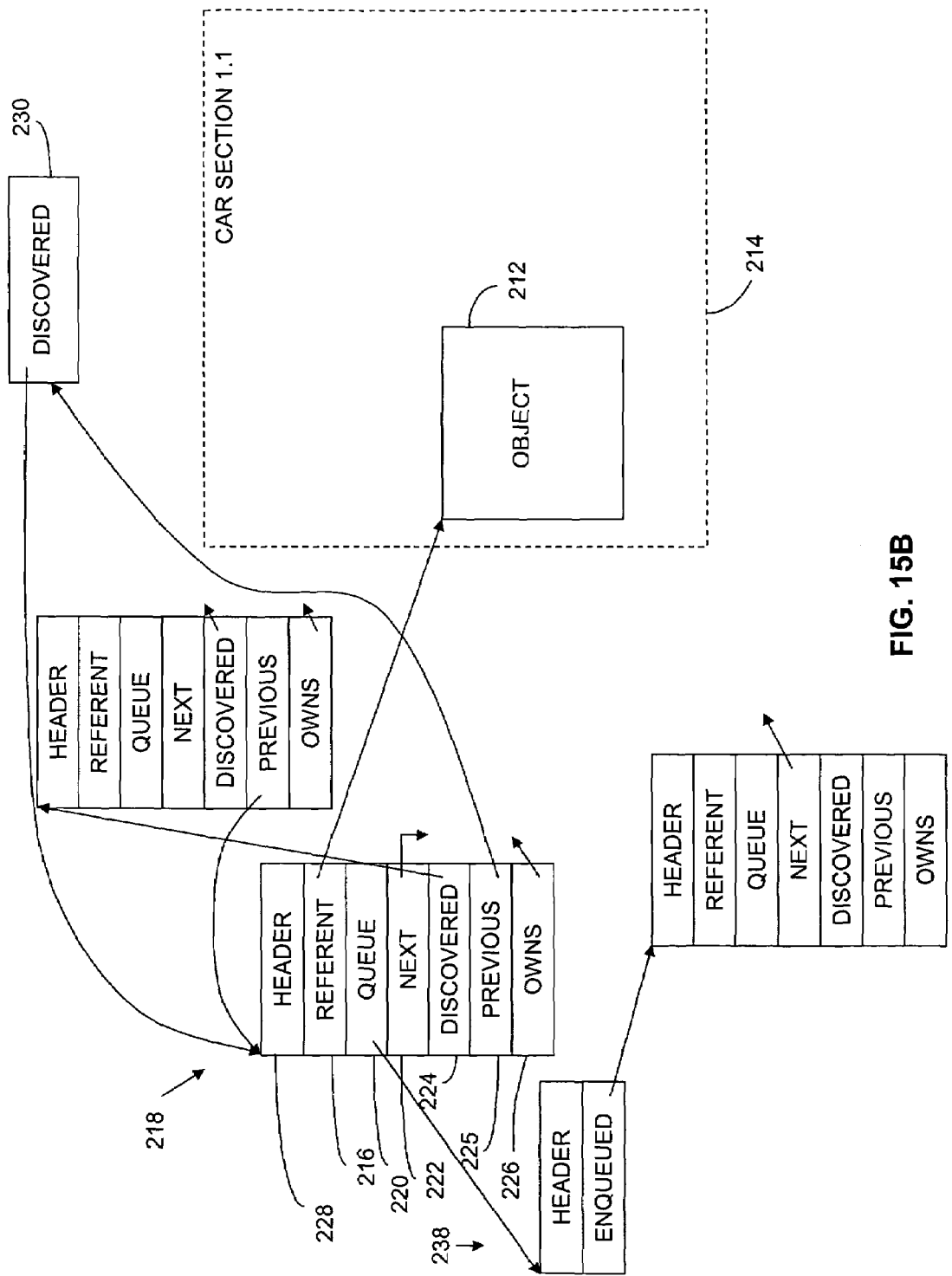

Independently of whether a collector employs such an aggressive approach, of whether it uses the strong-reference-processing sequence of FIG. 14 or that of FIG. 8, a collector that implements the present invention's teachings will also perform weak-reference processing. In the sequence that FIG. 14 illustrates, for instance, the weak-reference processing would be performed just before the reclamation step of block 190 or block 198, as blocks 200 and 202 indicate. FIGS. 15A and 15B depict one example of how weak-reference processing can be performed.

In FIG. 15A, an object 212 is located in a car section 214, which we will assume belongs to the collection set. The Referent field 216 of a weak-reference object 218 refers to object 212: a weak reference refers to that object, which the weak-reference object 218 is thought of as "guarding." In embodiments employed in the JAVA™ virtual machine, weak-reference objects (i.e., objects belonging to a subclass of the Reference class) have at least two other reference fields, fields 220 and 222. But the garbage collector does not consider those other fields' contents to be weak references; the only weak reference that a Reference-class object contains is the one in its Referent field. (As will be seen, in fact, there are times when not even that reference is treated as weak.)

For reasons that will be explained in due course, moreover, some of the present invention's embodiments will additionally employ one or more further fields, such as the illustrated embodiment's fields 224, 225, and 226, that the mutator does not use; only the collector uses them, in a way that will be explained below. Although those fields' contents serve as references in the sense that they refer to objects, they are "invisible" as far as the mutator is concerned, so they do not serve as ways for the mutator to reach objects, and the collector therefore does not trace them to find reachable objects.

When weak-reference processing occurs, strong-reference processing will already have been completed, as was indicated above. That is, the collector will already have identified collection-set objects as potentially reachable by following chains of strong references into the collection set. It then turns to a list or lists of weak references to collection-set objects. Such lists result from weak-reference-containing objects' having been "discovered." Now, the embodiments of the present invention to be described here will ordinarily perform most discovery before strong-reference processing occurs, but it is helpful first to consider how discovery can occur during strong-reference processing, since that is when conventional collectors ordinarily perform it.

To that end, consider a strong-reference-processing operation in which the collector is scanning a region that a remembered-set entry identifies, i.e., a region that was at some time found to contain a reference to an object in a car section that has now reached the collection set. Suppose that in doing so it encounters weak-reference object 218. It can typically identify that object as containing a weak reference by following a pointer in that object's header 228 to information about the object's class. The class information thereby found would identify object 218 as a subclass of the Reference class, so the collector would usually consider the contents of that object's Referent field 216 to be a weak reference. That weak reference breaks any strong-reference chain that the collector may be following, so that chain does not cause the strong-reference-processing operation to recognize the referent object as potentially reachable.

But the collector has thereby discovered a weak reference to the collection set: since that reference will need to be processed, but only after strong-reference processing, the collector places weak-reference object 218 in a list of the objects that will have to be processed during weak-reference processing. Some implementations of the JAVA™ virtual machine use the Next field 222, to thread such objects into a linked list of discovered weak-reference objects. But that field also has another purpose, which necessitates its being accessible to the mutator, and this can cause a conflict in collectors that operate concurrently with mutator execution. So, as FIG. 15B illustrates, other implementations provide a separate, Discovered field 224 to and thread the linked list through that field instead of through the Next field.

In that drawing the discovery of weak-reference object 218 is shown to result in that object's being placed in a linked list identified by a list-head field 230. In the JAVA™ virtual machine, the different top-level subclasses (SoftReference, WeakReference, PhantomReference, and FinalReference) of the Reference class are considered to be of different "strengths." For the most part, instances of a higher-strength top-level subclass (and of any of its own subclasses) must all be processed before instances of a lower-strength subclass. So list-head field 230 will typically be one of several such fields, which will correspond to respective top-level subclasses of the Reference class and serve as the roots of respective linked lists. (Also, in collectors that execute in a plurality of parallel threads, there may be respective lists for each thread in order to reduce synchronization cost.) Still, some implementations may employ only a single, common list for all strengths.

After strong-reference processing, the collector processes the weak-reference-containing objects on the discovery lists. Examples of ways in which such processing can be performed will be given in some detail in due course. For the present, though, we will consider only an overview, which FIG. 16 depicts.

Figure 16:
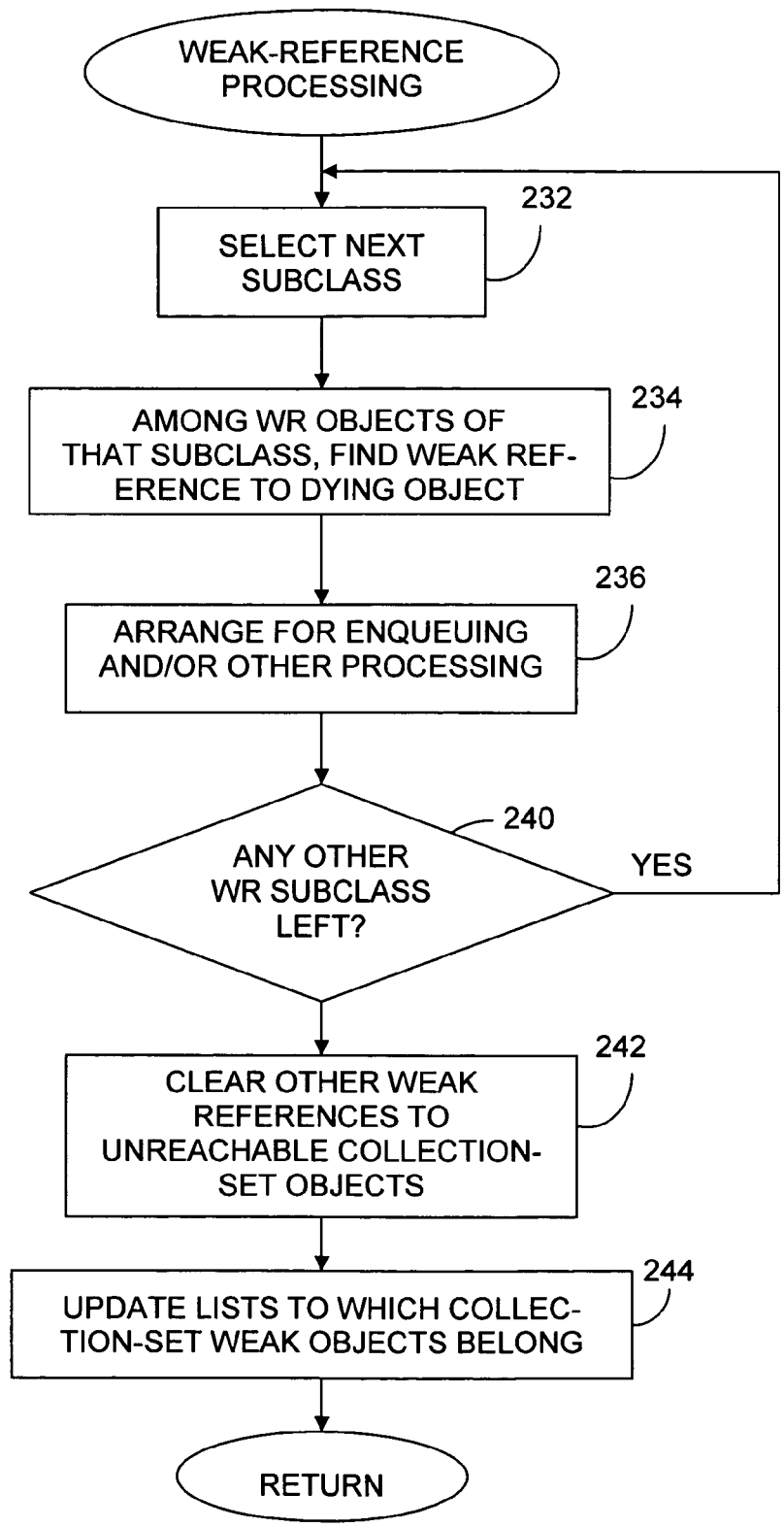
FIG. 16 is a flow chart that illustrates in simplified form an approach to weak-reference processing.

FIG. 16's block 232 represents selecting the next weak-reference strength for processing. SoftReference's strength is selected first. Block 234 represents finding which of the discovered weak-reference objects of that strength contain Referent fields whose contents refer to a "dying" collection-set object, i.e. to an object that previous, strong-reference processing has not identified as potentially reachable. In the case of a copying collector such as the one described above, any object not yet evacuated by the time weak-reference processing occurs is dying; if it had been reachable, it would have been evacuated. The collector compiles a list of weak-reference objects that have the selected strength and refer to dying objects in the collection set. As block 236 indicates, it arranges for appropriate processing of the references thus listed.

The particular type of processing that results from a guarded object's dying depends on the Reference subclass to which the guarding weak-reference object belongs. In the case of a weak-reference object of the SoftReference or WeakReference class, the processing will always include setting the weak-reference object's Referent field to NULL, since the memory space allocated to its erstwhile referent is to be reclaimed. In the case of weak-reference objects belonging to the PhantomReference and FinalReference classes, on the other hand, the collection-set objects to which their Referent fields refer are evacuated so that they can be reached in connection with certain post-mortem operations.

Figure 15C:
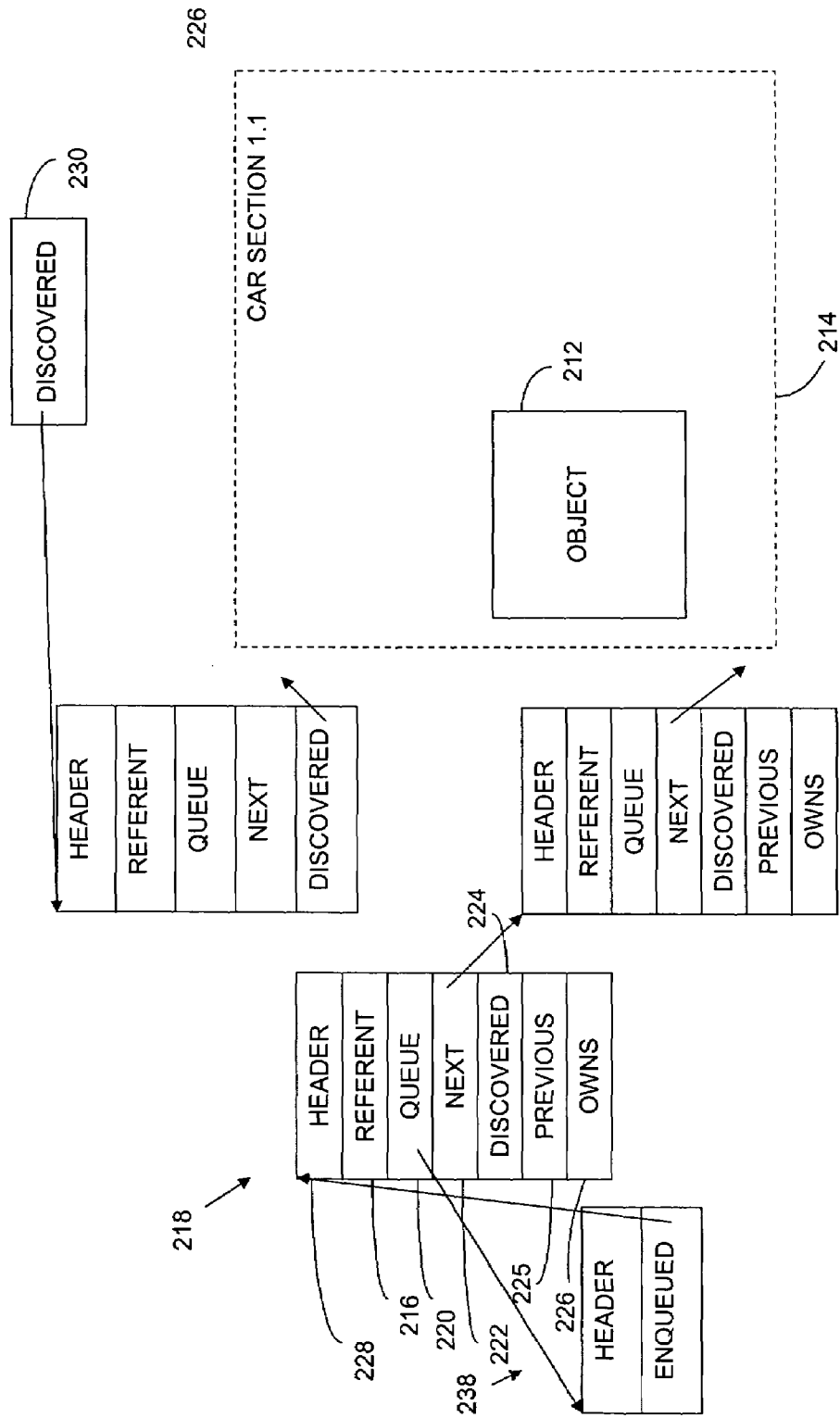

What those post-mortem operations are is not of interest here, but they are usually defined by code that the developer has written for that purpose, and they are typically executed by one or more separate, post-mortem-processing mutator threads. Respective linked lists of objects that require such post-mortem processing are maintained for each type of processing thus defined. Part of the weak-reference processing that a PhantomReference or FinalReference object undergoes when its referent is found to be dying is to employ the weak-reference object's Next field to place it into such a linked list. Specifically, the object is placed in a linked list headed by a queue object that the weak-reference object's Queue field identifies. FIG. 15C depicts the result of placing weak-reference object 218 at the head of a linked list headed by a queue object 238. Such enqueuing may occur in the case of a SoftReference or a WeakReference object, too, but the Queue fields of some such objects are simply NULL: they point to no queue, so the objects that contain them are not enqueued when their referents are found to be dying.

As block 240 indicates, the processing that blocks 232, 234, and 236 represent is performed in order for each top-level subclass (together with any subclasses thereof). The present invention primarily concerns provisions for processing weak-reference objects that thus refer to locations in the collection set. To place such operations in context, though, FIG. 16 additionally includes a block 242 that represents dealing with other sources of weak references to collection-set objects. In the JAVA™ virtual machine, for instance, these may be the string-interning table, the class-loader-dependency table, and weak references in the JAVA™ Native Interface. Any such references to unreachable objects in the collection set must be cleared in order to avoid dangling references to reclaimed memory space. Block 242 represents that clearing operation, but we will not deal here with the mechanisms for performing it.

Some collection-set objects may be weak-reference objects that belong to linked lists of references to locations outside the collection set. Since the collection-set memory space that such objects occupied is to be reclaimed, the references by which they are linked into such lists must be update to avoid dangling references. FIG. 16's block 244 represents doing so.

As was explained above, strong-reference processing in the case of a train-algorithm-implemented collector includes determining whether locations identified by the collection-set cars' remembered sets contain references to objects in the collection set. As was also explained, that operation can include determining whether the references identified by the remembered-set entries are weak references and deferring the processing of those that are.

Figure 17A:
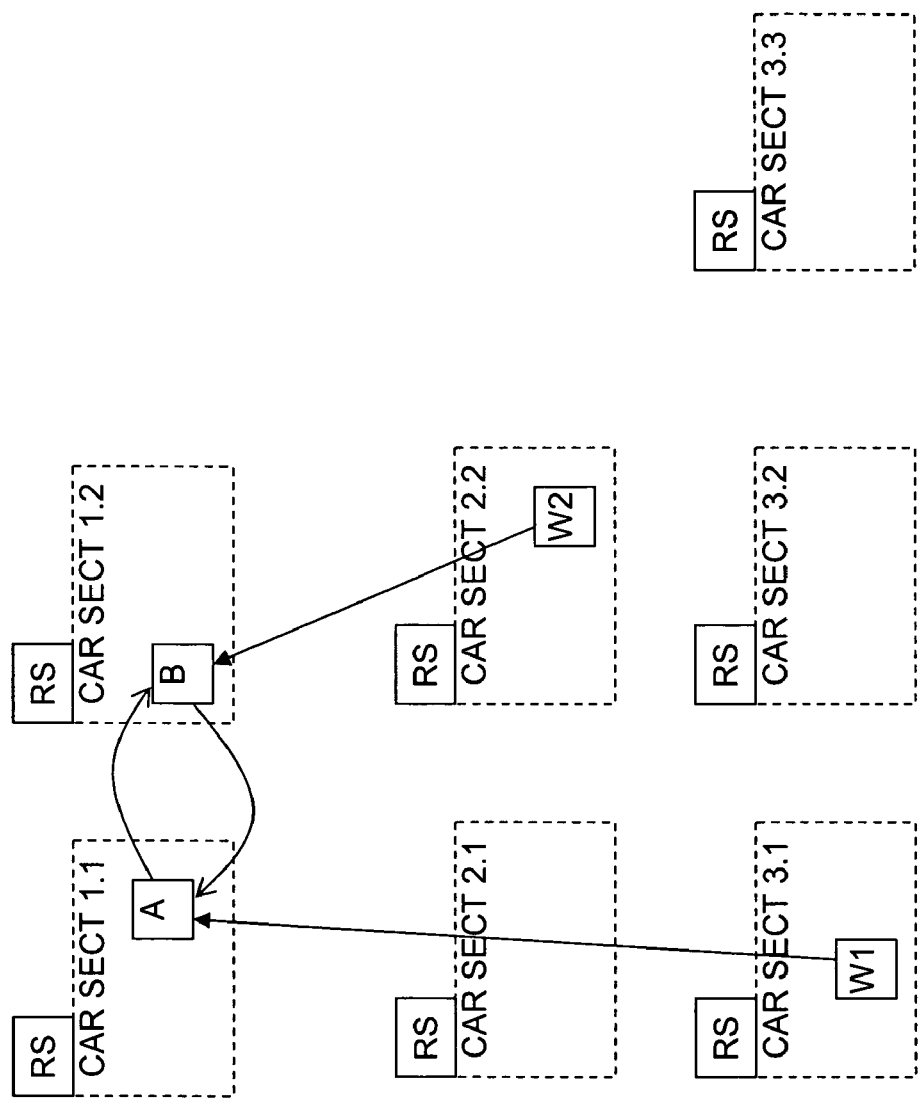
FIGS. 17A and 17B, are diagrams that illustrate futile collection.
Figure 17B:
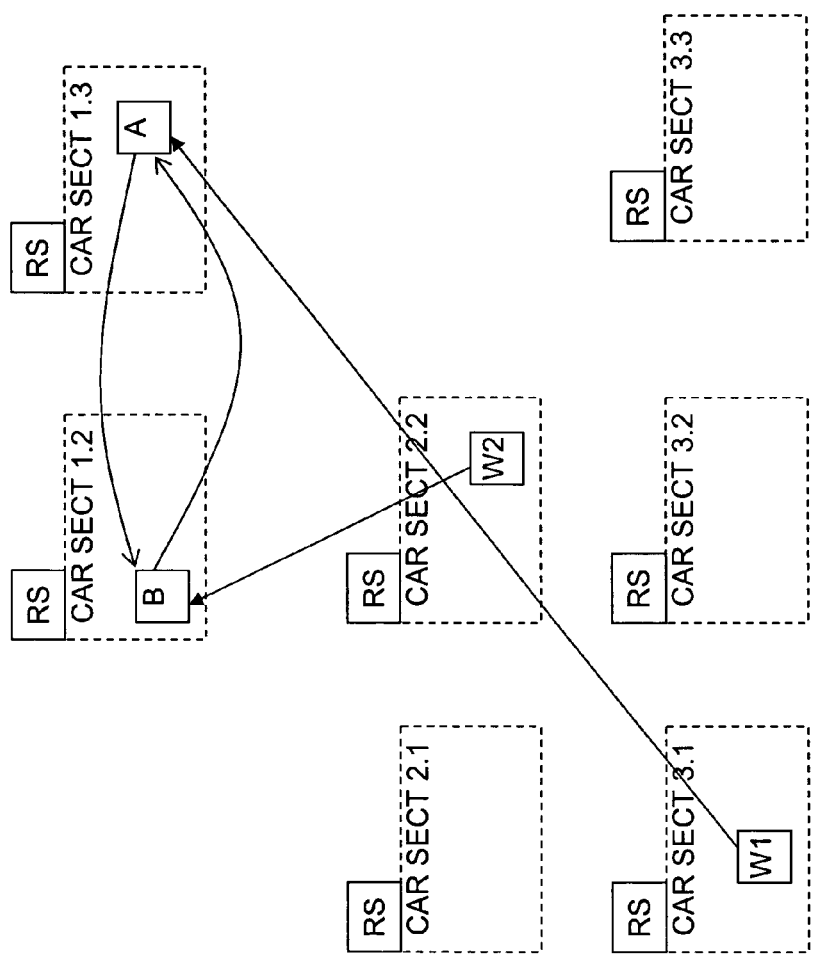

But I have recognized that there are a number of ways in which using the same common remembered-set structure for weak ones as for strong ones can complicate popular-object handling and retard progress. FIGS. 17A and 17B illustrate an example. We assume that FIG. 17A's oldest train includes car sections 1.1 and 1.2, the next train contains car sections 2.1 and 2.2, and the third train includes car sections 3.1, 3.2, and 3.3. Let us further assume that the collection set for one collection cycle is car section 1.1, which contains object A. Assume further that object A in section 1.1 and object B in section 1.2 contain references to each other. Finally, assume that the Referent fields in weak-reference objects W1 and W2 contain the only references to objects A and B, respectively, from outside the oldest train.

In this situation, objects A and B should be available for collection, because no strong reference outside the oldest train refers to any object inside it. But the collector would not conventionally recognize the situation if it has not so maintained the reference sets as to distinguish between strong references and weak references. The tally of references into car section 1.2 from outside of it, for instance, would merely show that there is a reference from outside the train, not that the reference is a weak one.

Of course, the collector could inspect the remembered set's entries, find the references from outside the train that gave rise to them, and determine whether any of those are strong references. Although doing so would not be expensive in the illustrated, simple case, thus processing remembered-set entries for all cars in the oldest train often would be. So the failure to have distinguished between strong and weak references during remembered-set updating effectively prevents the collector from recognizing that there are no strong references into the train from outside of it. The collector is therefore prevented from collecting the entire train.

Worse, the result could be futile collection activity. The process of collecting the collection set, namely, car section 1.1, includes determining whether the heap locations identified by car 1.1's remembered-set entries contain references into car section 1.1. In the simplified example, car 1.1's remembered set will at least contain entries that identify the locations such references in objects B and W1. And the collector will indeed take the time to determine that the reference in object W1 is a weak reference, i.e., is a reference that should not by itself prevent object A's memory space from being reclaimed. But the reference from object B is not in a collection-set car, and object A therefore appears potentially reachable. The result may be that object A is evacuated to a new car in the oldest train, as FIG. 17B illustrates. The collection cycle then ends.

Now consider what happens during the next collection cycle. In that collection cycle, the situation is exactly the same from the point of view of the collection activity as during the previous cycle: the collector will not be able to collect the object in the collection-set car, and it will not be able to recognize that the oldest train contains only garbage. Object B may therefore have to be placed in a same-train car behind object A's car. Potentially, therefore, the collector could fail ever to proceed beyond the oldest train: the failure to distinguish between weak and strong references in the abstracted reference information has prevented the collector from progressing.

Weak references can also adversely affect efforts to limit remembered-set size. U.S. Pat. No. 6,185,581 to Alexander T. Garthwaite for a Train-Algorithm-Based Garbage Collector Employing Fixed-Size Remembered Sets describes a way of limiting the memory cost that can be imposed by remembered sets associated with cars containing "popular" objects, i.e., objects to which a large number of references refer. In that technique, the collector adds no further entries to a given remembered set whose number of entries has reached a predetermined limit, but it continues to keep track of which train is the youngest one that contains a reference into the car with which the collection set is associated. When that car comes up for collection, the collector notes that there were too many references for the remembered set to contain, and it re-links the car into the youngest train containing a reference to it. This enables the remembered set to be cleared, since the remembered set does not need to contain cars that are farther forward in the collection sequence. But thus re-linking the car to a younger train—and therefore failing to reclaim any of its space—is unnecessary if all of the outside references into the car are weak references, so it would be desirable for remembered-set updates somehow to distinguish between strong references and weak references.

Although making that distinction during updating is desirable, it is not enough. Suppose, for example, that the distinction has been made, so the collector knows that there are no strong references into the (in this case, single-object-containing) collection-set car. But further suppose that there were too many weak references for the remembered set to contain them all. Then, although the object's memory space would otherwise be ripe for reclamation, the collector would not be able to perform all of the clean-up operations associated with the weak references to the object. So, unless the collector additionally keeps a complete list of weak references, it cannot properly reclaim the dying object's memory space.

The illustrated embodiment reduces such problems by, to a great extent, performing some of the discovery as "pre-discovery," i.e., by recognizing weak-reference objects as weak before the strong-reference processing for the collection sets to which they refer and by listing them separately from strong references. Instead of recording weak-reference locations by adding entries to the normal remembered sets, for example, the illustrated embodiment uses a field in each such weak reference's containing object to make, for respective cars, linked lists of objects that contain weak references to objects in those cars.

Figure 18:
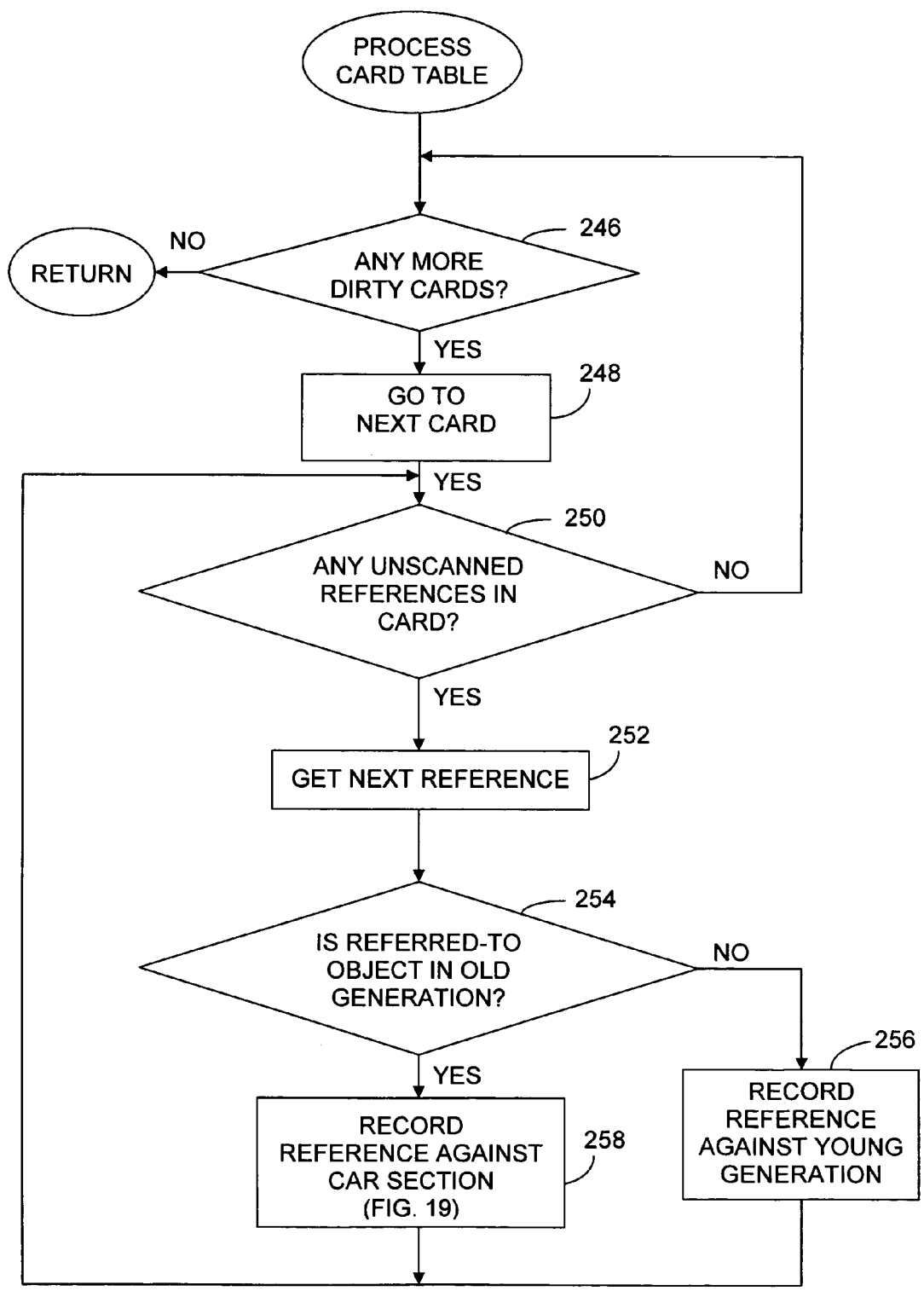
FIG. 18 is a flow chart of a routine for finding references located in regions that the mutator has modified.
Figure 19:
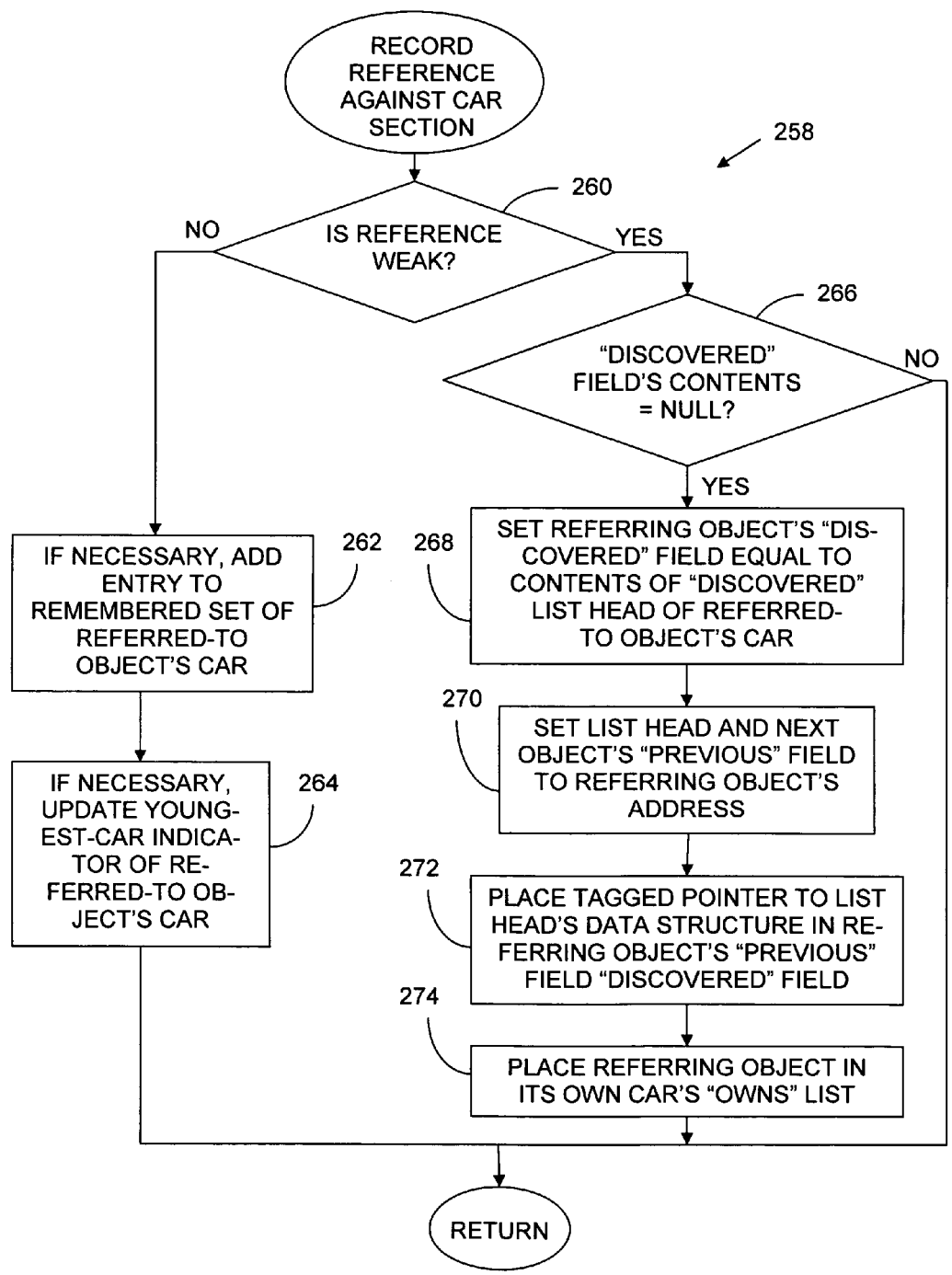
FIG. 19 is a flow chart of a routine for recording modified references against the car sections in which the objects to which they refer are located.

Those linked lists may be updated, for example, as part of the dirty-card-inspection operation used to update cars' remembered sets. FIG. 18 illustrates such an approach. It is a simplified flow chart illustrating the card-table-processing operation. As blocks 246 and 248 indicate, the operation continues so long as the card table indicates that at least one of the generation's "dirty" cards—i.e., cards in which references have been modified since the previous collection step—has not yet been processed. As blocks 250 and 252 indicate, the collector finds each reference in the dirty card. It then makes sure that each such reference's location has been recorded. In the illustrated embodiment, the recording that occurs when the referred-to object is in the young generation is different from that which occurs when it is in the old generation. Block 254 represents making that distinction. The illustrated embodiment records references to young-generation objects against the young generation as a whole, as block 256 indicates, whereas, as block 258 indicates, it records references to mature-generation objects against the car sections to which those objects belong. FIG. 19 sets forth the latter operation in more detail.

As blocks 260, 262, and 264 indicate, a reference that the collector finds not to be weak is processed in the normal manner. That is, an entry identifying the reference's location is entered into the remembered set of the referred-to object's car if that remembered set does not already contain such an entry.

We will assume for the sake of example that such entries are added only if the referred-to object's car is "older" than the car containing the reference, i.e., is ahead of it in the sequence in which cars are nominally to be collected. This is not a necessary aspect of remembered-set updating. Indeed, there are some advantages to having the remembered sets reflect all of the references into the associated car, not just those in younger cars. For a collector employing the train algorithm, though, it is more typical to keep remembered sets relatively small by omitting entries for references in older cars.

The metadata for the car that contains the referred-to object may include a value that in some fashion serves as an identifier of the youngest train in which a reference into the car containing the referred-to object resides. That identifier may, for example, be a youngest-car indicator, an indicator that identifies the most recently added car that contains such a reference in that train. If so, the collector will need to update that value as references are found. Block 264 represents that updating. Such indicators can be used for various purposes, such as to aid in re-linking special cars whose remembered sets have overflowed or in identifying sequences of cars that contain only garbage. Preferably, such an indicator is updated only in response to strong references; for the purposes to which that indicator is typically put, it is better for the indicator to identify the youngest car containing a strong reference to the referred-to object even if it is in a car older than one containing a weak reference to that object (See FIG. 29, Step 508). In some embodiments, a similar, oldest-car indicator may also be updated, but the FIG. 18 embodiment does not include such an operation.

Although the particular type of strong-reference recording exemplified by block 262 is not critical, it will typically involve adding an entry to a remembered-set data structure. In contrast, such an entry does not have to be made into the remembered-set data structure if the reference is a weak reference. When the collector finds a reference-containing object of the weak-reference-object type, it checks that object's Discovered field (e.g., FIG. 15's field 224) to determine, as block 268 indicates, whether that field still contains the NULL value it had when the weak-reference object was initially allocated. If it does, the state is as FIG. 15A indicates: weak-reference object 216 has not yet been placed into a list of weak references to objects contained in car 214.

In this situation, the collector discovers the weak-reference object containing that reference: it places the weak-reference object into that list. And, since the discovery occurs before the referred-to object has reached the collection set, I refer to this type of discovery as "pre-discovery." The operations performed during pre-discovery are largely the same as those illustrated above in connection with FIGS. 15A-C. The main difference in the illustrated embodiment is that the list head for the discovery list would be in the metadata associated with the car containing the referred-to object, whereas for conventional discovery it would more typically be associated with the (potentially multi-car) collection set as a whole. This is because pre-discovery is performed not just for references to collection-set locations; the information thereby recorded may be used for collections other than the current one. For weak references, the linked list takes the place of the car's remembered set. As is true of normal discovery—i.e., the discovery, during strong-reference processing, of weak references to collection-set locations—pre-discovery in some embodiments may employ different lists for weak-reference objects of different strengths.

To add the newly discovered weak-reference object to the discovery list, which is a linked list in the illustrated embodiment, the collector places it at the front of that list. As FIG. 19's block 268 indicates, that object's Discovered field receives the contents of a discovery list head associated with the car in which the referred-to object is located: it receives a pointer to the now-second object in that list. The list head and the second object's Previous field receive a pointer to the weak-reference object being added, as block 270 indicates, and, as block 272 indicates, the Previous field of the weak-reference object being added receives a (tagged, as will be explained below) pointer to the data structure that contains the list head. (Of course, the pointers used by embodiments of the invention for this purpose could point to any individual field in the weak-reference-containing object, such as the Discovered field 224 or the Referent field 218, but I prefer to have them point to its header.) For reasons that will be explained in due course, the collector not only places the weak-reference object in a discovery list associated with the car section in which its referent object is located but also, in an operation that block 274 represents, adds that weak-reference object to an Owns list associated with the car section in which the weak reference itself is located. It does so by adding it to a linked list threaded through the Owns fields such as the one to which FIG. 15A's reference numeral 226 refers.

The illustrated embodiment performs pre-discovery not only as part of card-table processing, i.e., not only in response to the mutator's using a write barrier to inform the collector that it has modified a reference. It also pre-discovers weak-reference objects as part of object promotion. When a weak-reference object whose referent resides in the mature generation is itself promoted to the mature generation, for example, it is added to the Owns list of the car into which it is placed, and it is placed on the discovery list of the car that contains its referent resides. As will be seen below, pre-discovery can also occur as part of "follower" evacuation.

At the beginning of strong-reference processing there will therefore be associated with each of the collection-set cars (and, indeed, with each of the non-collection-set cars) four lists, each of which is associated with a different one of the top-level subclasses of Reference and contains zero or more objects of that class whose Referent fields refer to locations within the associated car section.

Since the nature of the card-table processing that produced the remembered sets and the linked lists of pre-discovered weak-reference objects was such as to segregate weak references from strong references, the locations identified by the remembered-set entries do not ordinarily contain weak references. But the operation of processing strong references can nonetheless result in discovery of further weak references into the collection set. To appreciate this, we consider the operation represented by FIG. 10's block 132, namely, the processing of references contained in an object evacuated as a result of strong-reference processing.

Naturally, there must be some way of finding where those references are, and the typical way is to consult a structure, which can be found by following the class pointer in the object's header, that contains information about the object's class. For classes whose instances include references, that information includes a reference map, i.e., some structure from which the locations of references within a class's instances can be inferred. The reference map may, for instance, be a list of offsets that indicate references' relative locations with respect to the start of an instance object.

The way in which the illustrated system presents reference-map information is to have the class information indicate whether the class's instances include weak references and to provide two different reference maps for those that do. Every class-information-containing structure includes a "strength" field, which has one of five possible values in the illustrated, JAVA™-virtual-machine embodiment. One value indicates that the class is not a subclass of Reference: its instances include no weak references, so the class information includes at most a single reference map. Each of the other four values is associated with a different weak-reference "strength," i.e., with one of the four top-level subclasses of Reference, namely, SoftReference, WeakReference, PhantomReference, and FinalReference. Each of those four values indicates that the class is either the associated top-level subclass or a subclass of it. It therefore indicates that the class's instances include weak references and that the class information therefore includes two reference maps. One of the reference maps, called the strong map, includes the offsets of all references, both weak ones and strong ones. The other reference map, called the weak map, includes only offsets of strong references.

Figure 10:
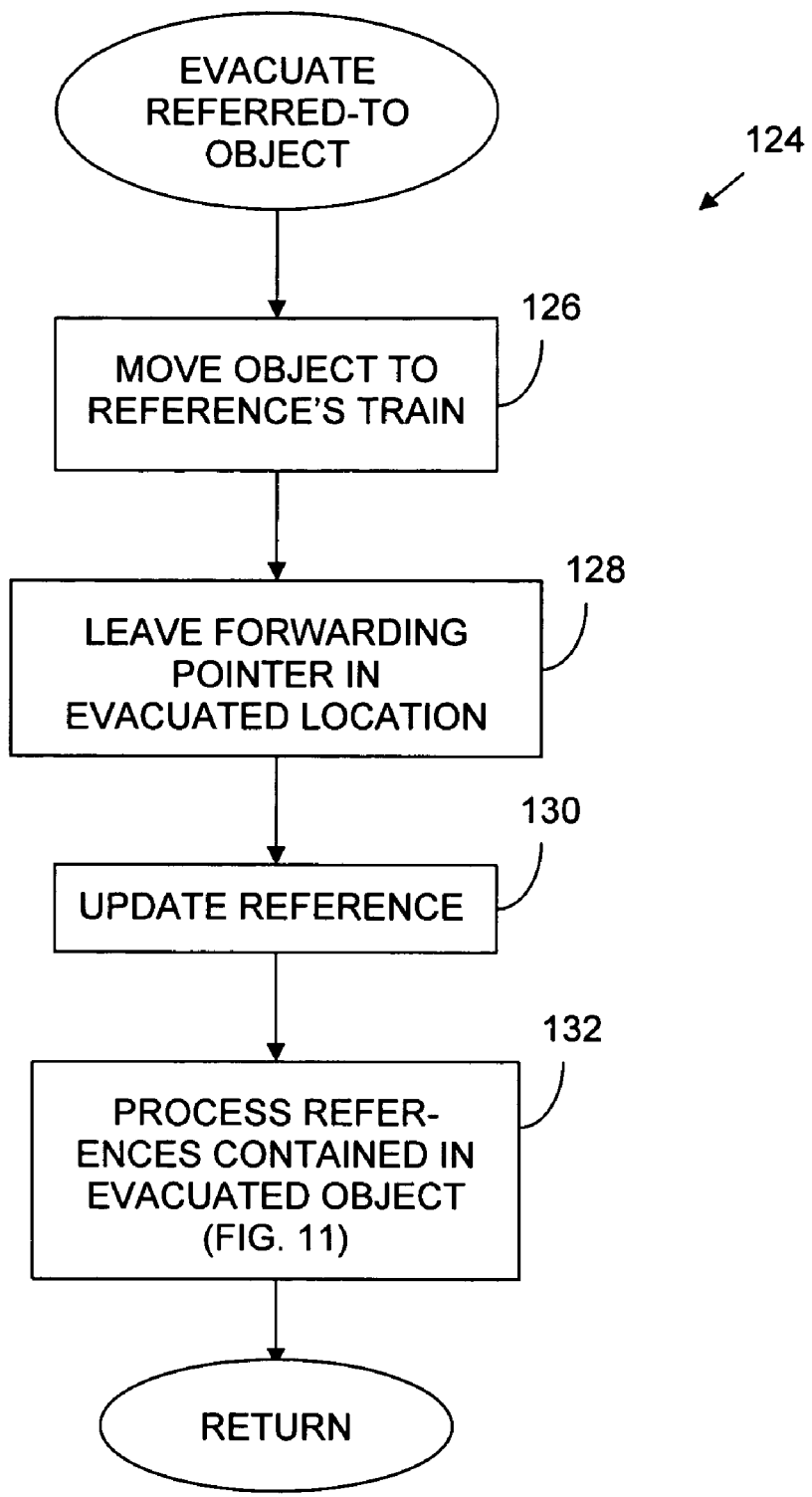
FIG. 10, discussed above, is a block diagram that illustrates in more detail the referred-to-object evacuation that FIG. 9 includes.
Figure 11A:
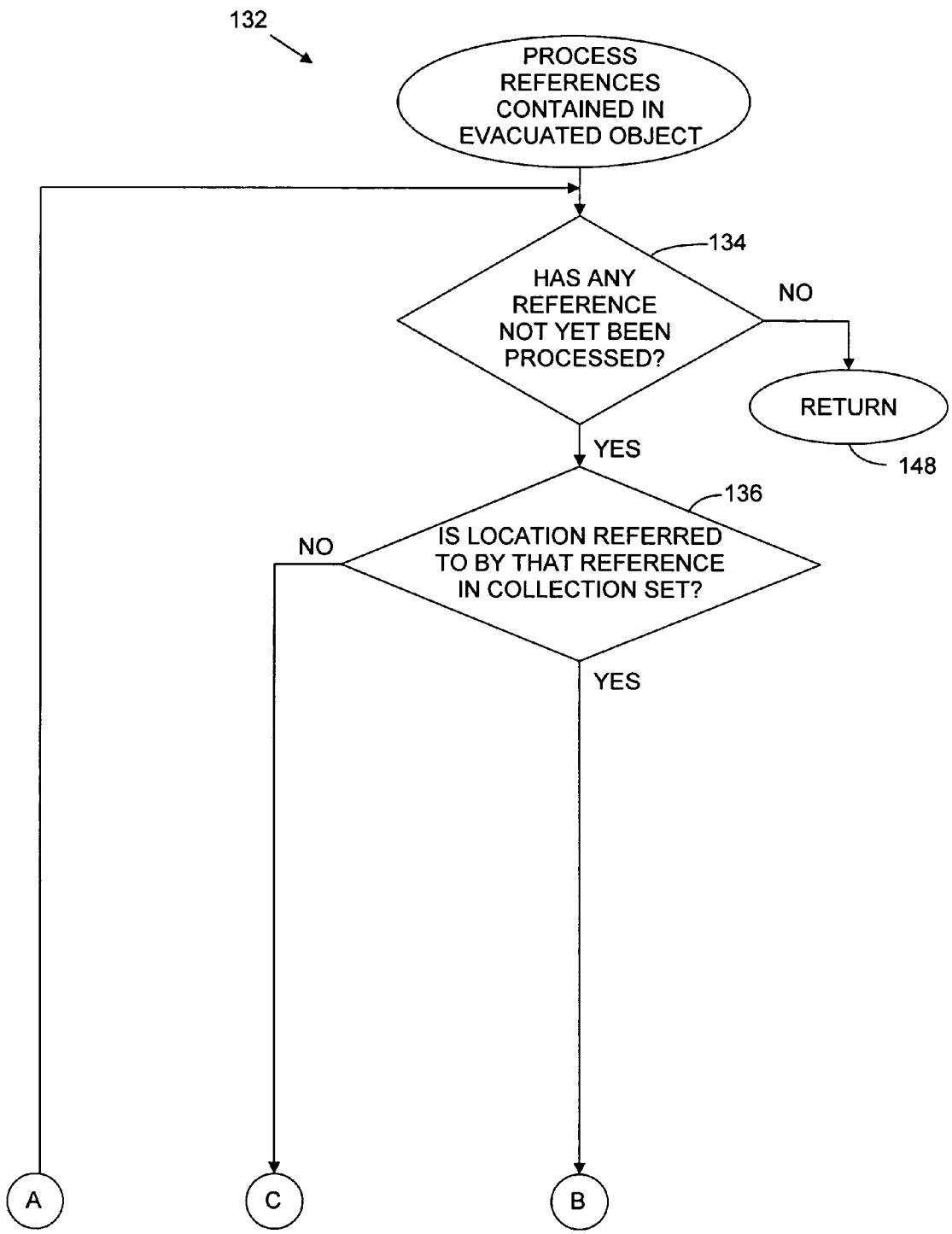
FIGS. 11A and 11B, discussed above, together form a flow chart that illustrates in more detail the FIG. 10 flow chart's step of processing evacuated objects' references.
Figure 11B:
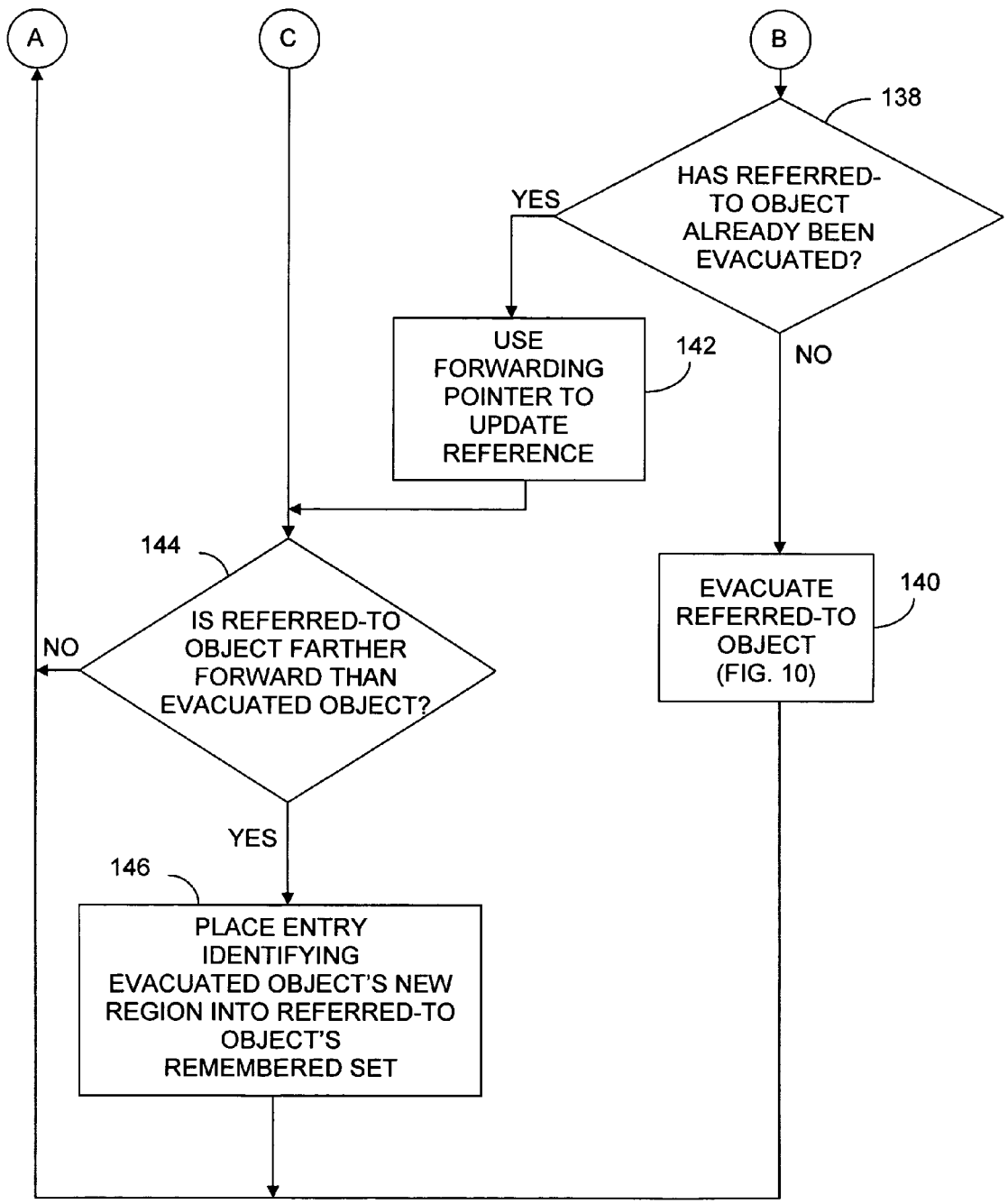
Figure 12A:
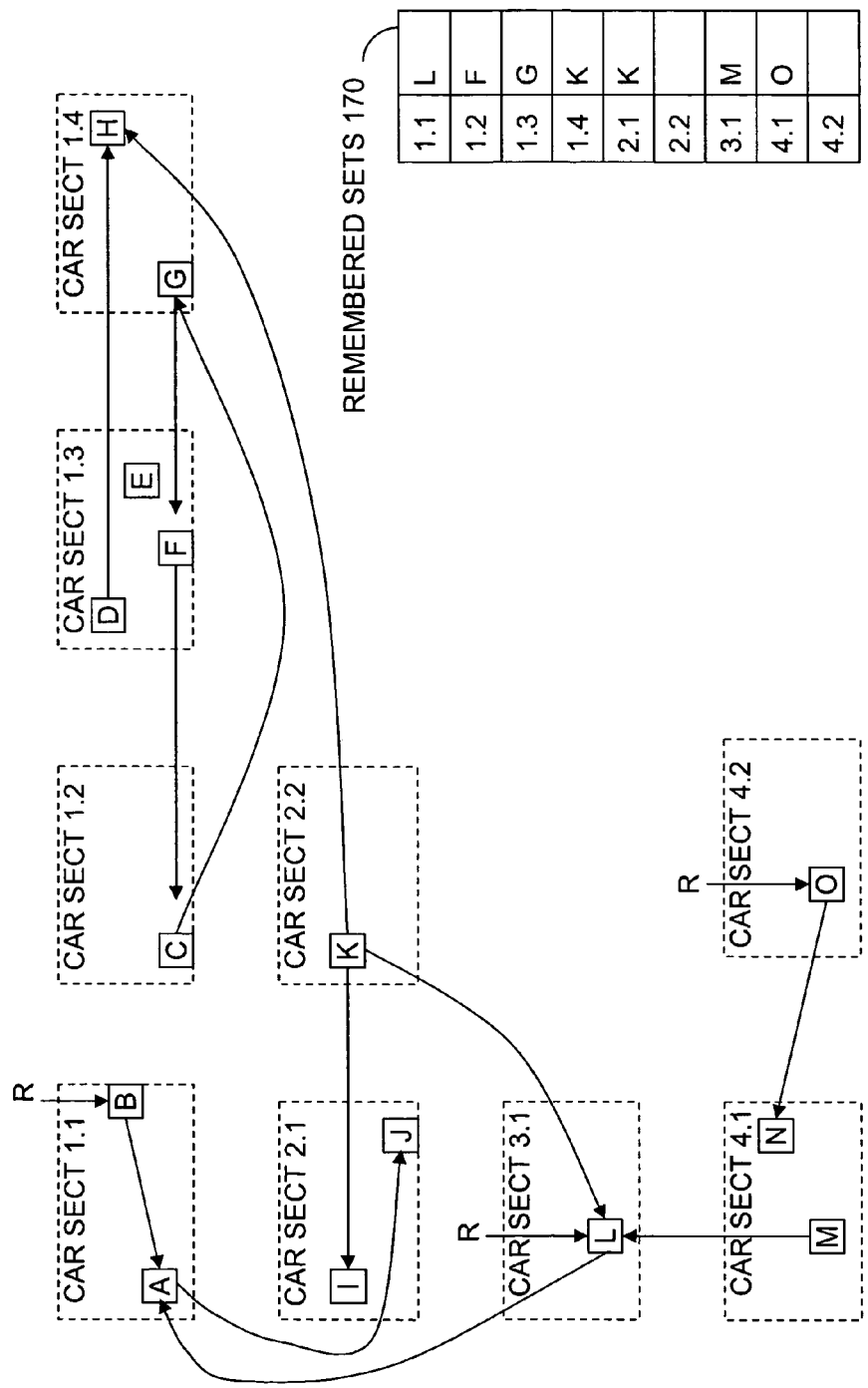
Figure 12B:
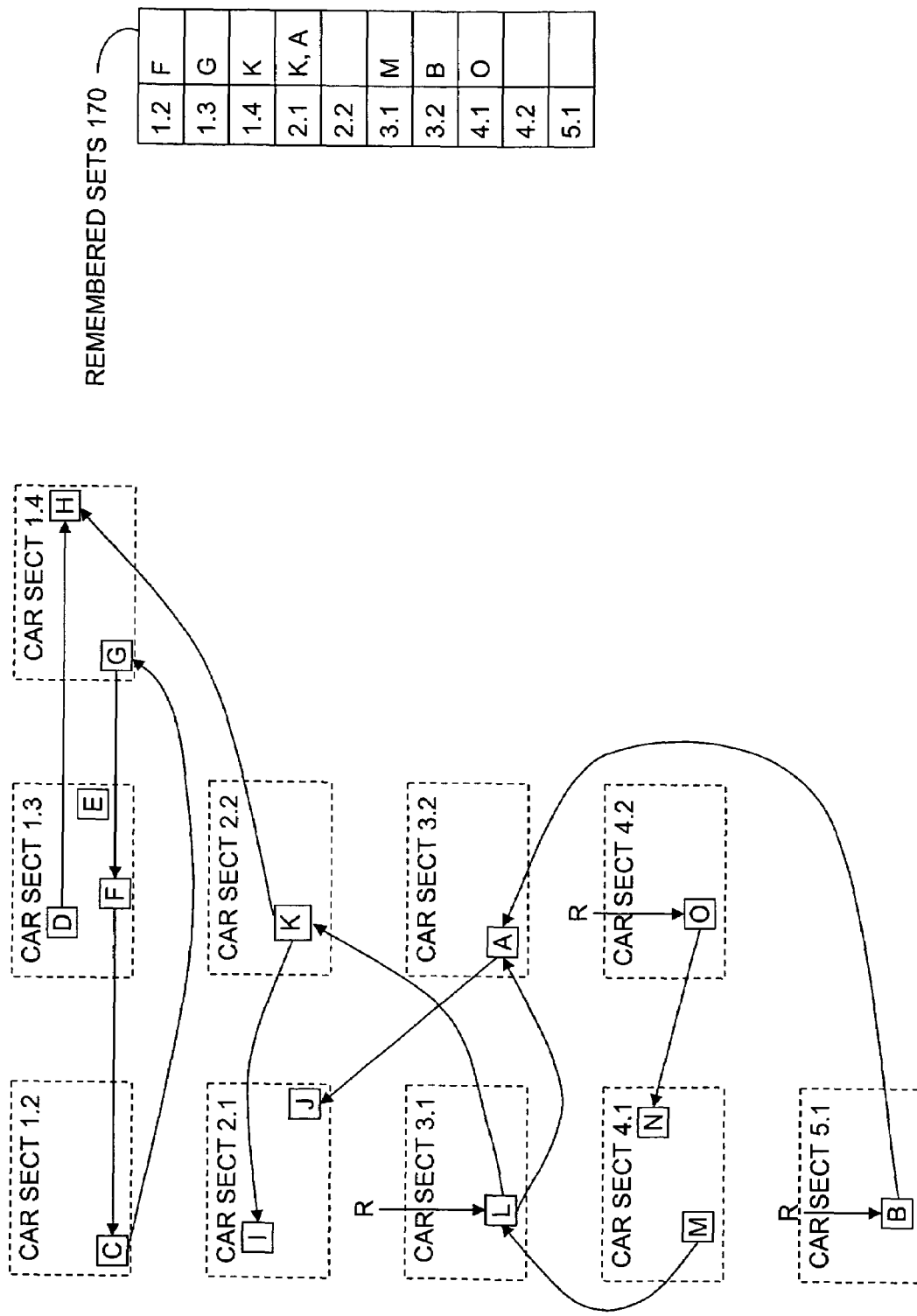
Figure 12C:
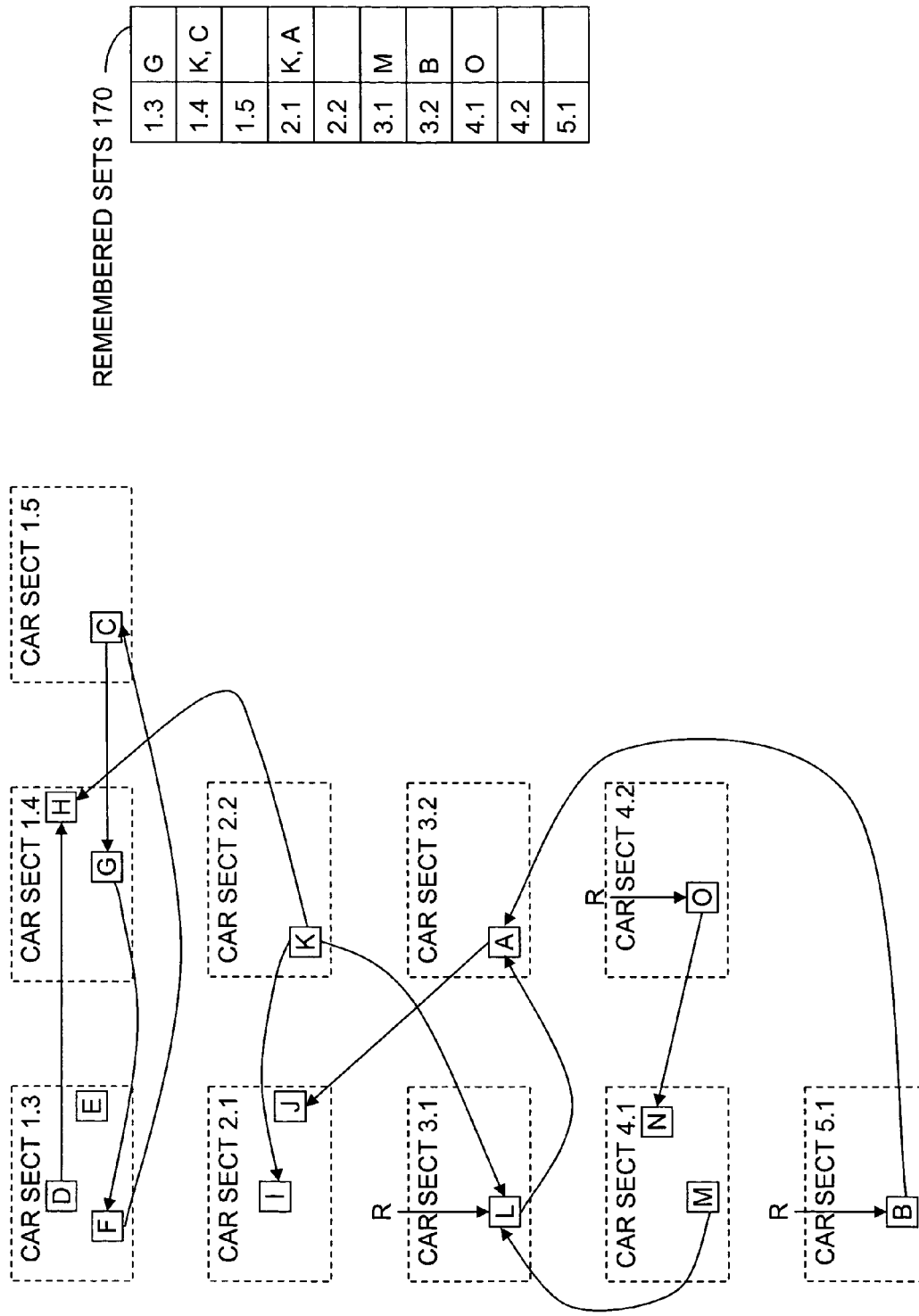
Figure 12D:
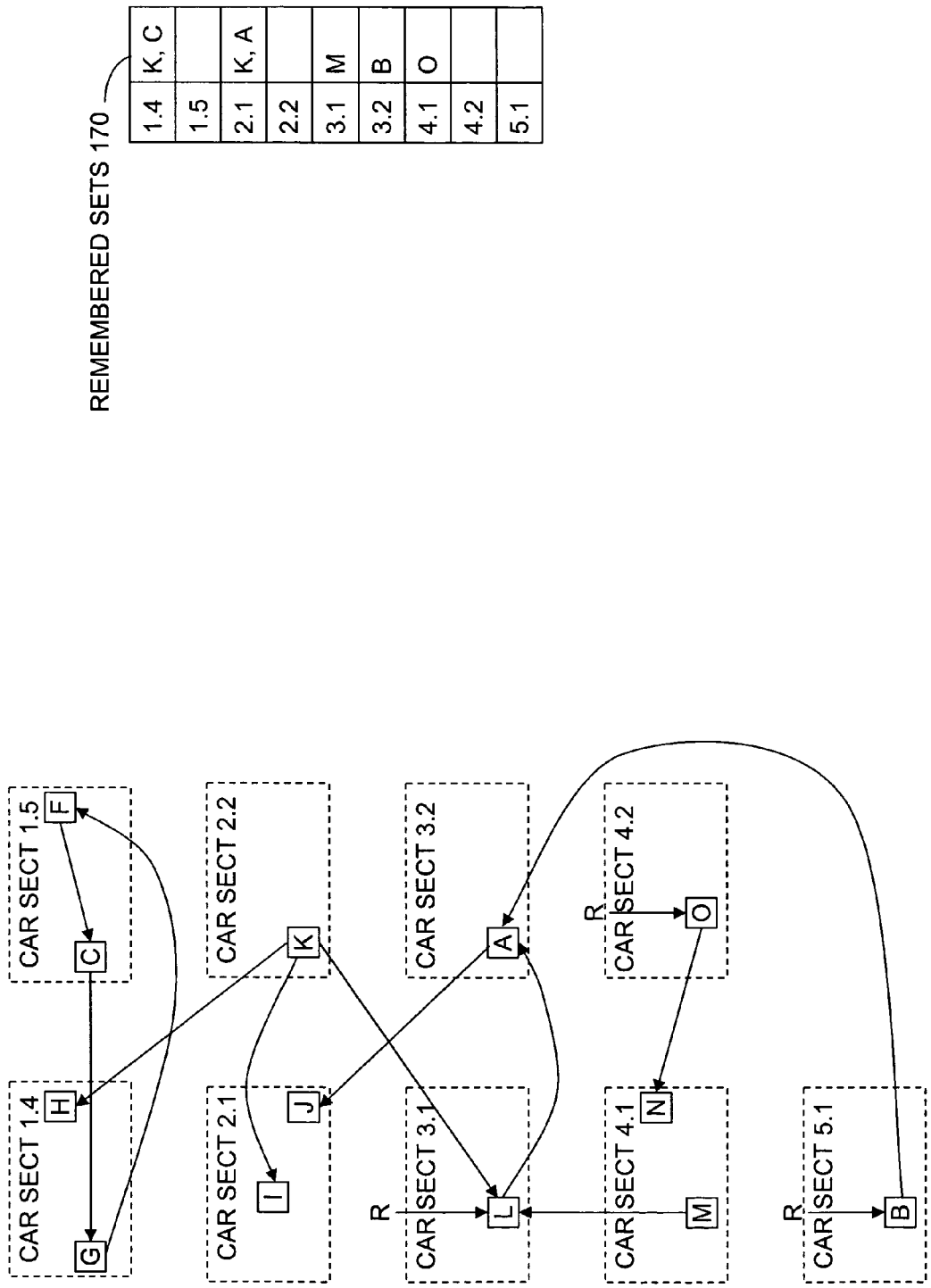
Figure 12E:
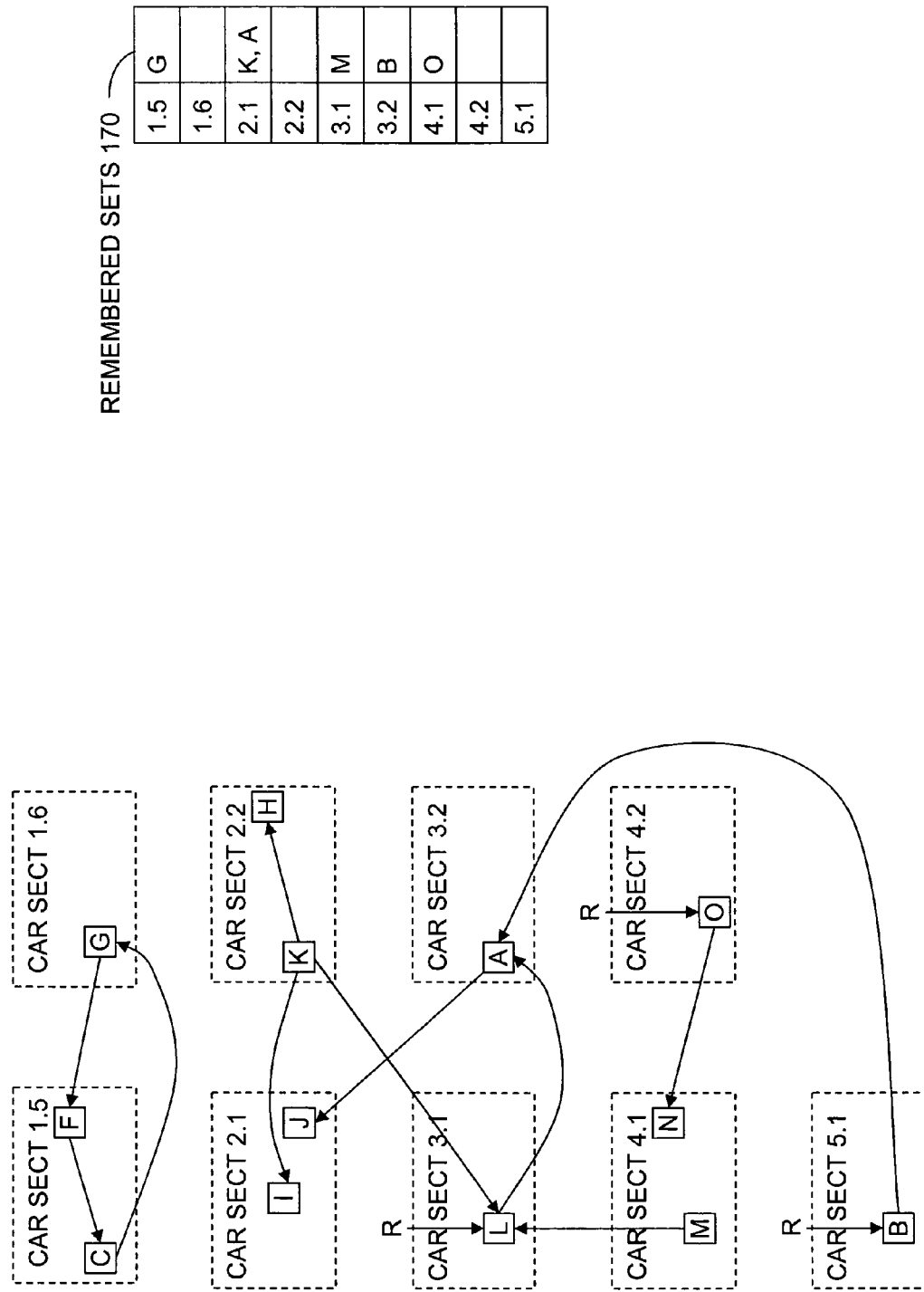
Figure 12F:
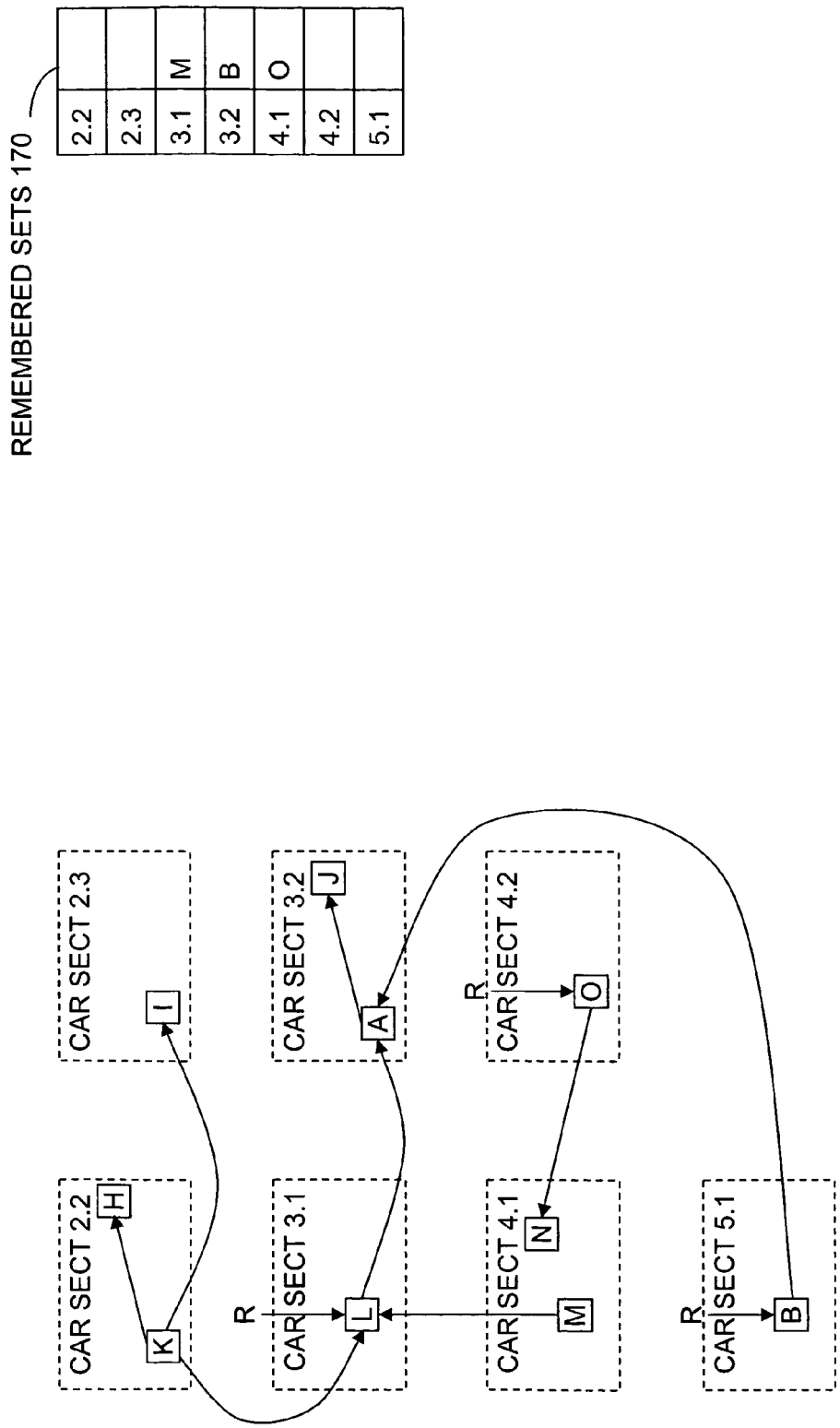

Since FIG. 10's operation 132 is intended to deal only with strong-reference processing, the map that the collector ordinarily employs when it is searching for references in an instance of the Reference class is its weak map, the one that excludes the object's weak reference. As was mentioned above, though, the contents of the Referent field are not always treated as a weak reference.

To understand this, consider a situation in which the Referent field in an instance of, say, the FinalReference class has been found during some previous collection to point to a dying object, i.e., in which the FinalReference object has been found to "guard" that dying object. As was mentioned above, the FinalReference object would have been enqueued: its Next field would have received a pointer that places it into a linked list of objects that some finalizing thread needs to process. Part of that finalizing thread's operation may require access to the guarded object, so the previous collection would have included evacuating the guarded object to prevent its contents from being overwritten before the finalizing thread can have access to them.

Figure 20:
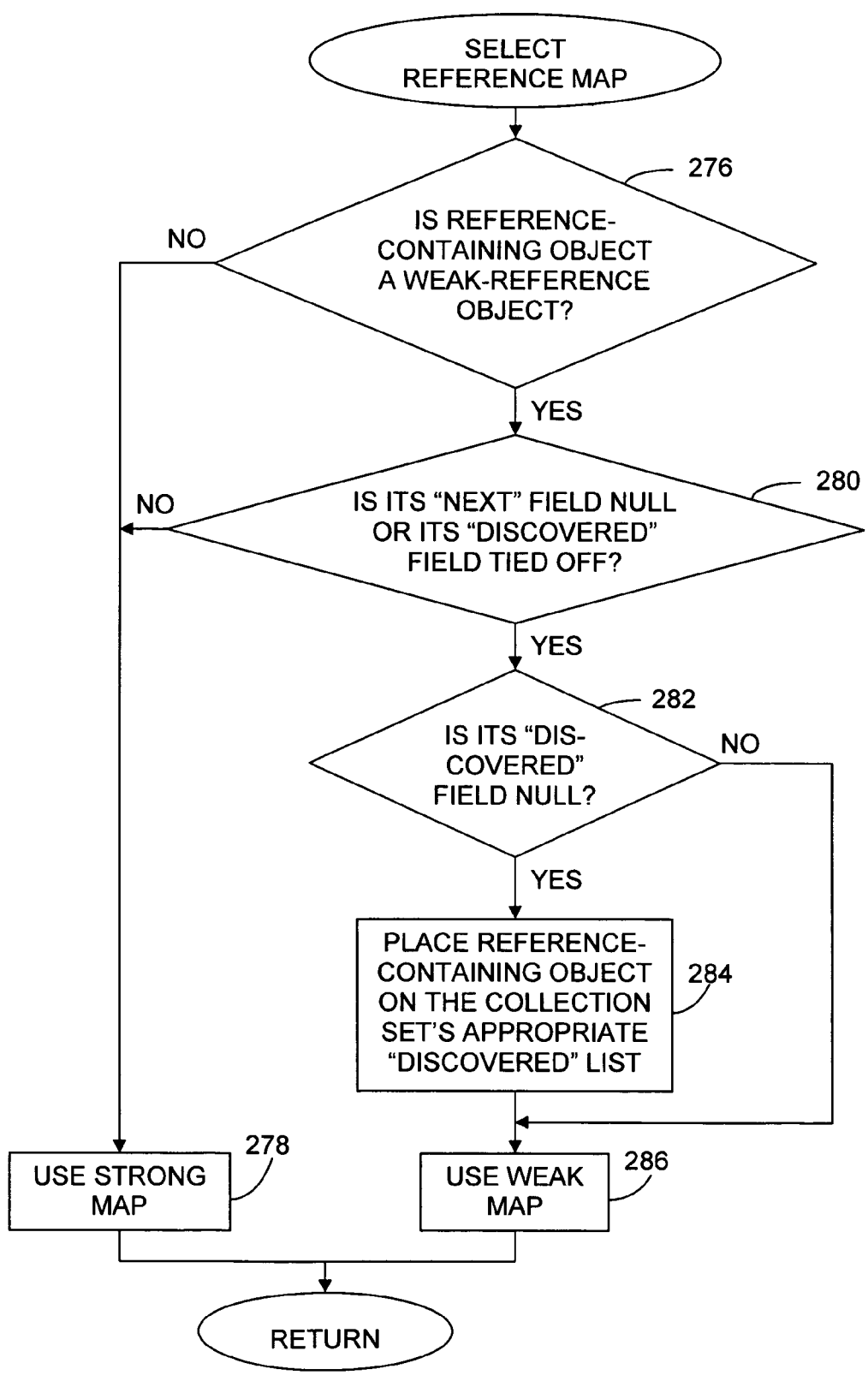
FIG. 20 is a flow chart of a routine for selecting a reference map to be used in identifying references.

So, to maintain that access through subsequent collections, a weak-reference object's Referent field is treated as containing a strong reference until the finalizing operation has been performed on that weak-reference object. In the case of an instance of the Reference class, therefore, the operation represented by FIG. 10's block 132 will need to include a determination of which reference map to employ. FIG. 20 is a flow chart of one routine that can be employed for this purpose. As blocks 276 and 278 indicate, the collector simply uses the strong map if the reference-containing object is not a weak-reference object. If it is a weak-reference object, though, the collector checks to determine, as block 280 indicates, whether that weak-reference object has already been enqueued and, for reasons that will be explained later, marked in a way that will be referred to below as being "tied off." If it has, the illustrated embodiment again employs the strong map. (As will be seen, some embodiments will instead employ the weak map in those circumstances but adapt weak-reference processing to preserve access to the guarded object.)

If a weak-reference object's Next field is NULL, on the other hand, then it is has not been enqueued, so the weak map should be employed: the contents of the Referent field should not be treated as a strong reference. That is, its processing should be postponed until the weak-reference-processing operation. If a weak reference's processing is thus to be postponed, though, the collector must ensure that the weak-reference-processing operation will include that reference. That will happen only if the weak-reference object containing it is discovered, i.e., only if the containing object has been placed on a list of weak-reference objects.

As block 282 indicates, the collector therefore determines whether the weak-reference object's Discovered field is NULL, i.e., whether the weak reference still needs to be placed in such a list. Most frequently, it does not; it will have been pre-discovered during card-table processing, and the block-282 test will have a negative result.

But some embodiments may perform pre-discovery only for weak references located in cars younger than the cars containing the objects to which the weak references refer. The rationale for thus limiting pre-discovery is that recording other references is unnecessary in most cases. If a car containing a reference is to be collected before the car containing the object to which that reference refers, there is no need to record the reference's location against that car, because that reference will no longer be in that location when the referred-to object comes up for collection. But an older, reference-containing car can be included in the same collection set as a younger car containing the referred-to object if the collector employs multiple-car collection sets. So, if pre-discovery is performed only for younger-car references, a weak-reference object containing a weak reference to a collection-set object may remain undiscovered until strong-reference processing occurs. In that case, the outcome of the test represented by block 282 can be affirmative: the Discovered field can have a NULL value.

As block 284 indicates, the collector therefore performs discovery on the weak-reference object: it employs the weak-reference object's Discovered field to place the weak-reference object in a linked list of weak-reference objects that are of the same strength and contain Referent fields that refer to locations in the collection set. In the illustrated embodiment, the lists employed for this purpose are collection-set-wide lists; unlike the weak-reference objects in the lists employed for pre-discovery, the weak-reference objects in these lists are not segregated in accordance with the cars that contain the objects they guard.

Now that the weak-reference object has been discovered—i.e., has been placed on the list of weak-reference objects that will be processed during a subsequent weak-reference-processing operation—the strong-reference-processing operation can safely skip processing the object's weak reference. That operation therefore selects the weak map, as block 286 indicates.

The strong-reference-processing operation may include discovery of weak-reference objects even if the collection set does not contain multiple cars. As was mentioned above, objects that are not located in the old generation may contain references to objects in the (old-generation) collection set, and the particular policies employed for those weak references may not include pre-discovery. As was explained above in connection with FIG. 8A's block 110, for instance, the collector may perform an exhaustive search of the (typically just-collected) young generation to find references to collection-set objects. In the process, it may find weak-reference objects. If it does, it may employ a routine similar to that of FIG. 20 to select the appropriate reference map and, in doing so, discover that weak-reference object, i.e., use that weak-reference object's Discovered field to place it into a linked list of discovered weak-reference objects whose Referent fields refer to collection-set locations. Weak-reference discovery may similarly occur during scanning of the basic root set.

As a consequence, the end of an old-generation collection set's strong-reference processing will in the illustrated embodiment find several lists of weak-reference objects whose Referent fields refer to collection-set locations. For each weak-reference strength, there is a list of whatever weak-reference objects of that strength have been discovered during strong-reference processing. Additionally associated with each strength is a separate pre-discovery list for each car in the collection set, as was explained above. In what we will refer to as a "gathering" operation, the illustrated embodiment combines the per-car pre-discovery lists for each strength with the collection-set-wide discovery list for that strength.

Figure 21A:
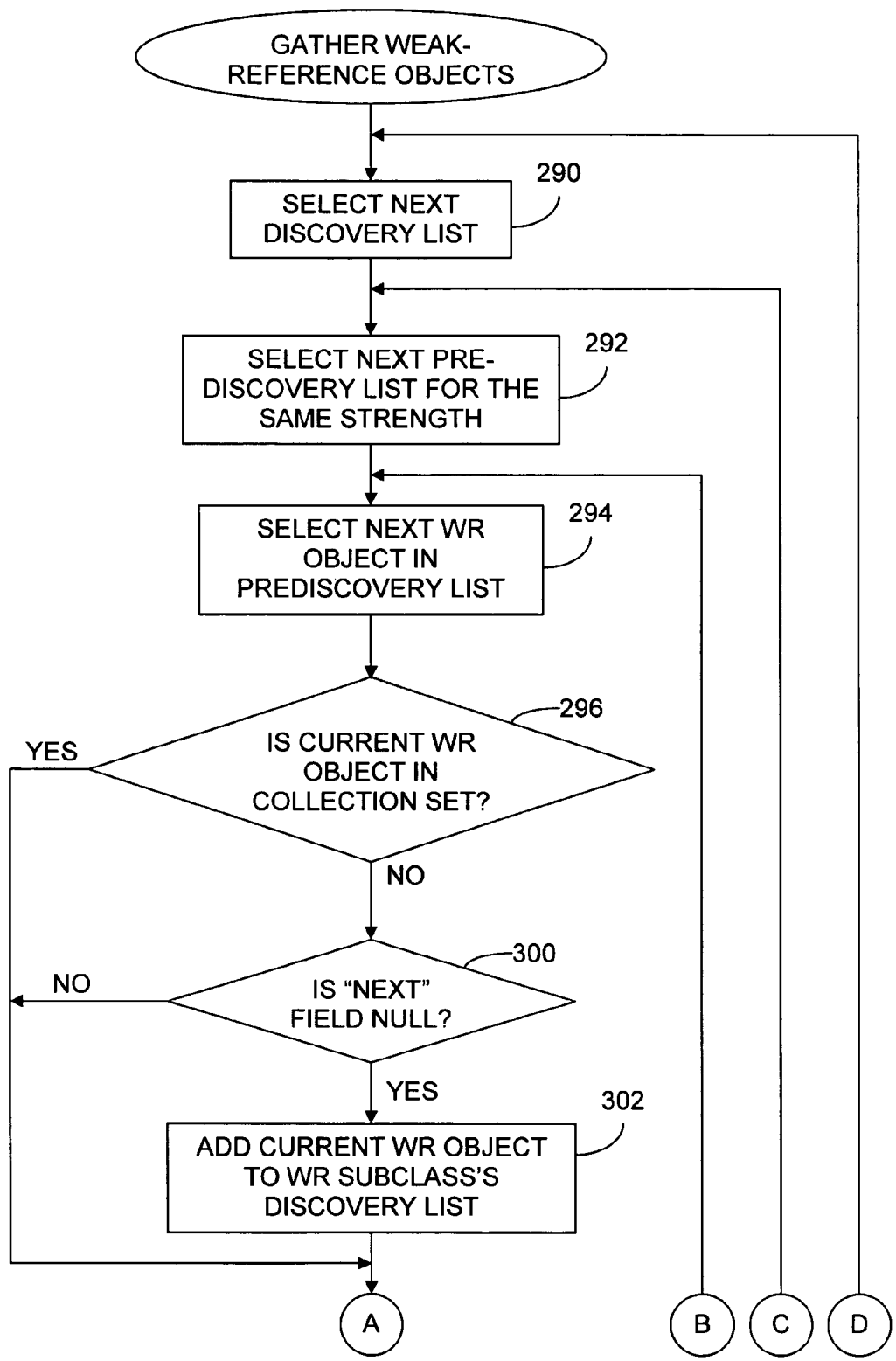
FIGS. 21A and 21B together form a flow chart of a routine for combining lists of weak references.
Figure 21B:
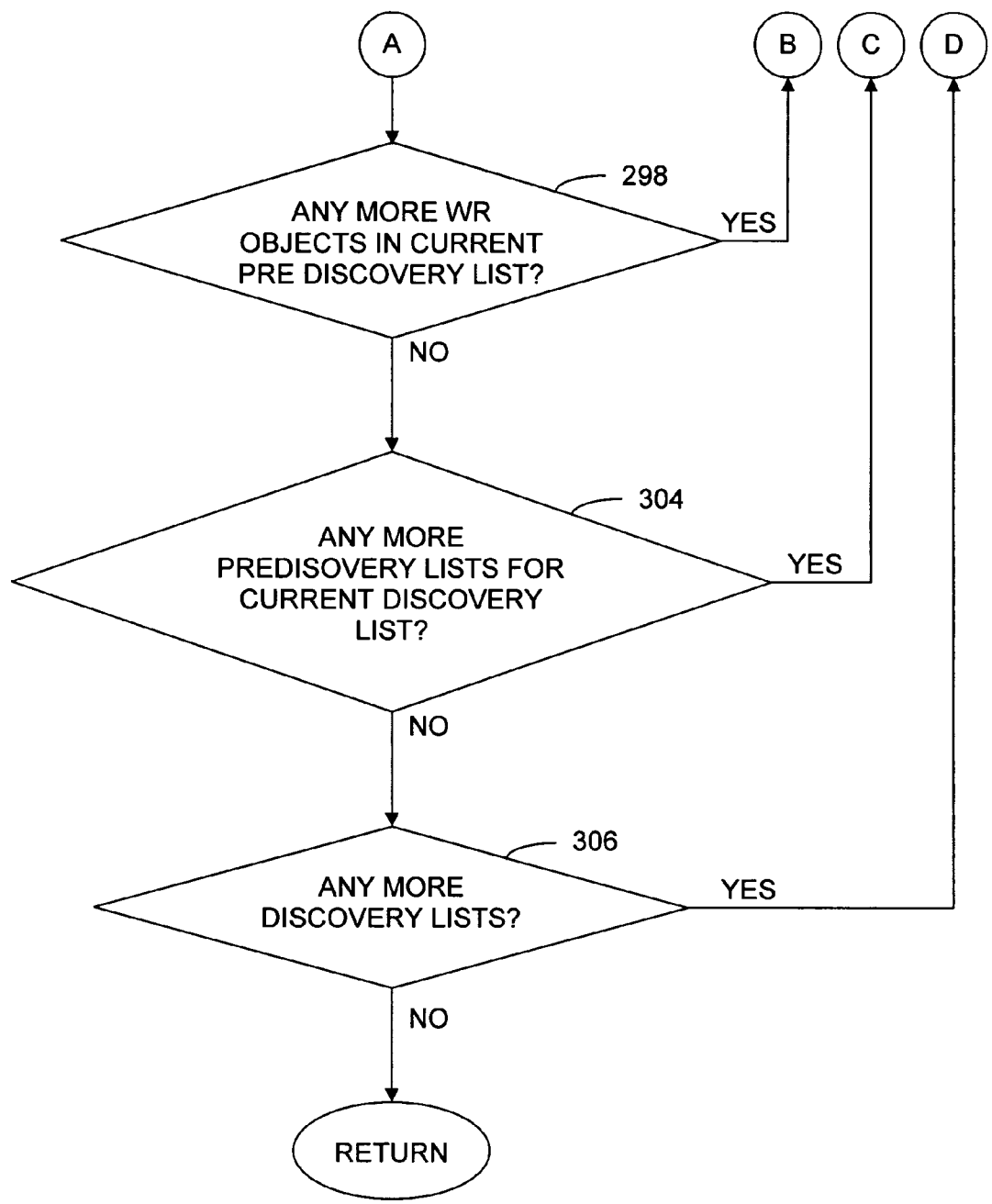

FIG. 21 depicts a routine that can be employed for this purpose. Block 290 represents selecting the discovery list associated with a given strength, and block 292 represents selecting one of the per-car discovery lists—which we will here refer to as "pre-discovery" lists—associated with that same strength. Block 294 represents selecting one of the (weak-reference) objects in that list, and block 296 represents determining whether that object is itself in the collection set. If it is, then it presumably is not reachable; it otherwise would have been evacuated during strong-reference processing. If it is not reachable, then there is no reason to process the reference in its Referent field. So there also is no reason to place that weak-reference object into the discovery list, which is the list of weak-reference objects that are to be so processed. As block 296 and FIG. 21B's block 298 indicate, therefore, the routine of FIG. 21 does not add such a weak-reference object to the discovery list; it merely proceeds to the next object in the pre-discovery list.

The test represented by block 296 instead yields a negative outcome if the current weak-reference object is indeed reachable. For a reachable weak-reference object, the FIG. 21 routine next checks the weak-reference object's Next field to determine whether the weak-reference object has already been enqueued. Block 300 represents performing this test. If the Next field is not NULL—i.e., if the weak-reference object has already been enqueued—then the value in that weak-reference object's Referent field should be treated as a strong reference, not as a weak reference, so it should not be placed on the discovery list, i.e., on the list of objects whose Referent fields will be subjected to weak-reference processing. Otherwise, as block 302 indicates, the weak-reference object is removed from the pre-discovery list and placed onto the discovery list for the Reference subclass to which the object belongs. That is, the contents of the weak-reference object's Discovered field are placed into the pre-discovery-list head, the contents of the discovery list head are placed into the weak-reference object's Discovered field, and the weak-reference object's address is placed into the discovery-list head.

As block 298 indicates, this continues until all of the weak-reference objects in the current pre-discovery list have been processed in this way. The collector then moves on to the next pre-discovery list for the current Reference subclass, as blocks 304 and 292 indicate. When processing has thus been completed for all of the current strength's pre-discovery lists, the collector moves on to the discovery list for the next subclass, as blocks 306 and 290 indicate. The routine returns when this operation has been performed for all four collection-set-wide discovery lists.

Figure 22A:
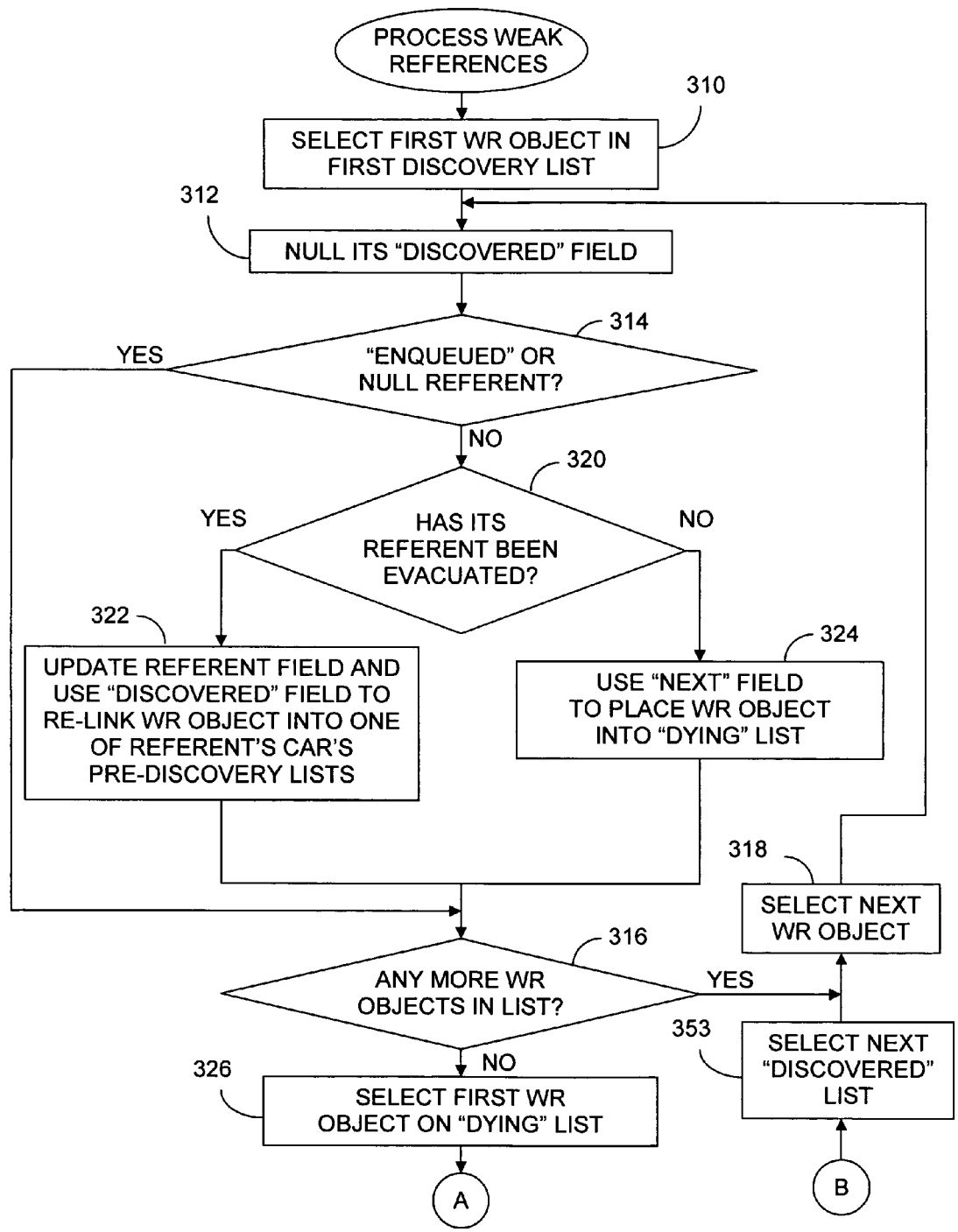
FIGS. 22A, 22B, and 22C together form a flow chart of a routine for processing weak references.
Figure 22B:
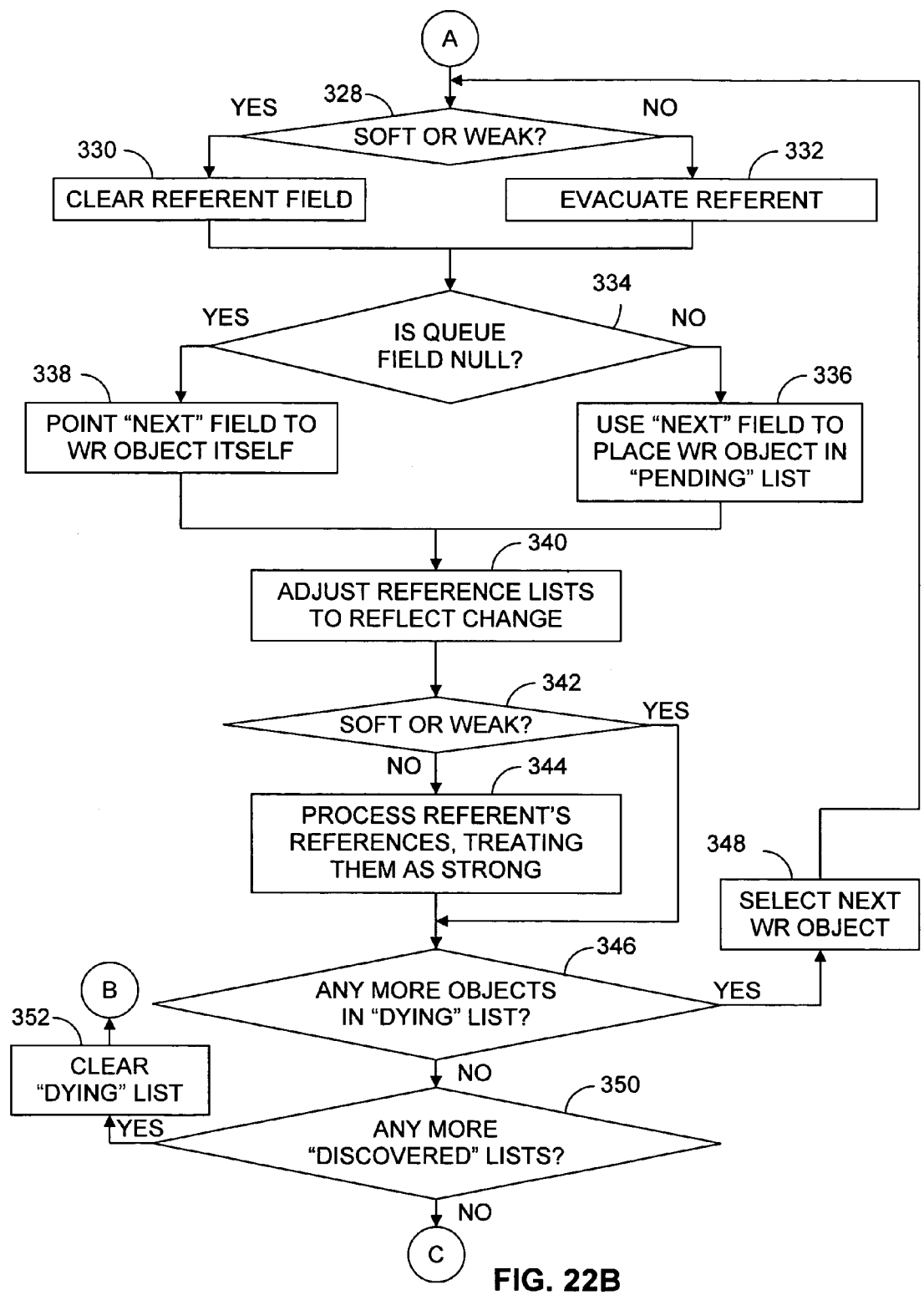
Figure 22C:
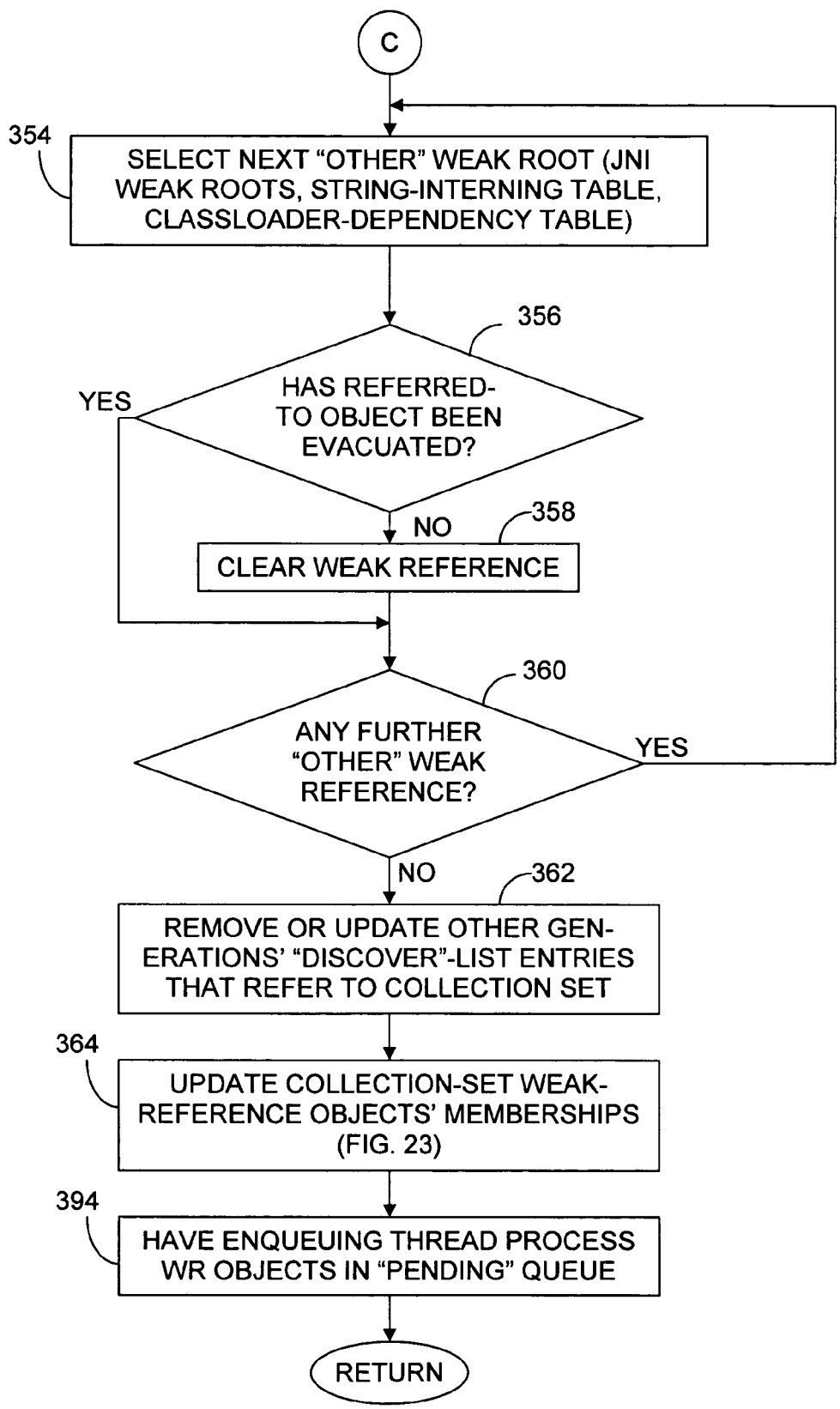

With the discovery lists thus supplemented with selected contents of the pre-discovery lists, the collector is ready to perform the actual weak-reference processing. FIGS. 22A through 22C (together, "FIG. 22") depict in more detail the weak-reference processing of which FIG. 17 gives an overview. The operation of FIG. 22 processes the weak-reference objects in each of the four discovery lists, and block 310 represents selecting the first object in the first of those lists, namely, the one associated with the SoftReference list, and reading the contents of that object's Discovered field to identify the next weak-reference object on the list. The Discovered field's contents having now fulfilled their function, the collector sets their value to NULL, as block 312 indicates. Since the guarded object will in some cases be evacuated to a different car, that field may eventually be used again, to place the weak-reference object in that car's list of weak references to objects contained in that car. In the case of a SoftReference object or a WeakReference object, that field will remain NULL; as will be seen, the object's Referent field will be cleared, so the weak-reference object will no longer be guarding any object.

If the weak-reference object guards no object, no weak-reference processing needs to be done to it. Also, if the weak-reference object's Next field has a non-NULL value, the contents of the weak-reference object's Referent field should not be considered weak. As blocks 314, 316, and 318 indicate, the routine therefore simply proceeds to the next weak-reference object on the list in both cases.

As block 320 indicates, the collector otherwise determines whether the location identified by the weak-reference object's Referent field contains an indication that the object originally located there has been evacuated. If it has, the referred-to object is not dying, so the weak reference to it does not yet need weak-reference processing. But the weak-reference object's Referent field needs to be updated to point to the guarded object's new location, and that weak-reference object needs to be placed into one of the new car's pre-discovery lists. Block 322 represents thus updating the weak-reference object's Referent, Discovered, and Previous fields in accordance with the guarded object's new location. If the guarded object has not been evacuated, on the other hand, then it is dying, so the reference should be subjected to weak-reference processing. Block 324 represents therefore placing the weak-reference object on a "dying" list, i.e., on a list of weak-reference objects that guard dying objects.

As block 316 indicates, this continues until no more objects remain in the current discovery list. When that list has been exhausted, the collector turns to processing the weak-reference objects in the "dying" list that it has just produced.

As was mentioned above, the type of processing required by a weak reference to a dying object depends on the class to which the weak-reference object belongs. If the weak-reference object is of the SoftReference or WeakReference class or any of their subclasses, its referent field is cleared, as blocks 328 and 330 indicate. As block 332 indicates, the referred-to object is otherwise evacuated because, at least in the case of the FinalReference class, enqueuing the weak-reference object may result in post-mortem processing that will depend on the guarded object's contents. This possible evacuation is why the illustrated embodiment employs the intermediate operation of placing on a "dying" list the weak-reference objects whose Referent fields refer to dying objects. If two weak-reference objects of the same strength refer to the same object, immediately processing the first weak-reference object could result in the referred-to object's evacuation, which in turn could cause the second weak-reference object's being found in the block 320 step not to require processing. Placing the weak-reference objects on the "dying" list until all same-strength objects have been considered prevents such a result. As block 334 indicates, the collector then determines whether the weak-reference object's Queue field is NULL. If it is not, that field identifies a post-mortem-processing queue into which the weak-reference object should be placed, and the weak-reference object's Next field is employed for this purpose. But block 336 does not represent enqueuing the weak-reference object immediately. For synchronization reasons not important here, it may be more convenient to place that object initially into a linked list of weak-reference objects that need to be enqueued. Block 336 represents using the weak-reference object's Next field for that purpose.

If the block-334 test instead determines that the Queue field's value is NULL, then there is no queue to which the weak-reference object needs to be added. To distinguish weak-reference objects that have not yet reached the enqueuing step from those that have reached it but have not needed enqueuing, the collector places in the weak-reference object's Next field a pointer to the weak-reference object itself, as block 338 indicates, rather than give it, say, a NULL value.

Thus "enqueuing" the weak-reference object converts the reference contained in its Referent field from one that should be treated weakly to one that should be treated strongly, and this should therefore have an effect on any lists to which it belongs. The nature of the resultant necessary adjustment will depend on where the weak reference is located. (Although the evacuation, if any, of the guarded object will have resulted in its remaining in the old generation, the weak-reference object guarding it may not be in that generation.) In the particular case in which the weak-reference object is located in the old generation, the Next field's value change is an old-generation reference modification, so it has to be recorded in the manner used by that generation for such purposes. In particular, the card-table entry associated with the card containing that weak-reference object (in the case of so-called imprecise card marking) or with the card containing its Referent field (in the case of so-called precise card marking) must be marked dirty so that subsequent card-table processing will add the location of the weak-reference object's Referent field to the remembered set of the card that contains the guarded object. Block 340 represents doing so.

If the guarded object has been evacuated in the step represented by block 332 to keep it accessible for post-mortem processing, then any "follower", i.e., any collection-set object referred to by a reference in the guarded object or in any other follower—should be kept accessible, too. As was indicated in connection with block 330, this is not an issue in the case of weak-reference objects that belong to the SoftReference or WeakReference class. So, as blocks 342 and 344 indicate, the collector evacuates followers only of evacuated objects guarded by weak-reference objects of the other two classes. For this purpose, all of the guarded objects' Referent fields are treated as containing strong references.

As blocks 346 and 348 indicate, this operation of performing any necessary evacuation and enqueuing is repeated for all objects on the "dying" list. As blocks 350, 352, and 353 indicate, the "dying" list is then cleared if any discovery lists remain, and the "dying" list is again populated from the next discovery list. When the operations of thus populating the "dying" list and processing the weak-reference objects in that list have been completed, the collector processes any other weak references, as was mentioned above in connection with FIG. 17's blocks 242 and 244. As FIG. 22's blocks 354, 356, 358, and 360 indicate, that is, the collector clears any such references whose referred-to objects have not been evacuated from the collection set.

Figure 23A:
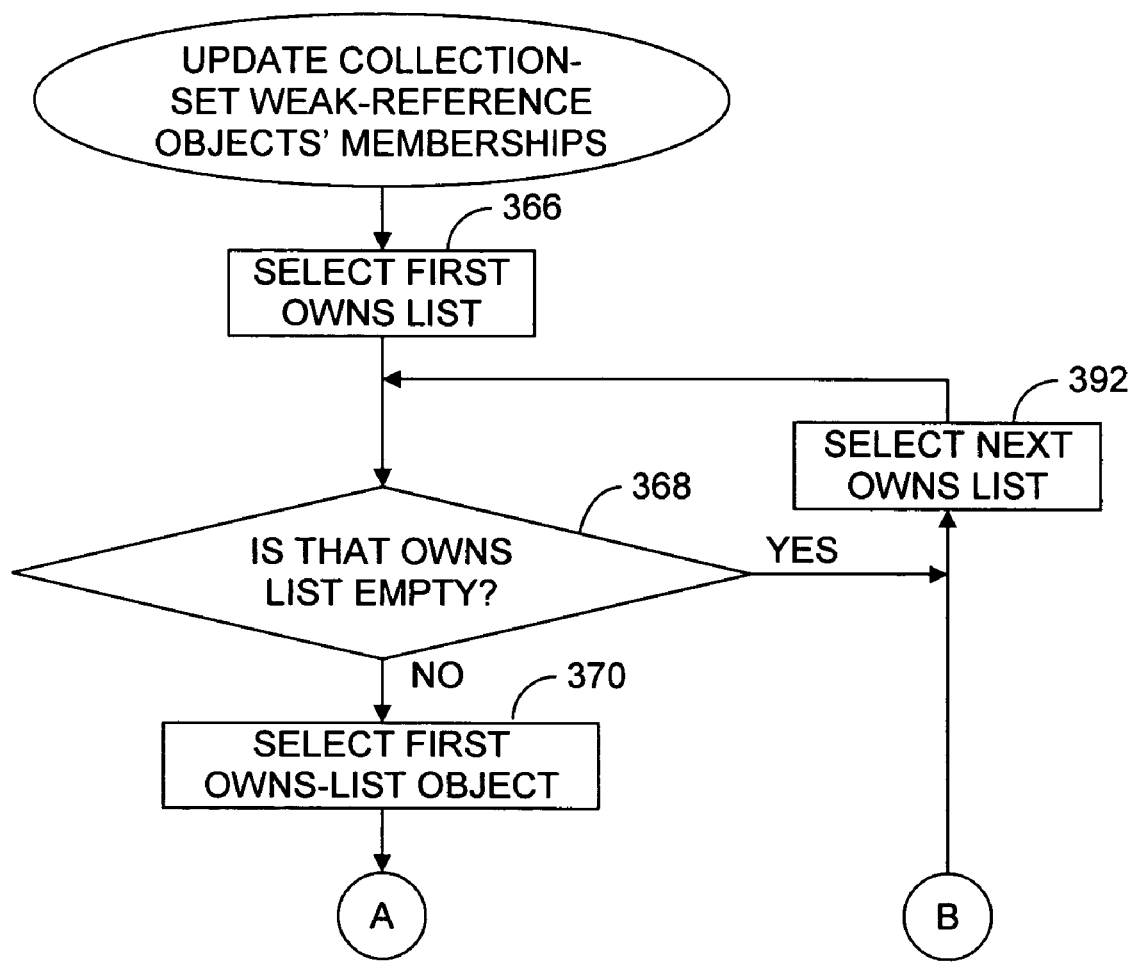
FIGS. 23A and 23B together form a flow chart of a routine for updating weak-reference objects' memberships in various lists to which they belong.
Figure 23B:
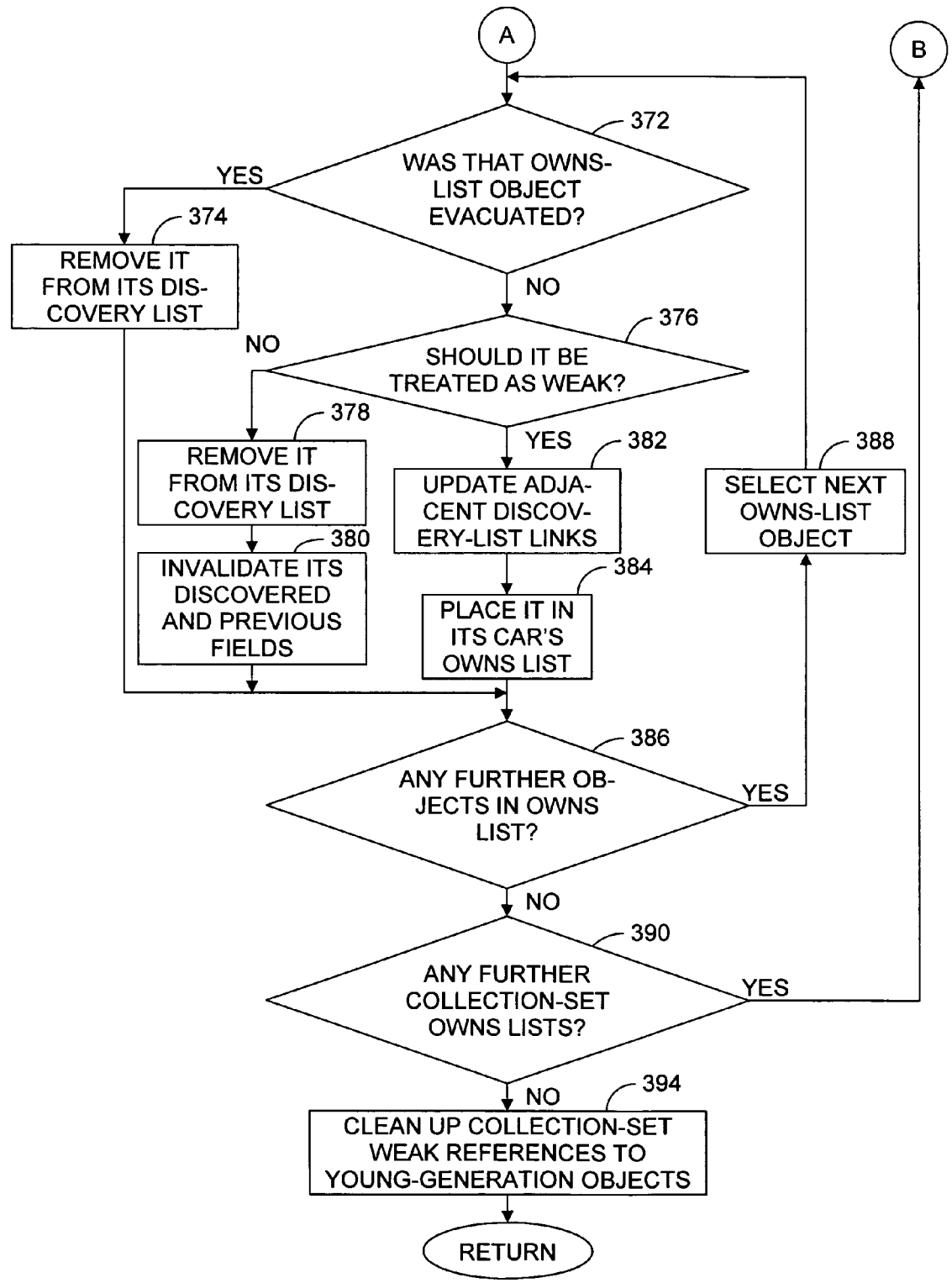

Before the collection set is actually reclaimed, any non-collection-set cars' discovery lists that include unevacuated—and therefore unreachable—weak-reference objects located in the collection set should be changed so that their links no longer point to those unreachable objects. And non-collection-set cars' discovery lists that include evacuated weak-reference objects should be changed so that their links point to those objects' new locations. Moreover, those evacuated objects may need to be added to their new cars' Owns lists. Block 364 represents doing so, and FIGS. 23A and 23B (together, "FIG. 23") depict that operation in more detail.

Some embodiments may inspect the entire collection set to find its weak-reference objects for this purpose. As was mentioned above, though, each collection-set car's metadata in the illustrated embodiment include a field that serves as the root of an Owns list, i.e., as the root of a linked list threaded through the Owns fields of all the weak-reference objects that reside in that car and have Referent fields that refer to mature-generation objects. The illustrated embodiment can therefore use the collection-set cars' Owns lists for most of that Discovered-list updating, as will now be explained.

A perusal of the just-described strong- and weak-reference processing reveals that it does not affect the Owns lists' links; although some weak-reference objects residing in the collection set may have been evacuated, the erstwhile Owns fields in the collection-set locations that they occupied still contain the same contents, because the evacuation operation changes only the header field that receives the forwarding pointer. So each collection-set car's Owns list can still be traversed to find each collection-set location where a weak-reference object that refers weakly to a mature-generation object resided when the collection interval started. The collector performs that Owns-list traversal to remove unreachable objects from their discovery lists and to update the reachable (and therefore evacuated) weak-reference objects' memberships in Discovered lists and Owns lists.

To this end, the collector starts with the first car's Owns field, as FIG. 23's block 366 indicates. As block 368 indicates, the collector determines whether that field's contents are non-NULL, i.e., whether that car contained any weak-reference objects whose Referent fields refer to mature-generation objects. If it did, the collector considers the Owns list's first object, as block 370 indicates. Block 372 represents inspecting that location to determine whether the (weak-reference) object that occupied it has been evacuated. If it has not, it is unreachable, so it should be removed from the discovery list to which it belongs, at least if that discovery list is associated with a non-collection-set region. Block 374 represents that removal operation.

Since the illustrated embodiment's discovery lists are double-threaded, i.e., are threaded in respective opposite directions through the member objects' Discovered and Previous fields, the removal operation in that embodiment is performed in two relatively inexpensive steps.

In the first step, the collector places the contents of the unreachable object's Discovered field into the Discovered field of the object or car-metadata structure that the unreachable object's Previous field identifies. To distinguish between a Previous field that identifies another weak-reference object and one that instead identifies a car's metadata structure—and thereby enable the thread performing the removal operation to infer the proper Discovered-field offset—the illustrated embodiment takes advantage of object alignment, i.e., of the fact that the least-significant bits of all object- and metadata-structures are always zeros in that embodiment. Specifically, the least-significant bit of the identified structure's address is replaced in the Previous field with a $1_2$ if that structure is a car's metadata structure rather than another weak-reference object.

In the second step, if the contents of the unreachable object's Discovered field are non-NULL, it places the Previous field's contents into the Previous field of the object that the Discovered field identifies.

Of course, the Previous field is not necessary, so some embodiments may dispense with it; in such embodiments the collector could still find the desired objects by tracing all of the discovery lists. Since that could be quite time-consuming, though, the illustrated embodiment avoids such tracing by using the Previous field for double threading. Still, double threading does add to discovery cost, so the illustrated embodiment, too, dispenses with double threading in certain circumstances.

One such circumstance involves mature-generation weak-reference objects whose Referent fields refer to objects in the young generation rather than in the mature generation. To understand why, it helps to consider an overview of the illustrated embodiment's general approach to discovery lists.

All of the previously discussed individual-car discovery lists can be thought of as constituents of one higher-level discovery list among several such lists, each of which has a potentially different respective format and is subject to potentially respective policies. The illustrated embodiment can be thought of as maintaining a respective such high-level discovery list for each pair (A, B) consisting of an object domain A and a weak-reference domain B, where the object domains are the generations and where the weak-reference domains are the generations as well as extra-heap root sources such as the call stacks. Each high-level discovery list includes the weak references in domain B to objects in domain A, and the high-level list of which the above-described individual-car discovery lists are constituents is the one for which domains A and B are both the mature generation.

As was explained above, the format policy for that high-level discovery list is that it comprises individual-car discovery lists; each individual-car discovery list is a linked list whose members are restricted to mature generation weak-reference objects that refer to objects in the car with which that list is associated. The reason for this policy is that the mature generation tends to be relatively large, and the weak-reference-processing phase could therefore be too time-consuming if it included traversing mature-generation weak-reference lists that are not so restricted. The illustrated embodiment saves time by traversing the individual-car discovery list only for cars in the collection set to process dying collection-set objects weakly referred to from mature-generation weak-reference objects.

But this savings would be greatly compromised if, to update Discovered-list memberships for the collection set's weak-reference objects after having thus dealt with the collection set's dying objects, the collector had to traverse the individual-car discovery lists for all of the mature generation's cars. The illustrated embodiment avoids this to an extent by using the above-discussed Owns-list expedient, but that alone does not take care of the problem; if the Referent field of a weak-reference object in that list is NULL (because it had referred to a dying object in a previous collection set), the only way to identify the car from whose discovery list that weak-reference object needed to be removed would be, in the absence of the illustrated embodiment's double threading, to traverse potentially all of the individual-car lists. It is for this reason that the illustrated embodiment employs that double threading.

But considerations are different for weak-reference objects that belong to other high-level discovery lists. For example, consider those on the discovery list consisting of the mature-generation weak-reference objects whose Referent fields refer to young-generation objects rather than old-generation ones. There ordinarily are very few such objects, so the illustrated embodiment implements that discovery list as a single linked list. To update the Discovered-list memberships of all weak-reference objects that began the collection increment in the collection set, the collection-set members of this high-level discovery list have to be considered along with those on the collection set's Owns lists, i.e., along with the collection-set weak-reference objects whose Referent fields refer to mature-generation objects.

To that end, the collector traverses the single linked list of mature-generation weak-reference objects whose Referent fields refer to young-generation objects. That is, it traverses a high-level discovery list rather than Owns lists associated with the collection-set cars. Although this list is not restricted to weak-reference objects that were located in the collection set, its traversal is rarely expensive, since it is almost always quite short. And, when a member of that list is encountered that remains in the collection set and should therefore be removed from the discovery list to which it belongs, the collector can do so readily without using a Previous field, since the weak-reference object to be removed was encountered in the process of traversing the list from which the removal is to occur. The illustrated embodiment therefore only single-threads that discovery list, through its members' Discovered fields.

We digress at this point to note that some aspects of the techniques that the illustrated embodiment employs for Reference-class's objects are also applicable to dealing with other weak references. For example, consider a string-interning table. As is well known to those skilled in the art, a string-interning table is a table of string structures so arranged that no two of its string structures have the same value. It is usually implemented as a chained hash table: for each of a plurality of values to which strings can be hashed, it includes a respective linked list of "bucket" structures of which each contains a reference to a string that hashes to the value associated with the bucket's linked list.

When a reference to a string in the heap is to be "interned," i.e., to be set to refer to a common, canonical instance of a string having that string's value, the collector searches the interning table for a bucket whose reference refers to a string structure whose string value is the same as that of the one referred to by the reference being interned. If such a bucket is found, the reference being interned is redirected to the string to which the bucket's contents refer. If no such bucket is found, one is added to the appropriate linked list, and its contents refer to the string to which the reference being interned refers.

The string reference in an interning table's bucket is weak: the string to which it refers needs to be retained only so long as some other, strong reference refers to it. If a string remains unevacuated in the collection set when the collection routine reaches the loop that FIG. 22C depicts, the interning table's weak reference to it should, as block 358 indicates, be cleared. The way in which this would conventionally be handled would be to traverse the entire interning table to locate any of its weak references that refer to collection-set objects, update any such references whose referents were evacuated, clear those whose referents were not, and possibly unlink such cleared references' buckets.

The illustrated embodiment avoids such a whole-table traversal. In addition to maintaining for each car a discovery list of mature-generation objects that potentially contain references to objects in that car, the illustrated embodiment maintains for each car another discovery list, this one being a linked list of interning-table buckets whose weak references refer to that car's strings. (It also maintains such a bucket-discovery list for the young generation as a whole.) Whenever an interning-table bucket's referent field becomes directed to a mature-generation string, the collector adds that bucket to the bucket-discovery list maintained for the car in which that string resides. And, when an interned string is evacuated from the collection set into another car section, the bucket containing the weak reference to that string is re-linked into the new car's bucket list. Then, when the collector needs to clear or update the interning table's weak references to collection-set strings; it can simply traverse the collection-set cars' bucket-discovery lists; it avoids the need for a whole-table traversal.

We now return to the clean-up operation that FIG. 23 depicts. Although the discussion so far has dealt with weak-reference objects that have not been evacuated, i.e., with unreachable weak-reference objects, the block-372 test may instead determine that the Owns-list object currently under consideration has indeed been evacuated. Now, it sometimes happens that such a weak-reference object's Referent field refers to an object that was found to be dying in a previous collection and the weak-reference object has therefore been enqueued and possibly processed. If so, its Referent field should no longer be treated as weak, and the weak-reference object should therefore be removed from the discovery list to which it belonged. As blocks 376 and 378 indicate, the collector therefore determines whether the weak-reference object should still be treated as weak. If it should not, the collector removes it as before from its discovery list. As block 380 indicates, the collector may also, for reasons that will be explained in due course, "tie off" its Discovered and Previous fields by setting them to a distinguished value, say, −1, that distinguishes them both from the value (NULL) they had before discovery and from any value that could point to another weak-reference object.

If the weak-reference object should still be treated as weak, on the other hand, the link fields of the objects logically adjacent to it in its discovery list need to be updated to reflect that object's new location. That is, the Discovered field of the weak-reference object or metadata structure that precedes that object in the discovery list needs to be updated with that object's new location, as does the Previous field of any object that succeeds it. Block 382 represents performing those updates. Additionally, the evacuated weak-reference object needs to be placed in its new car's Owns list, as block 384 indicates.

As blocks 386, 388, 390, and 392 indicate, the collector repeats this operation for each object in each Owns list associated with a collection-set car, and, as block 394 indicates, it additionally performs the above-mentioned related operation for collection-set weak-reference objects in the other high-level discovery list, i.e., in the discovery list in which the members are mature-generation weak-reference objects whose Referent fields refer to young-generation objects.

Having thus updated the weak-reference objects' memberships, the collector arranges, as FIG. 22C's block 394 indicates, for the enqueuing of the weak-reference objects that were identified as needing to be enqueued. As was mentioned above, this operation is typically performed by a separate thread, one that may, for instance, operate concurrently with the mutator. This completes weak-reference processing.

However, the reference-evacuation operation that FIG. 22B's block 332 represents requires further discussion, because it may differ from the type of evacuation that the collector performs for most strong-reference objects. As was mentioned above, the collector usually places evacuated objects in trains that references to them occupy. This is ordinarily beneficial, because it tends to concentrate a garbage data structure within a single train. But I have recognized that it is not as beneficial when the object is being evacuated in response to a reference in a weak-reference object's Referent field.

Figure 24A:
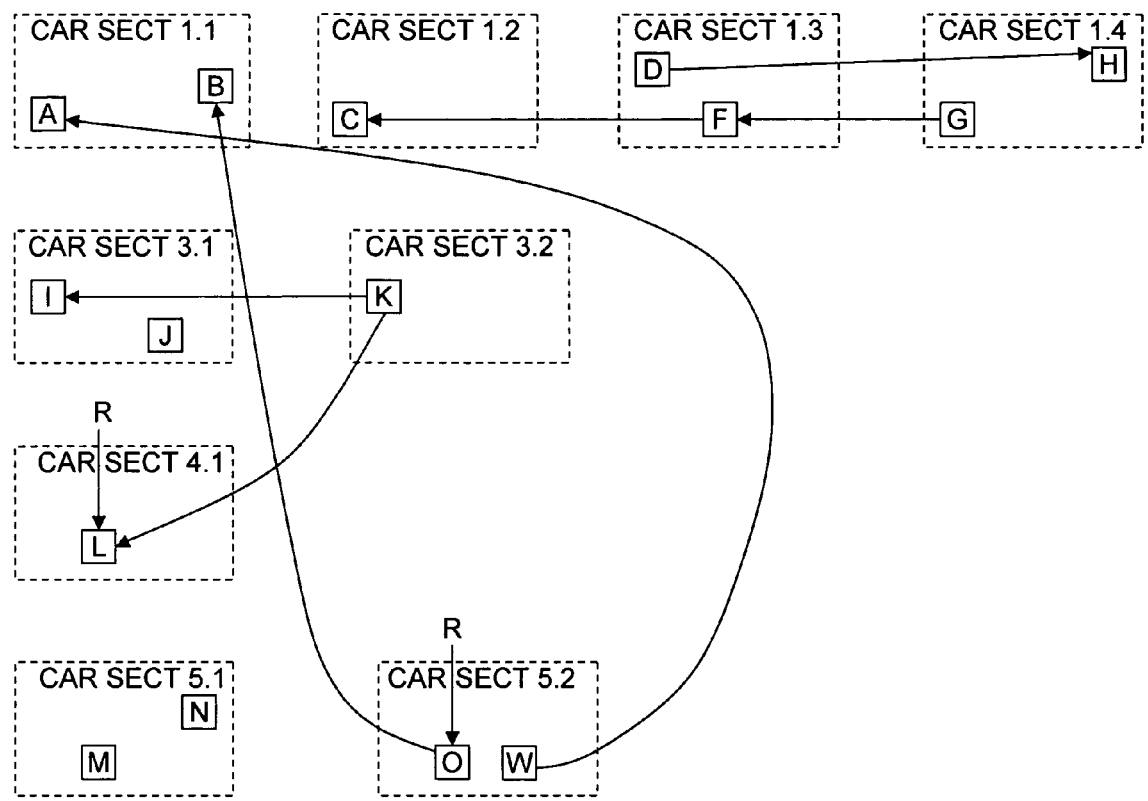
FIGS. 24A and 24B are diagrams that illustrate the type of evacuation that the illustrated embodiment performs for some dying objects.

To appreciate why, consider the situation that FIG. 24A depicts. Each row of car sections represents a different train, the top row representing the oldest train, and the leftmost rectangle in the top row representing the oldest, collection-set car. (For the sake of simplicity, we will assume a single-car collection set.) The collection set contains two objects, objects A and B. A strong reference in object O refers to object B, so that object should be evacuated. It will typically be evacuated to object O's train. This occurs during strong-reference processing.

In the case of the other collection-set object, on the other hand, the sole reference to it is a weak reference, in object W. Let us assume that object W's class requires that an object referred to by its weak reference be evacuated. Conventionally, object A would therefore be evacuated to a car in object W's train.

But recall that, because object W is recognized during weak-reference processing as referring to a dying object, it will be placed on a queue of objects to be subjected to post-mortem processing—processing that will probably take place concurrently with mutator operation and that will likely cause object W's Referent field to be cleared relatively soon. So object A will probably soon become garbage. Conventionally, though, its memory space would not be reclaimed until collection reaches the fourth-row train.

Figure 24B:
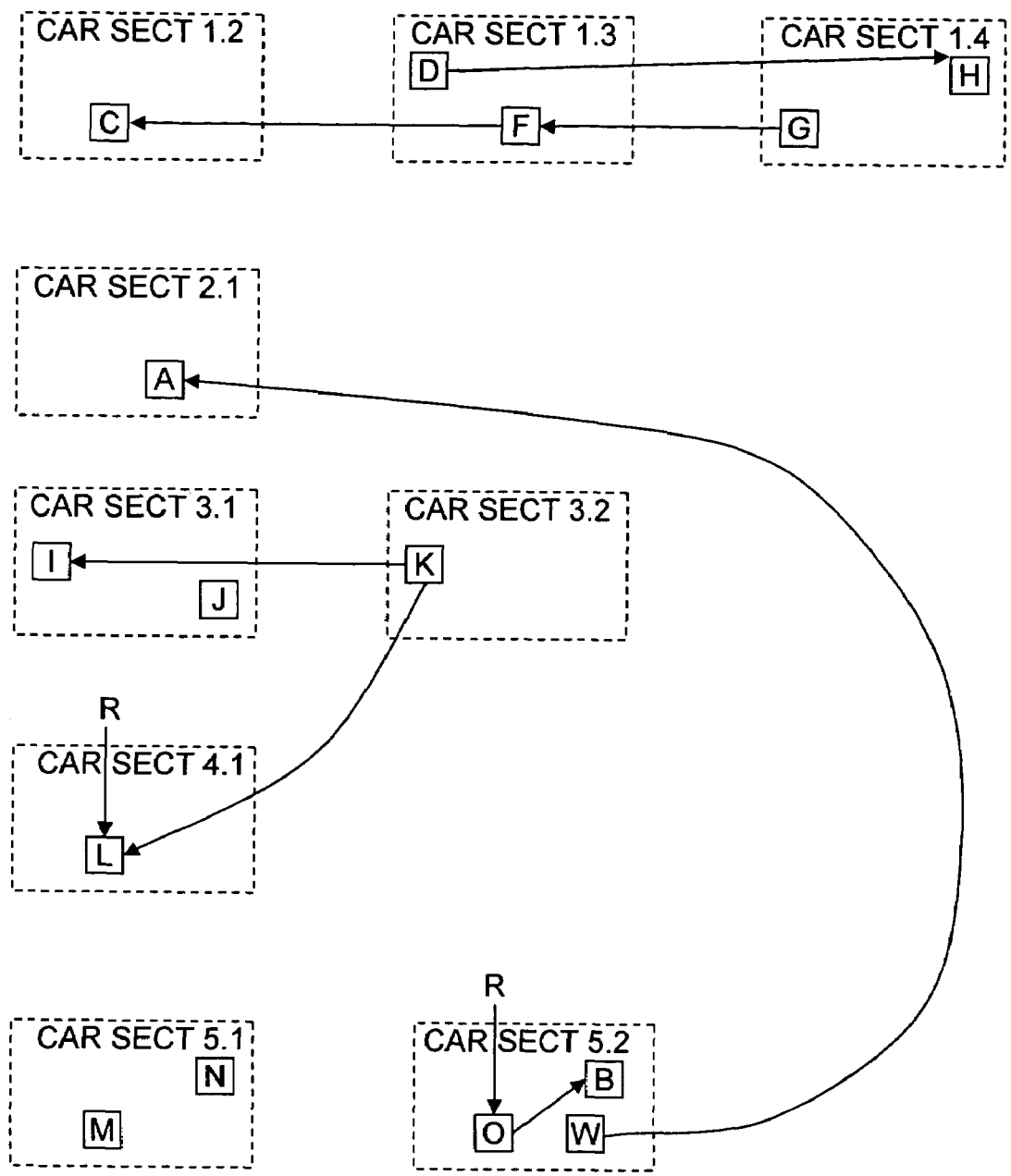
Figure 29:
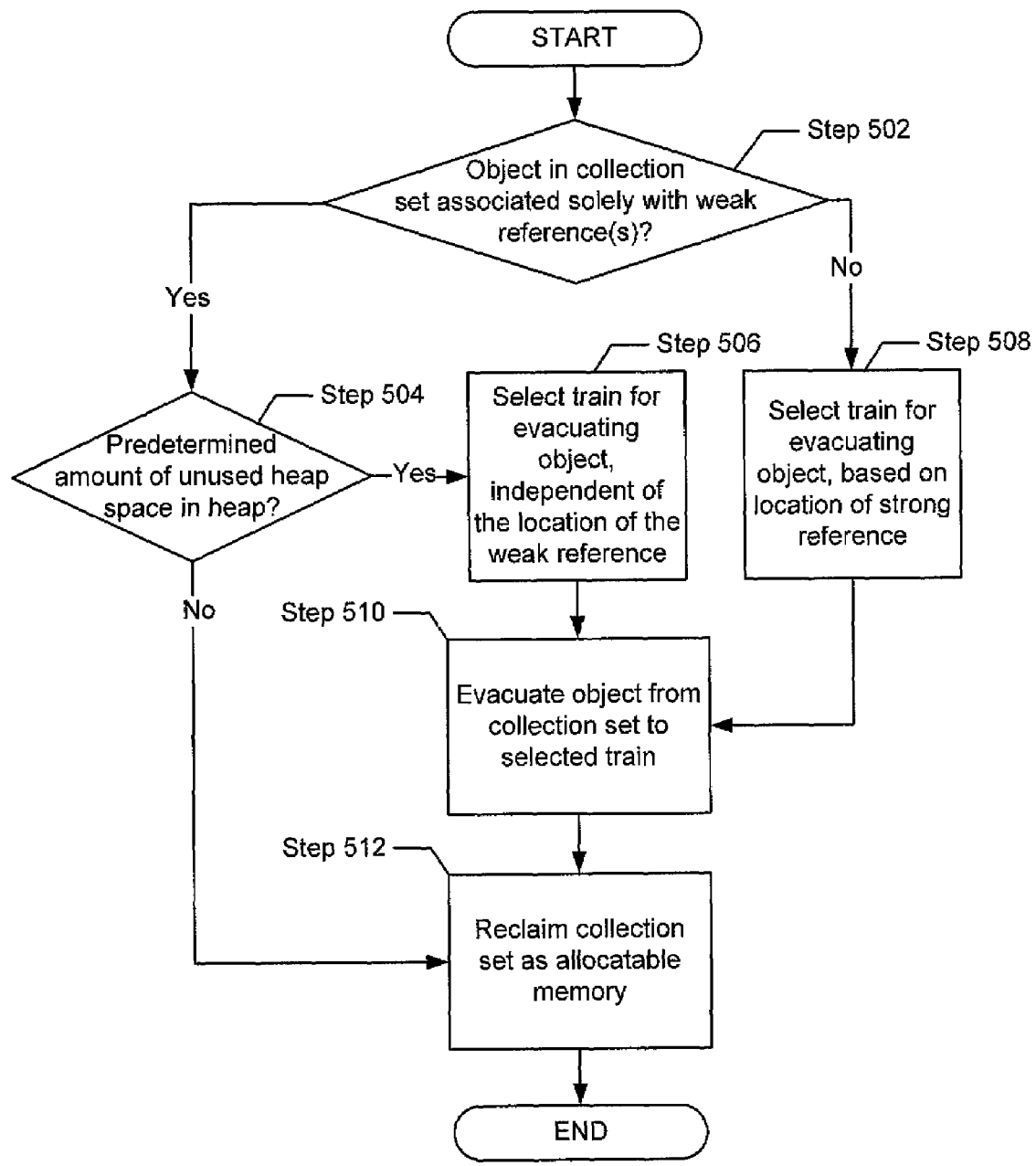
FIG. 29 is a flowchart depicting reclamation of a collection set associated with weak or strong references.

In contrast, when embodiments of the present invention evacuate dying objects in response to weak references to them, they at least sometimes place them independently of the reference's location, as FIG. 24B and FIG. 29, Steps 506 & 510 illustrate. (It is convenient to refer to such references as weak even though, as was explained above, there is a sense in which they can be described as being treated as strong when their referents have been found to be dying.) To cause its early collection, the collector could evacuate the dying object to any available car in, say, the first train. In the illustrated embodiment, though, a special, dying object train is inserted into the collection order near the front. In FIG. 24B the special, dying-object train is shown as the second-row train, and object A has been evacuated to it. This is so even though the weak reference in response to which the evacuation occurred is located in what in FIG. 24B has become the fifth-row train. By judiciously selecting the current dying-object train's position in the collection order, the probability that all of its contents will have "died" by the time the train comes up for collection can be made quite high and their collection can therefore be made quite efficient.

Figure 9:
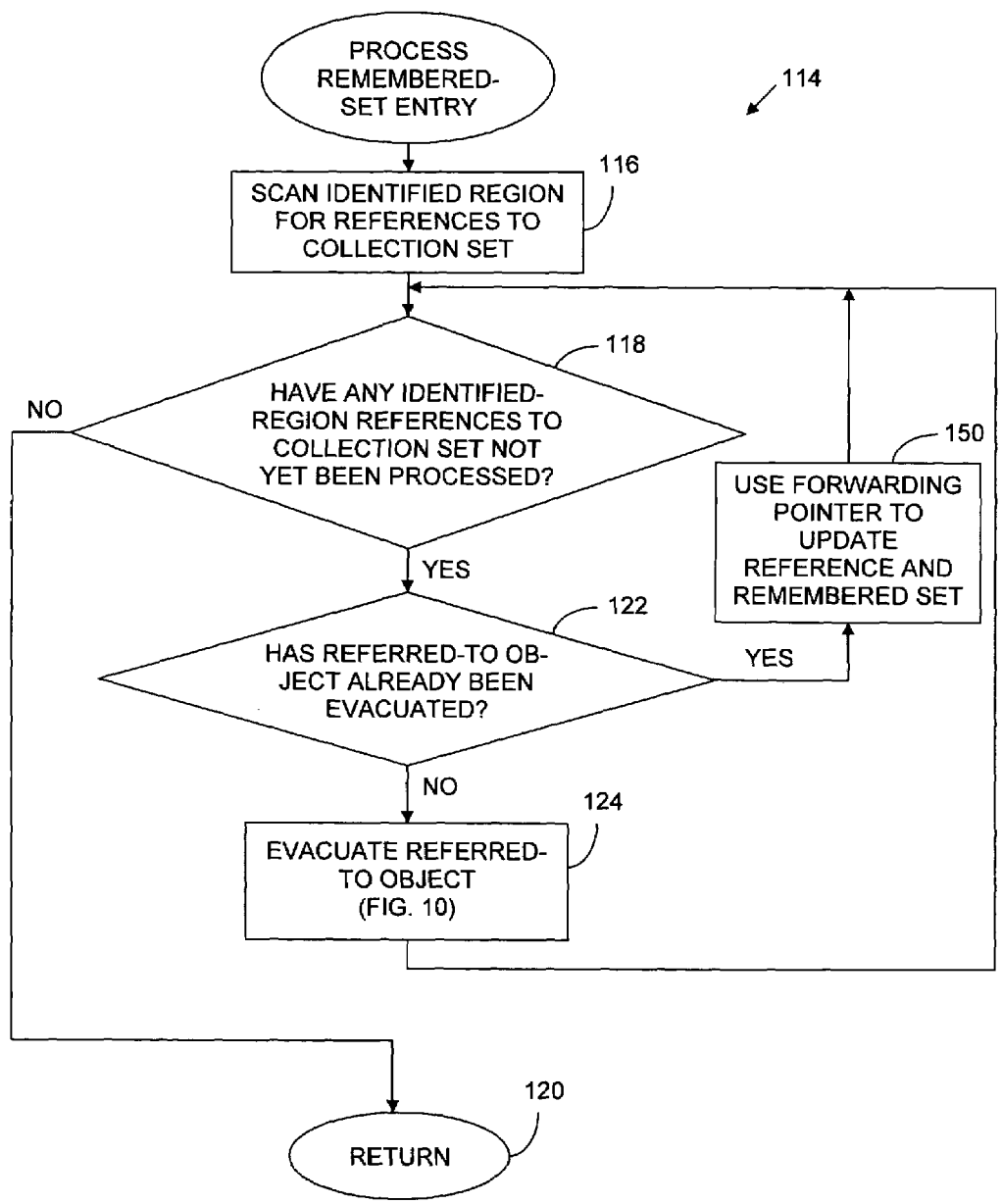
FIG. 9, discussed above, is a flow chart that illustrates in more detail the remembered-set processing included in FIG. 8A.

Reflection reveals that the same considerations can apply during strong-reference processing when the object-evacuation step represented by FIG. 9's block 124 is performed. As was mentioned above, weak-reference objects' Referent fields are sometimes treated as strong references when the containing weak-reference object has already been enqueued. So the evacuation operation performed by the illustrated embodiment actually differs slightly from the one that FIG. 10 depicts. Rather than always moving the object to the reference's train, as FIG. 10's block 128 indicates, the illustrated embodiment actually tests the reference-containing object to determine whether it has been enqueued. If it has, the location to which the referred-to object is evacuated will be independent of the reference's location. In particular, the referred-to object will be evacuated to the dying-object train.

Other embodiments may achieve a similar result in a different manner. One way of doing so, for instance, is to perform strong-reference processing in two phases. The first phase, which involves normal evacuation, would be carried out as part of a strong-reference-processing operation similar to the one described above. The second phase, which involves evacuation to the dying-object train, would be performed as part of the gathering operation. To implement such an approach, the reference-map-selection operation that the collector uses during strong-reference processing may be of the type that FIG. 25 depicts.

Figure 25:
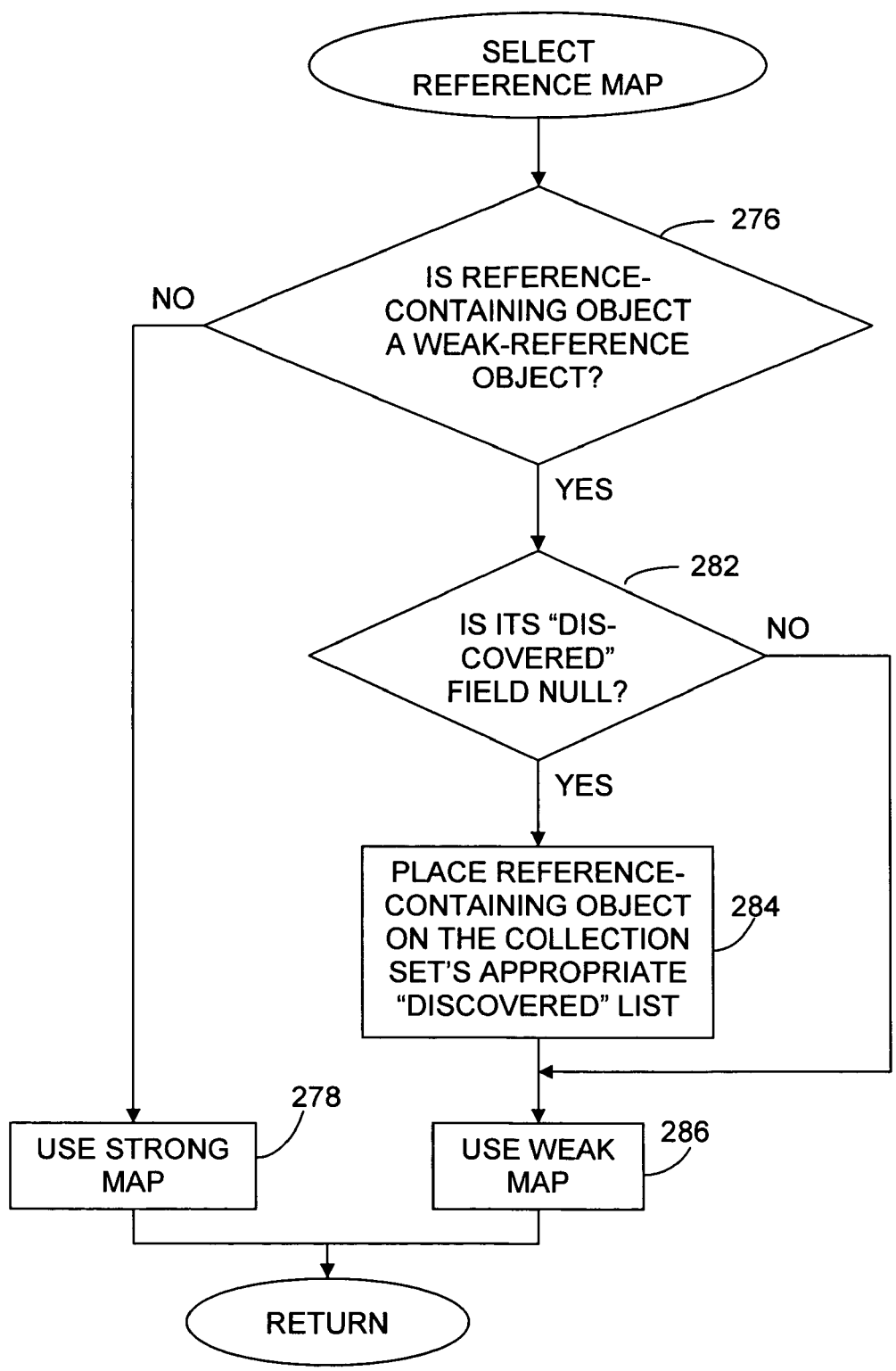
FIG. 25 is a block diagram of another routine for selecting reference maps.
Figure 26A:
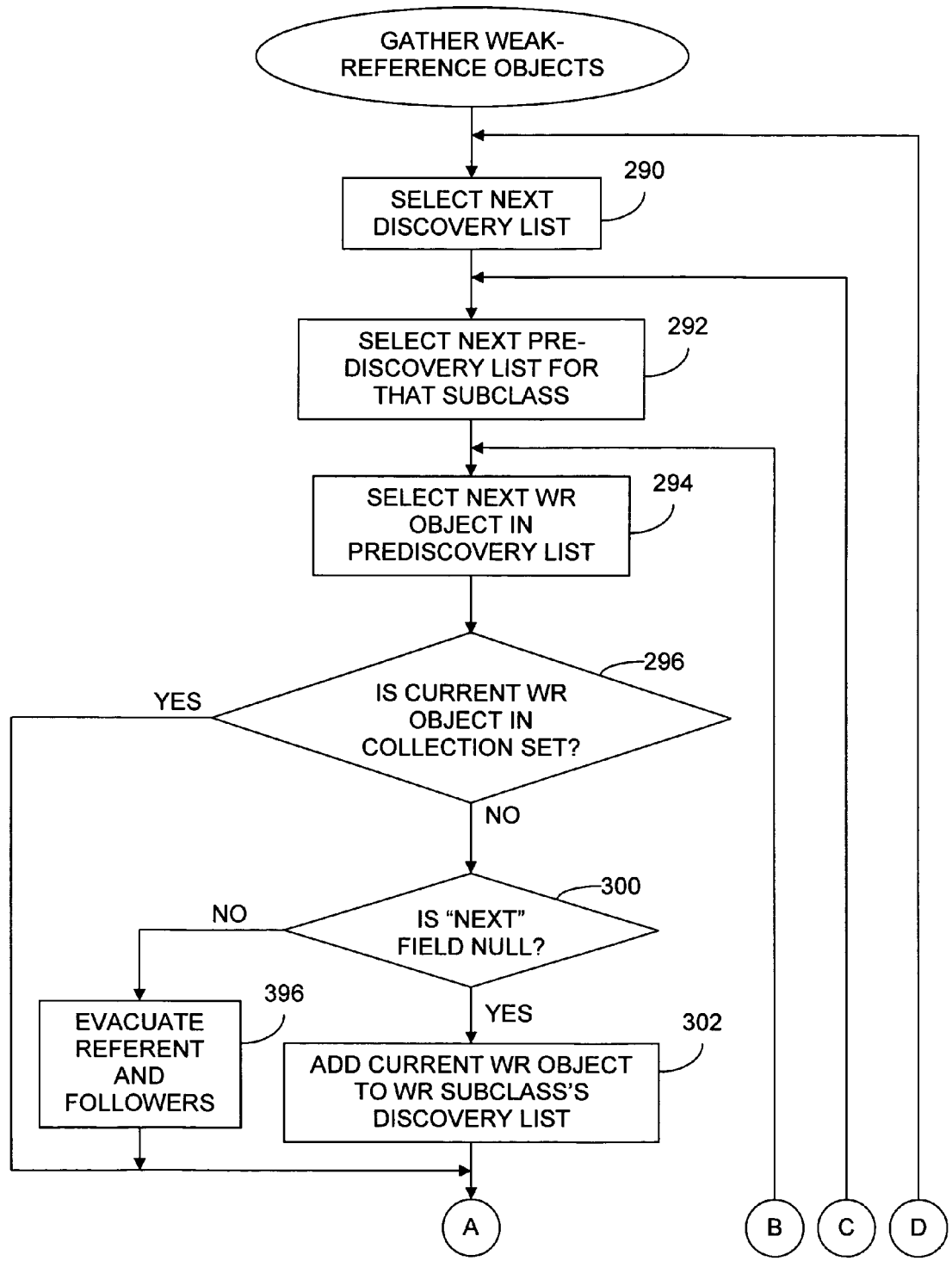
FIGS. 26A and 26B together form a flow chart of another routine for combining lists of weak references.
Figure 26B:
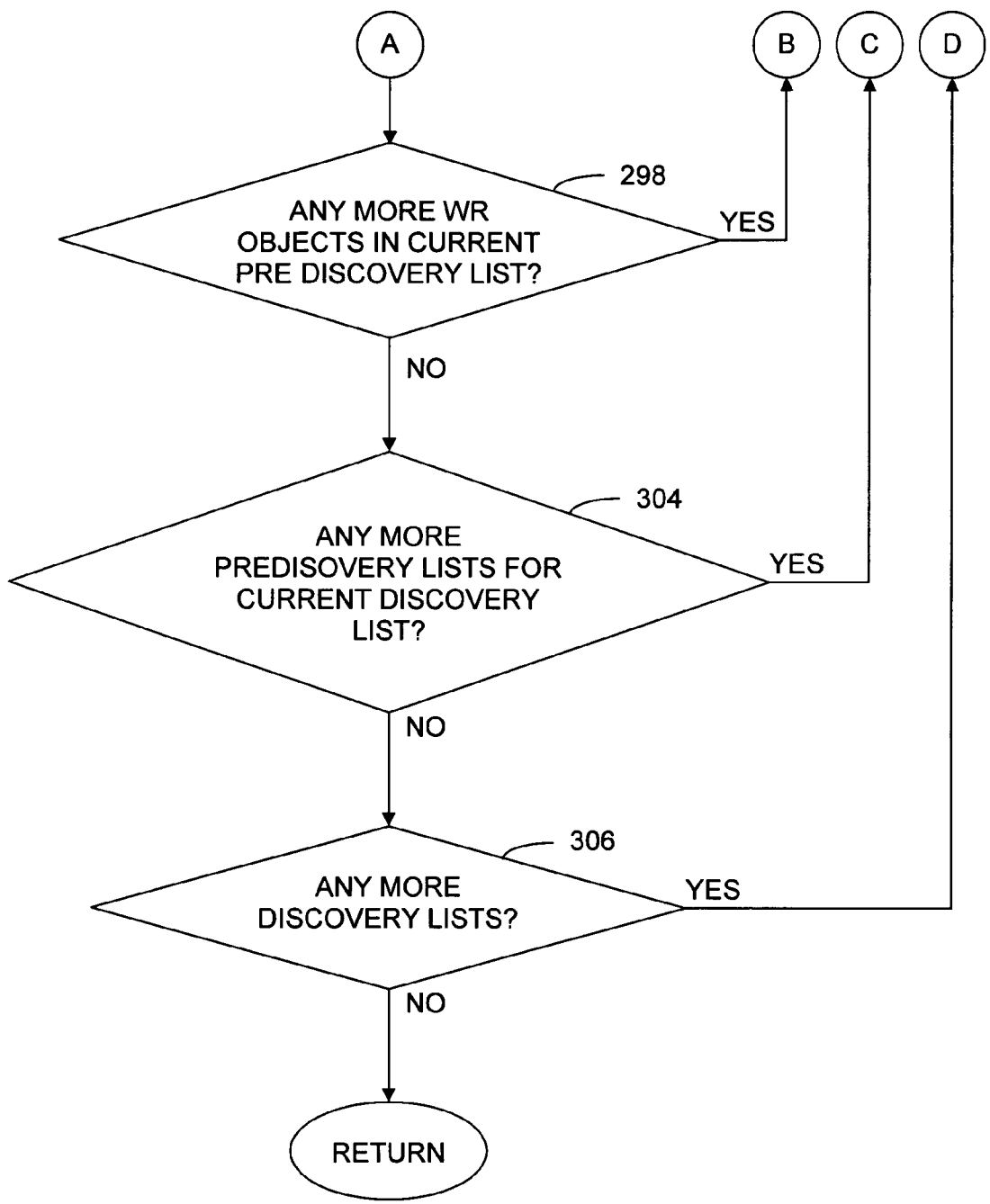

The reference numerals in FIG. 25 are the same as those in FIG. 20 and refer to similar operations. The difference between the two operations is that FIG. 25 does not include FIG. 20's block-280 operation, in which the collector branches on the Next field's value to choose the strong map if the object being scanned for references is an enqueued weak-reference object. Even though the Referent field is to be treated in such a situation as containing a strong reference, that is, the collector does not inspect that field during the first phase of strong-reference processing. Instead, the reference-gathering operation described above by reference to FIG. 21 is revised to result in the routine that FIGS. 26A and 26B (together, "FIG. 26") depict. With the exception of block 396, all the blocks in that drawing represent operations similar to those represented by identically numbered blocks in FIG. 21. If the result of the test represented by FIG. 26's block 300 is negative, though, i.e., if the weak-reference object has already been enqueued, the collector does not simply move on to the next weak-reference object in the list. Instead, it performs the operation represented by block 396: it evacuates the referred-to object and any followers to the dying-object train.

Now, although it is typical for a dying object to become unreachable soon, some exceptions can occur. The particular queue on which the weak-reference object is enqueued may be especially long, for instance, or the thread that processes the weak-reference queue may be suspended for a particularly long time. An object referred to by a weak-reference object thus awaiting processing may repeatedly prevent the dying-object train from being reclaimed as a whole. To reduce such occurrences, the collector may impose a limit on the number of times an object can be placed in a dying-object train in response to the object's status as a dying object.

Embodiments of the invention that implement such a policy will normally employ some way of marking the dying object to indicate how many times it has been evacuated to a dying-object train because it was found to be dying. As will now be explained, the "tying off" technique alluded to above is one way of doing so, and FIG. 27 depicts a way to employ that technique.

Figure 27A:
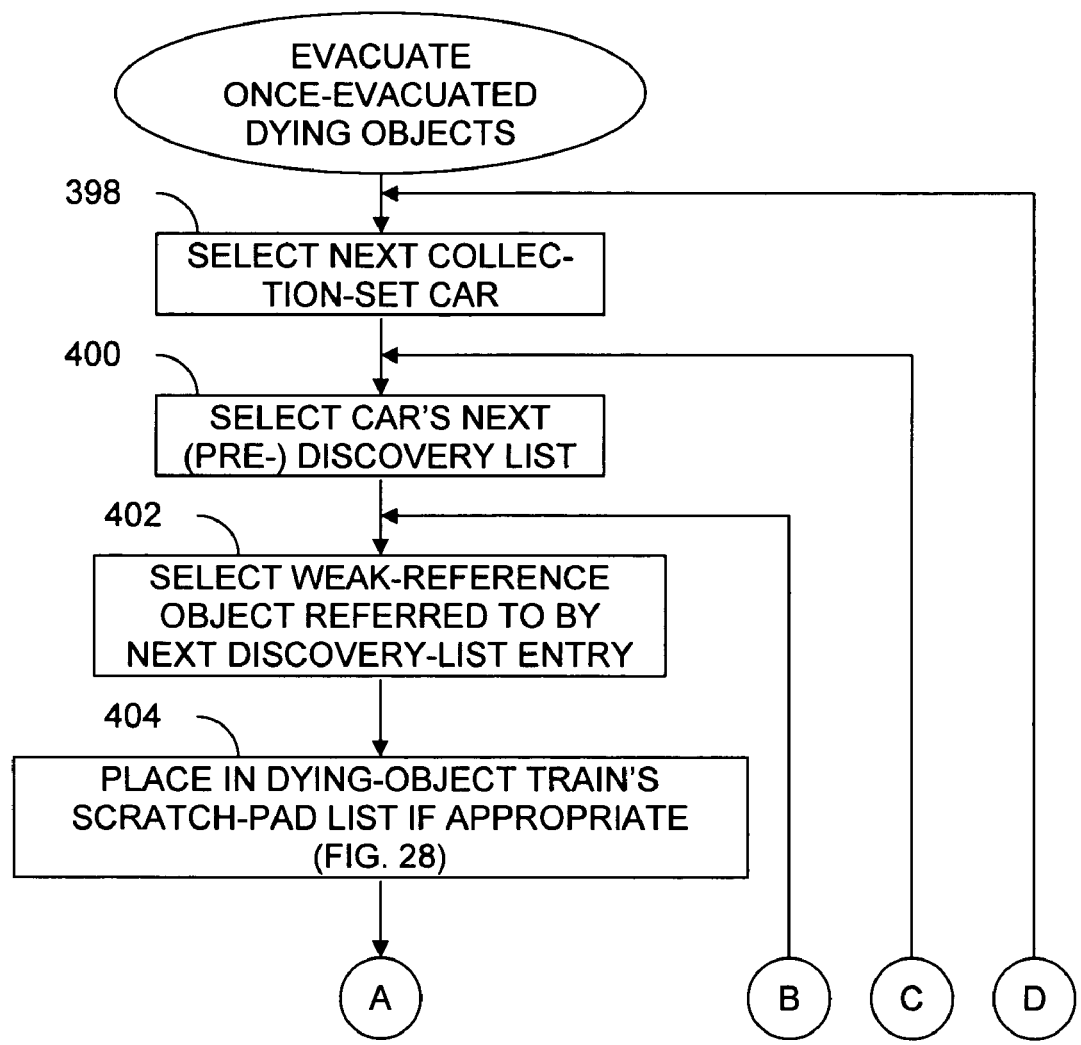
FIGS. 27A and 27B together form a flow chart of a routine used to mark collection-set dying objects that have been evacuated to a dying-object train during a previous collection increment.

The FIG. 27 operation precedes the FIG. 21 weak-reference-gathering operation. Its purpose is to (1) identify each collection-set object whose dying status has previously caused its evacuation to a dying-object train and (2) if the thereby-identified object again requires evacuation, evacuate it again to a dying-object train—but mark it as having twice been thus evacuated so that the collector will not do so again. As blocks 398, 400, and 402 indicate, the FIG. 27 operation starts with the weak-reference object identified by the first entry in the first collection-set car's first (pre-) discovery list. Since the FIG. 27 operation's purpose is to identify objects previously identified as dying and evacuate some of them, its block-404 operation determines whether the weak-reference object's referent is such an object, and, if it finds that doing so is appropriate, places some type of identifier of the referent into a scratch-pad list that lists objects to be evacuated to the dying-object train.

Figure 28:
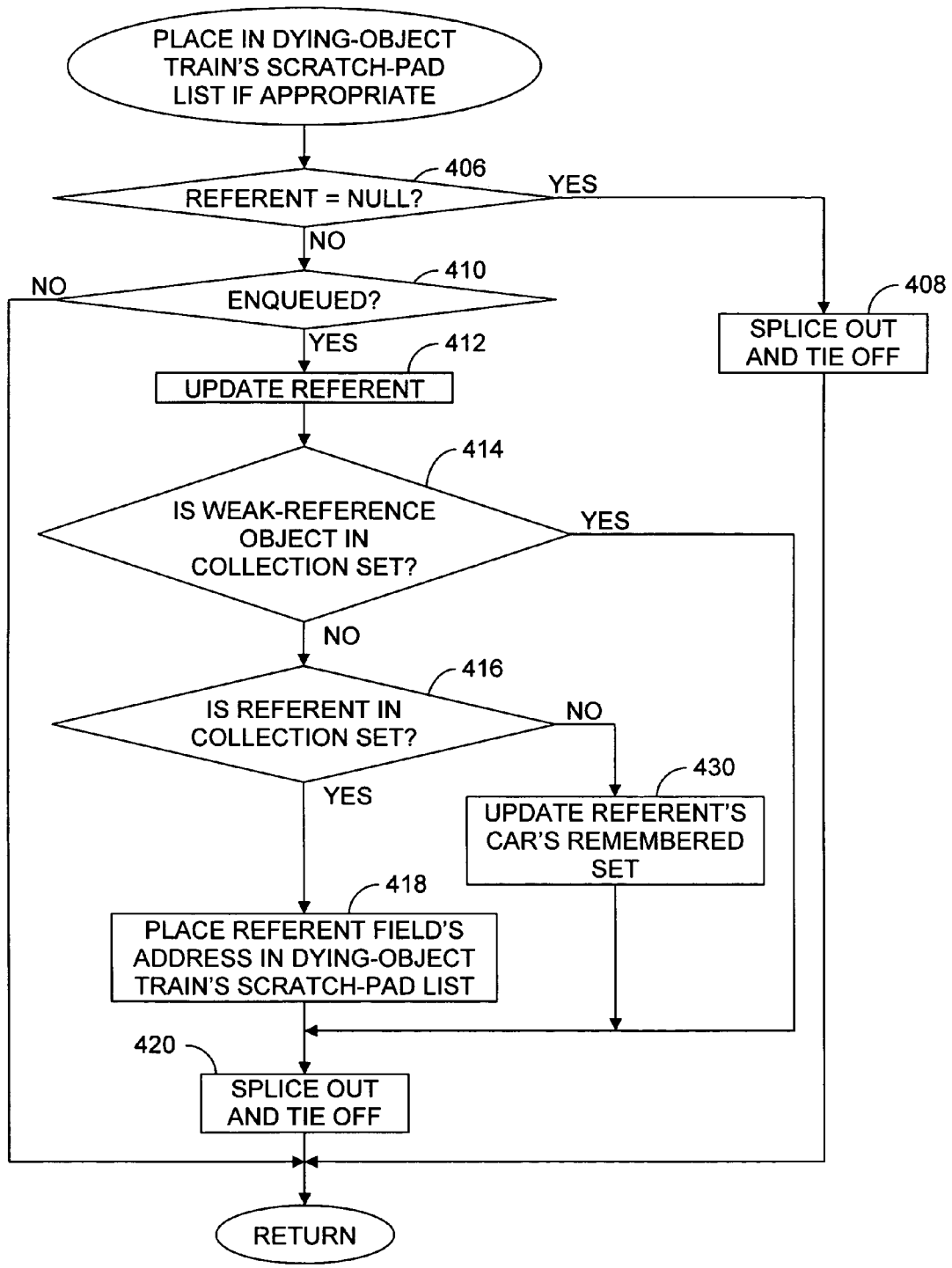
FIG. 28 is a flow chart depicting in more detail that routine's operation of listing dying objects for evacuation.

FIG. 28 sets forth the block 404 operation in more detail. Block 406 represents determining whether the weak-reference object's Referent field is NULL. If it is, there clearly is no dying object whose evacuation that the weak-reference object should trigger, so the collector makes no entry in the dying-object train's scratch-pad list in response. Before the collector proceeds to the next pre-discovery-list weak-reference object, though, the collector splices that weak-reference object out of that list, for reasons shortly to be explained. Block 408 represents doing that and, for reasons also to be explained in due course, "tying off" the weak-reference object's Discovered and Previous fields. This completes the FIG. 28 operation for that weak-reference object.

If the block-406 operation instead finds that the Referent field is not NULL, the collector determines whether the weak-reference object has already been enqueued: it determines whether that object's Next field is NULL. Block 410 represents making that determination. If the weak-reference has not been enqueued, then its referent could not already have been evacuated to a dying-object train as a result of having been found to be dying, so it is not the type of object that the collector is attempting to identify. As the drawing indicates, the FIG. 28 operation therefore ends for that weak-reference object.

If the block-410 operation finds that the weak-reference object has been enqueued, on the other hand, the collector updates the weak-reference object's Referent field, as block 412 indicates. That is, it determines whether the location to which that field refers indicates that the object previously residing there has been evacuated. If so, that operation copies a forwarding pointer from that location into the Referent field.

If, in operations represented by blocks 414 and 416, the collector finds that the enqueued weak-reference object is not located in the collection set but that the object to which its Referent field refers still is, it is the illustrated embodiment's policy to evacuate that referent object to the dying-object train once more but to prevent its status as a dying object from thereafter causing any further such evacuations. To arrange for the evacuation, the collector places the Referent field's address, as block 418 indicates, into a scratch-pad list that the collector maintains to list objects to be evacuated to the dying-object train. To mark the object as having once been evacuated in this manner, it ties off the guarding weak-reference object's Discovered and Previous fields, as block 420 indicates, with a result that will be explained in due course.

Figure 1:
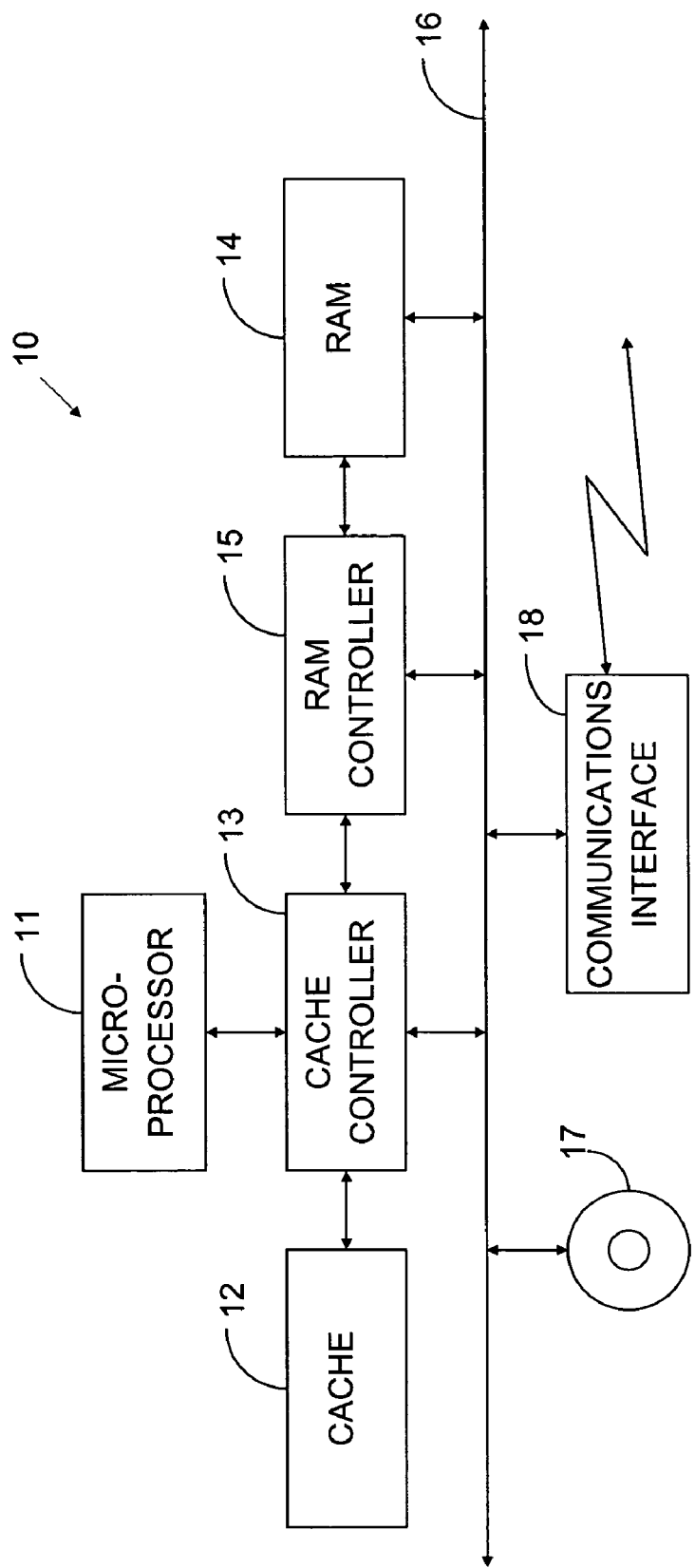
FIG. 1, discussed above, is a block diagram of a computer system in which the present invention's teachings can be practiced.
Figure 2:
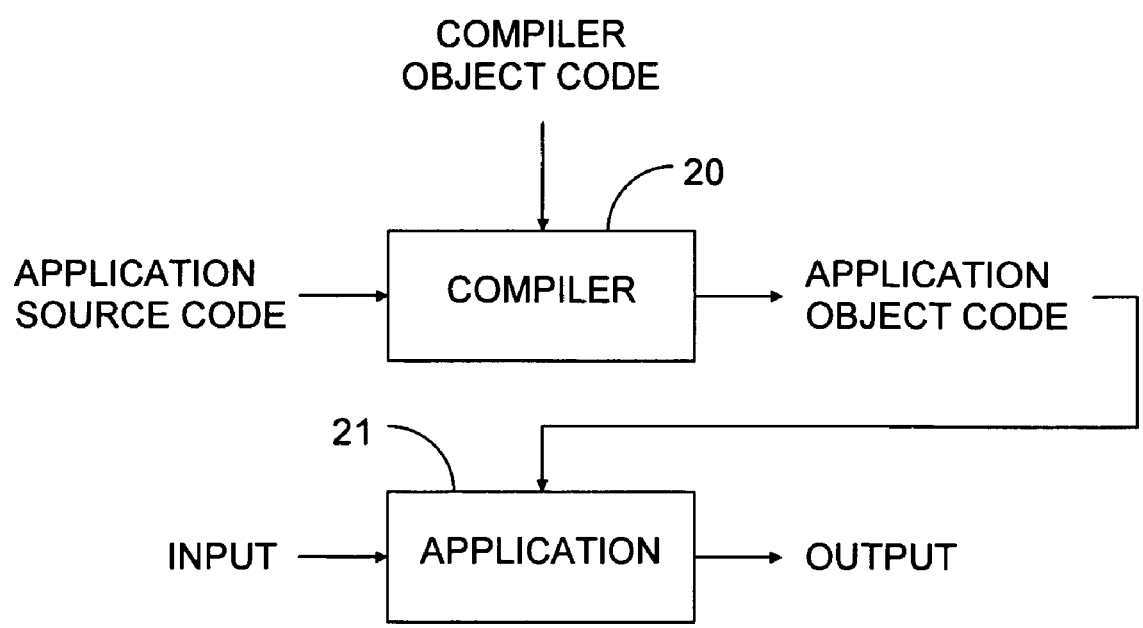
FIG. 2, discussed above, is a block diagram that illustrates a compiler's basic functions.
Figure 3:
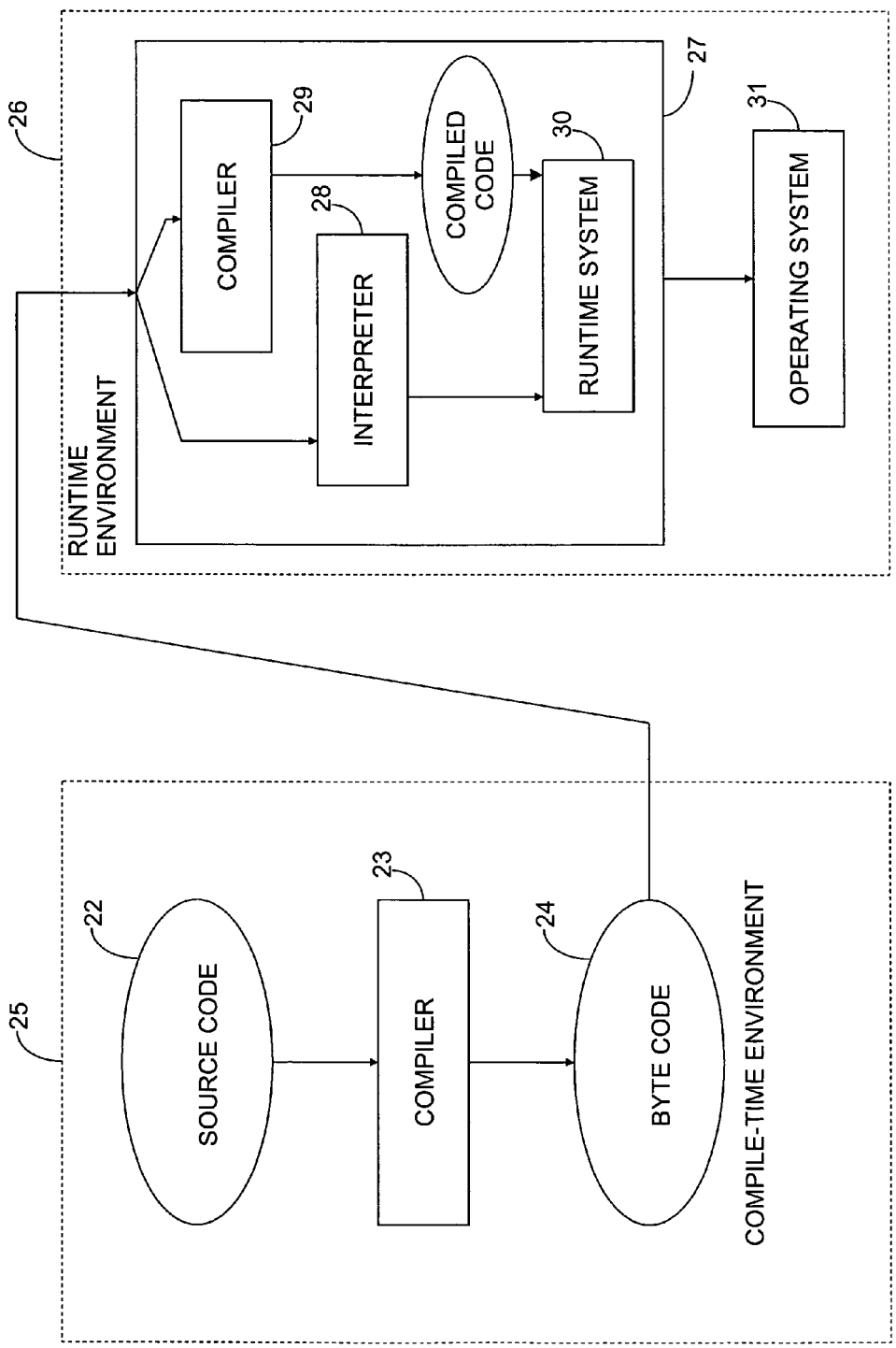
FIG. 3, discussed above, is a block diagram that illustrates a more-complicated compiler/interpreter organization.
Figure 4:
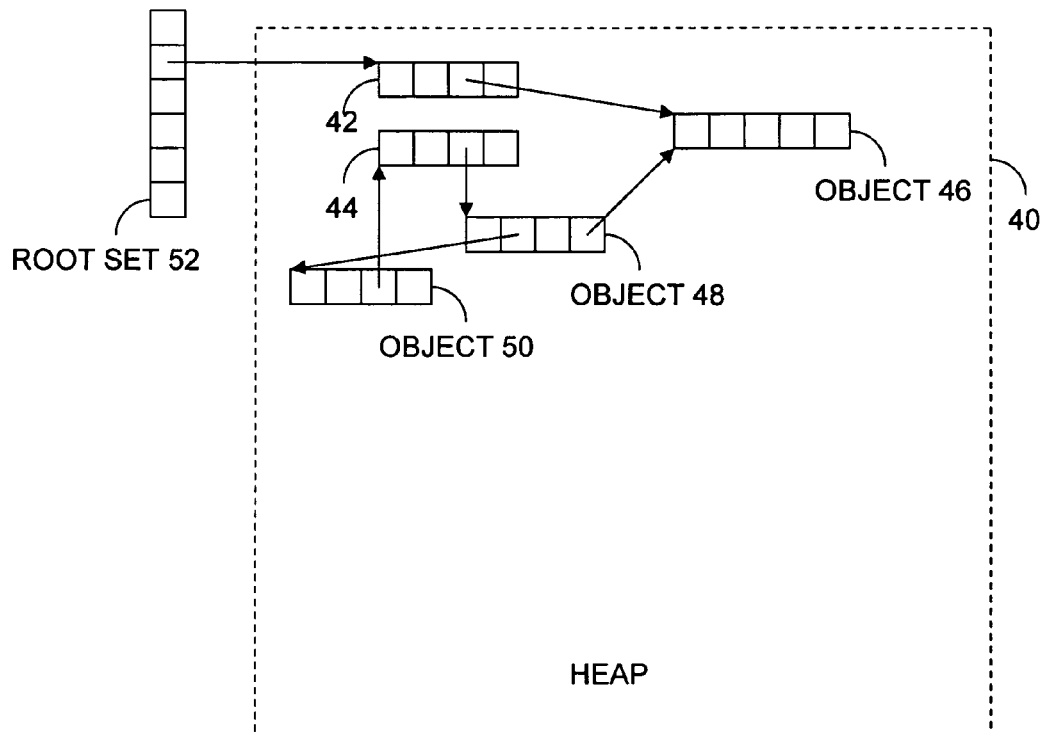
FIG. 4, discussed above, is a diagram that illustrates a basic garbage-collection mechanism.
Figure 5:
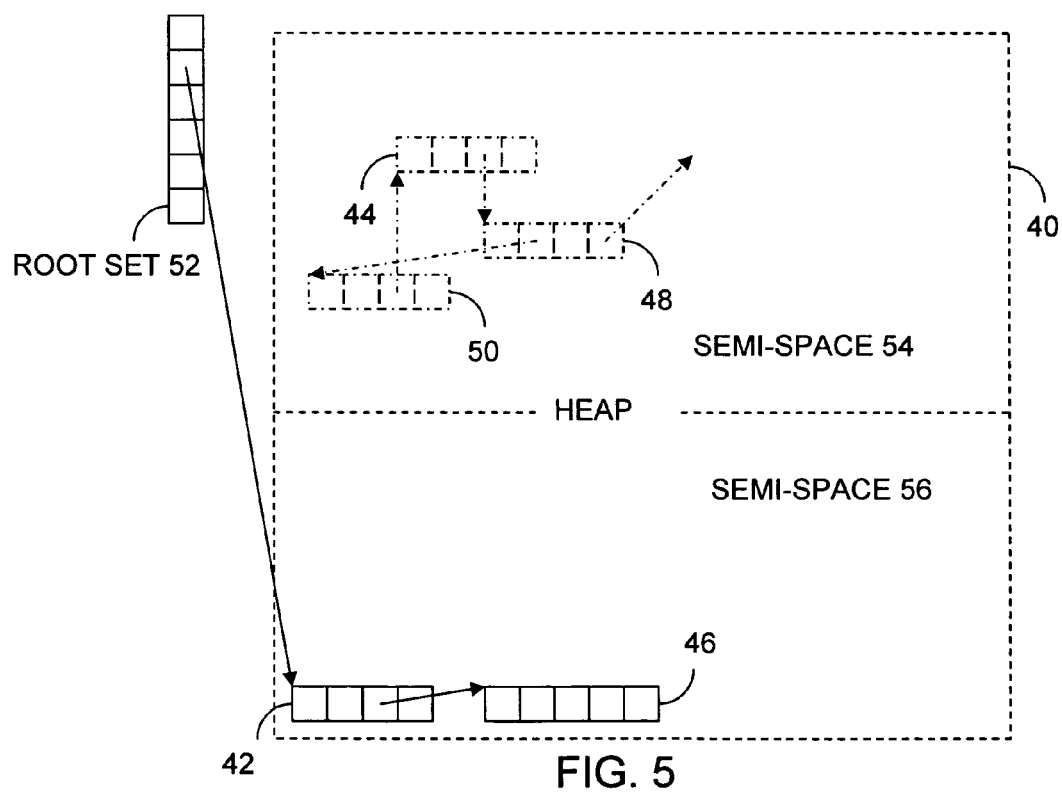
FIG. 5, discussed above, is a similar diagram illustrating that garbage-collection approach's relocation operation.
Figure 6:
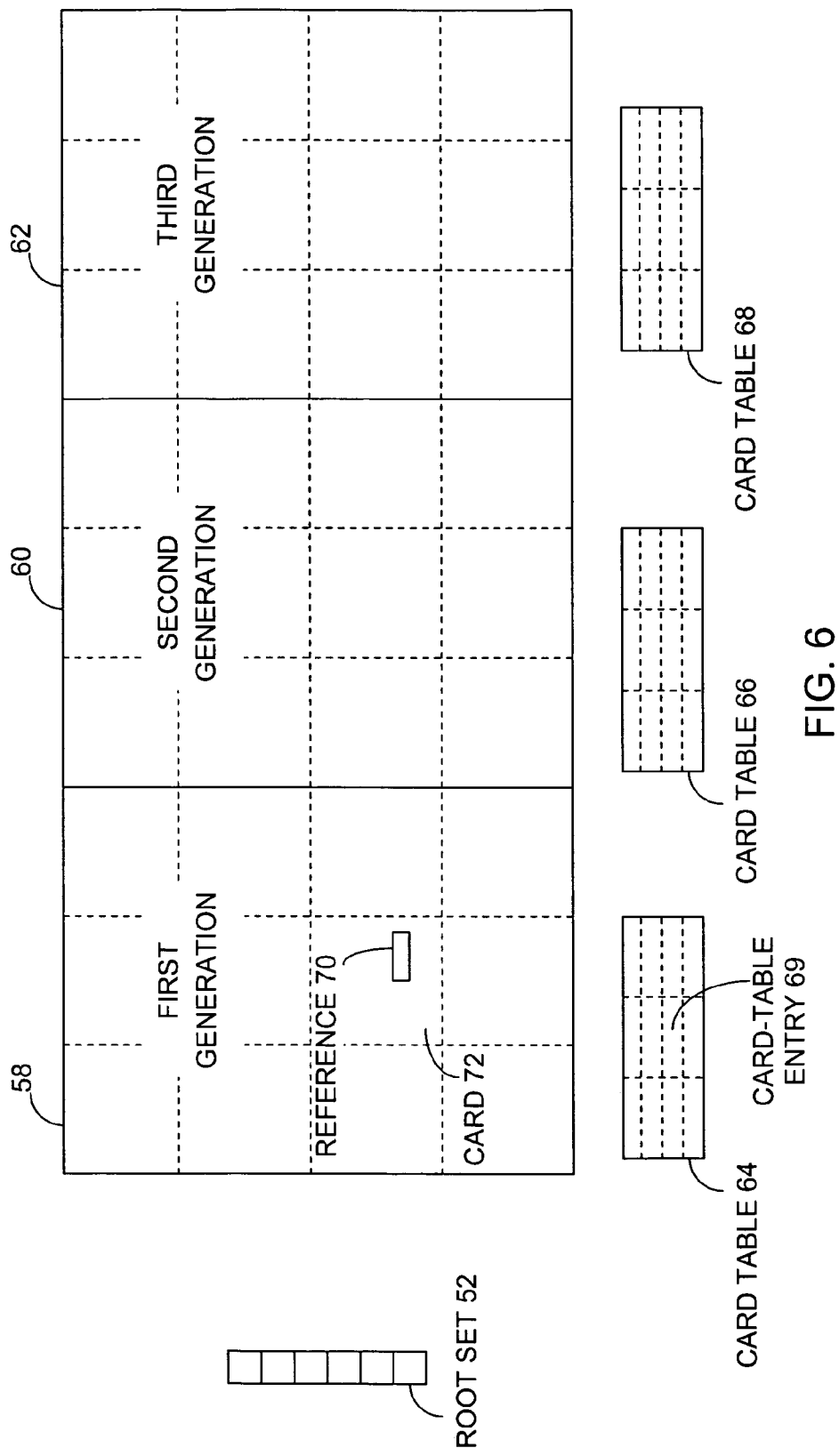
FIG. 6, discussed above, is a diagram that illustrates a garbage-collected heap's organization into generations.
Figure 7:
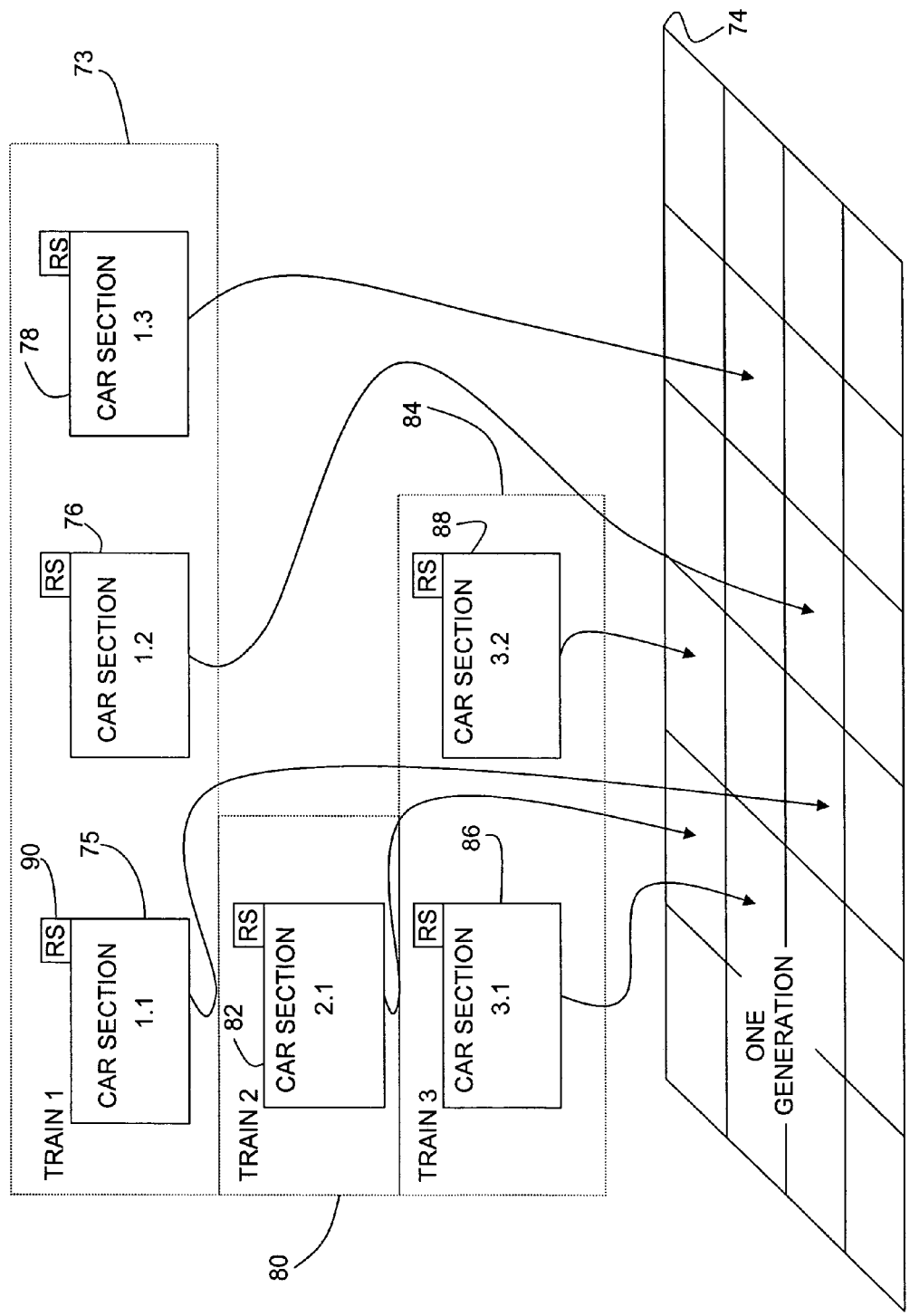
FIG. 7, discussed above, is a diagram that illustrates a generation organization employed for the train algorithm.
Figure 8A:
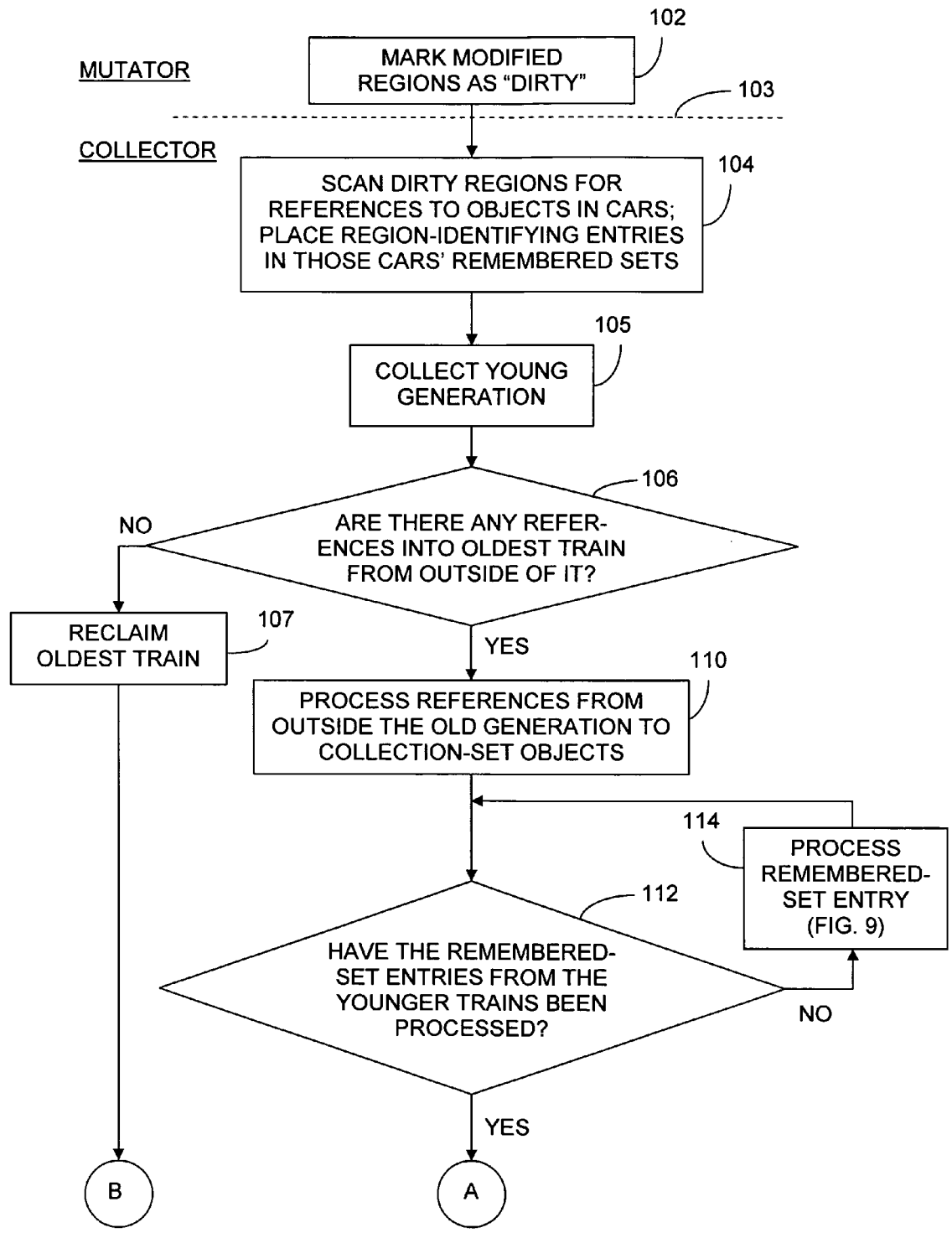
FIGS. 8A and 8B, discussed above, together constitute a flow chart that illustrates a garbage-collection interval that includes old-generation collection.
Figure 8B:
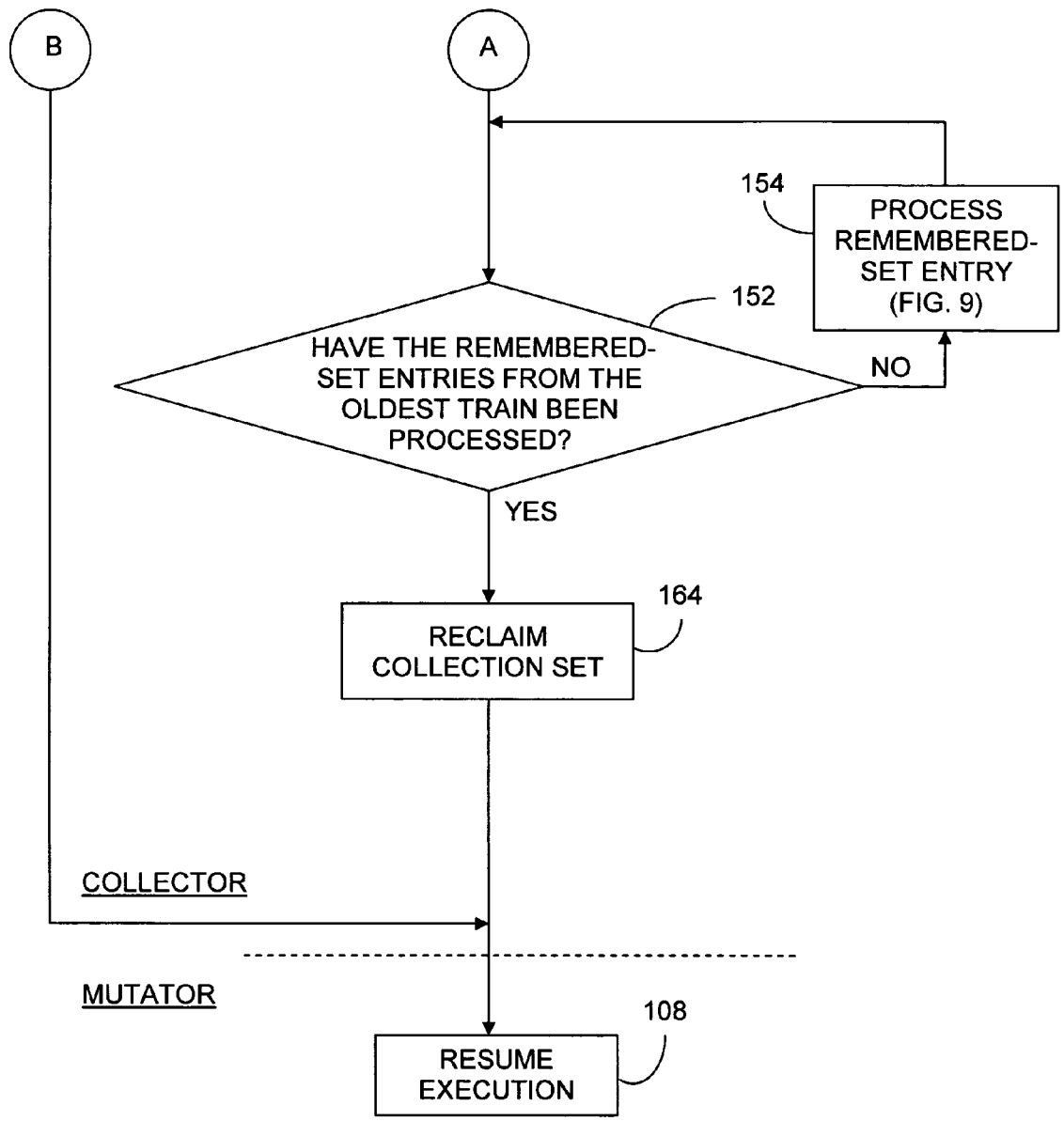

As block 420 also indicates, the collector splices the weak-reference object out of the discovery list. To understand why, recall that the FIG. 27 operation, of which the FIG. 28 operation is a part, occurs before weak-reference-gathering and -processing operations that FIGS. 21 and 2 respectively exemplify. In the illustrated embodiment the FIG. 22 processing operation traverses discovery lists that the FIG. 21 gathering operation has derived from the pre-discovery lists. But the Referent fields of enqueued weak-reference objects are no longer to be considered weak, so, as FIG. 22's blocks 314 and 316 indicate, that processing operation will ignore the Referent fields of any enqueued weak-reference objects gathered during the gathering operation. The enqueued weak-reference objects therefore may as well be removed from the pre-discovery lists beforehand, during the FIG. 28 operation, and that is why the block-420 operation splices them out of the collection set's pre-discovery lists.

Figure 27B:
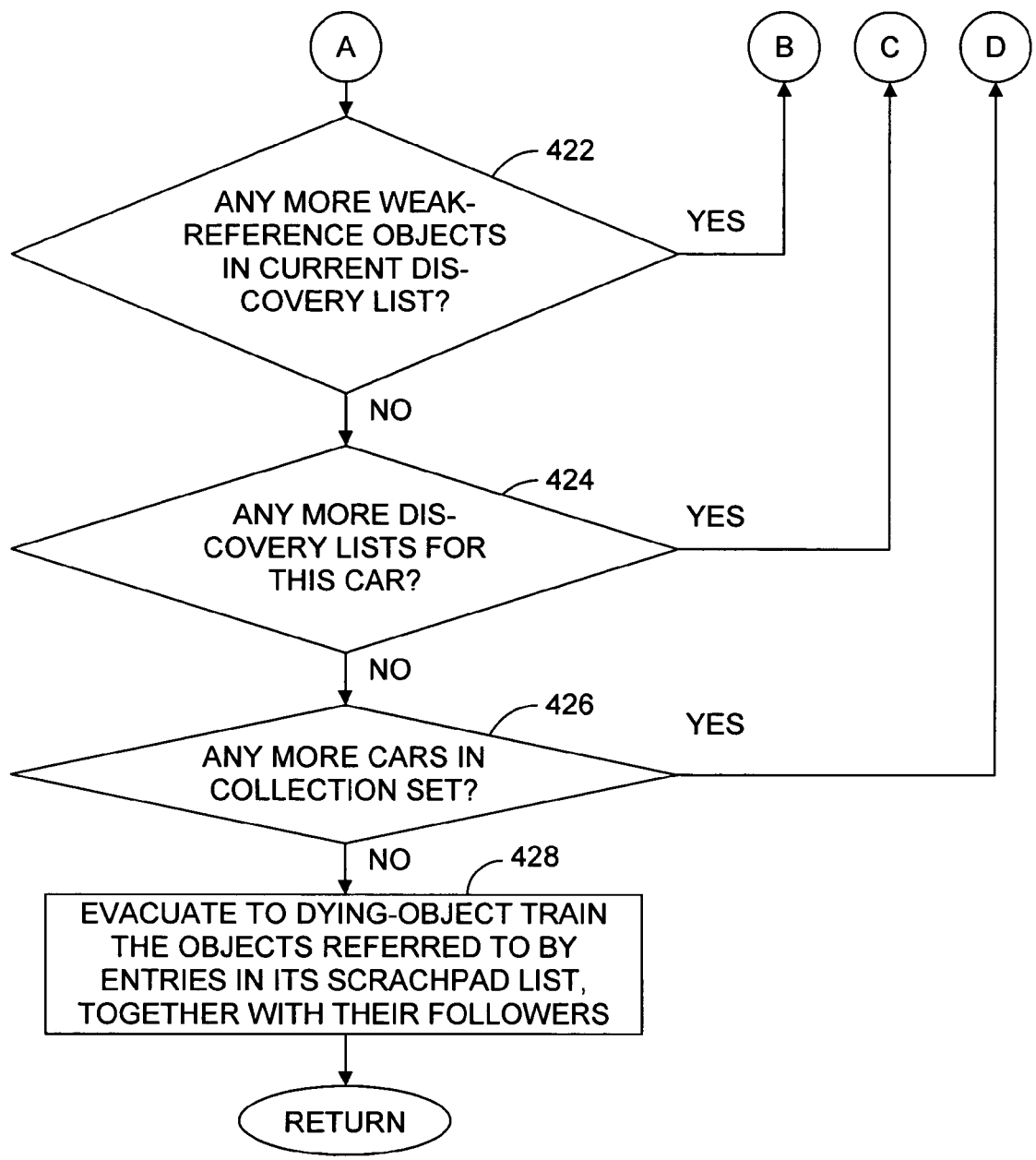

Before we discuss the reason for block 420's tying-off operation, it helps to consider the remainder of FIG. 27. As FIG. 27B's blocks 422, 424, and 426 indicate, the collector repeats the FIG. 28 operation for all weak-reference objects in all pre-discovery lists of all collection-set cars. Then, as block 428 indicates, it evacuates to the dying-object train the collection-set objects identified by that train's scratch-pad list entries, i.e., by the entries placed in that list by the operation that FIG. 28's block 418 represents. Each time the collector evacuates such an object to a car section in the dying-object train, it also adds to that car's remembered set an entry by which it can locate the Referent field of the weak-reference object responsible for that object's evacuation. That is, it places such an identifier in the same list where strong references to that car's objects have been found. This is not inappropriate; that Referent field's contents are now being treated as a strong reference.

But, in the illustrated embodiment in which the collector uses the scheme of FIGS. 27 and 28, the collector does not use those remembered sets to list every weak-object Referent field that it has found to refer to a dying object; in the subsequent, FIG. 22 weak-reference processing's evacuation of a dying object to the dying-object car, the collector instead uses one of that car's pre-discovery lists to record the reference responsible for the evacuation. This is why, when that car thereafter comes up for collection, the FIG. 27 operation can find such weak-reference objects in the pre-discovery lists, i.e., can find weak-reference objects that guard objects whose status as dying had previously caused them to be evacuated to a dying-object train.

Note that FIG. 28's block 418 represents also evacuating followers, i.e., objects referred to by strong references in other objects evacuated in that operation. For this purpose, a reference in a weak-reference object's Referent field is considered strong only if the weak-reference object has been both enqueued and tied off. Otherwise, the collector deals with the Referent field either later in the FIG. 27 operation or in the normal weak-reference processing of FIG. 22.

As described so far, the illustrated scheme for limiting the number of evacuations into dying-object cars can largely be implemented by simply (1) inspecting the guarding object's Next and Referent fields to determine whether the weak-reference object has been enqueued and post-mortem processing for its guarded object has been completed and (2) recording the weak-reference object in the appropriate list (i.e. in the pre-discovery list or remembered set). These mechanisms result in a natural progression for a dying object whose space cannot be reclaimed. In the FIG. 22 operation of one collection increment, the guarded object is identified as dying, it is evacuated to a dying-object car, and the weak-referent object guarding it is enqueued and placed in one of that car's pre-discovery lists. If that object's space cannot be reclaimed the next time it comes up for collection, it is recognized in the FIG. 27 operation as an object that had once before been evacuated as a dying object to a dying-object train, and it is evacuated in that operation to a dying-object-train's car once more. But this time the reference to it is recorded in that car's regular remembered; the weak-reference object that contains it is not placed in one of that car's pre-discovery lists. So, each time that car thereafter comes up for collection with its post-mortem processing uncompleted, the reference guarding it, being found during remembered-set processing in an enqueued weak-reference object, is treated as a strong reference, and the referent dying object is therefore evacuated to the weak-reference object's train as part of normal strong-reference processing. Again, this progression largely results from simply recording the guarding weak-reference objects in the appropriate lists and inspecting those objects' Next and Referent fields.

As will now be explained, though, there are situations for which the illustrated embodiment uses the tying-off operation as an additional mechanism to keep track of whether the dying object has already been evacuated to a dying-object train. Among the things that can happen to a weak-reference object are, as has been discussed, that it can be allocated, set to guard an object, and enqueued. Although the enqueuing has been described above as being performed by the collector, it is a feature of the JAVA™ a programming language that the mutator can itself explicitly enqueue a weak-reference object, i.e., place a reference in its Next field. As a consequence, all three of those actions can occur between the same two successive garbage-collection intervals. If this happens, the FIG. 18 card-table processing operation will, in scanning the weak-reference object's card, encounter a Referent field in an enqueued weak-reference object whose Discovered and Previous fields are not tied off (Indeed; those fields will be NULL.)

Now, one of the steps in the operation that FIG. 18's block 258 represents is, as FIG. 19's block 260 indicates, to determine whether the reference is weak. The illustrated embodiment that uses the mechanism of FIGS. 27 and 28 bases this determination in part on whether the guarding object has been tied off. Specifically, it makes that determination in such a way that the contents of a weak-reference object's Referent field are treated as weak, even if the weak-reference object has been enqueued, so long as the Discovered field does not have the tied-off value. (The illustrated embodiment ties off the Discovered and Previous fields both, but for this purpose it actually checks only the Discovered field.) So, if the weak reference object's Discovered field is not tied off, the FIG. 19 routine takes the right branch from block 260, and it places the weak-reference object in the pre-discovery list of the referent's car. In contrast, a tied-off Discovery field would have resulted in that routine's treating the Referent field's contents as strong, i.e., in the collector's taking the left branch. That is, if the referent's car's normal remembered set does not already contain an identifier of the weak-reference object's location, the collector would place one there.

Having now explained the reason for the tying-off operation of FIG. 28's block 420, we return to that drawing to complete the description of the operation that it describes. Yet to be considered is what happens when the block-414 determination is affirmative, i.e., when the pre-discovery-list weak-reference object currently being considered is itself found to be located in the collection set. In that case, that weak-reference object has not been found so far to be reachable, so the fact that its Referent field refers to a collection-set object is not without more a basis for evacuating the object to which it refers. The collector therefore skips the block-418 operation of scheduling the guarded object for evacuation. But the weak-reference object has been identified as enqueued and referring to an object, and it may still end up being evacuated; an object subsequently to be evacuated may refer to it. If so, the object to which the weak-reference object's Referent field refers will be evacuated, too, so it should be identified a previously evacuated dying object. And, in any event, the weak-reference object should be spliced out of the pre-discovery field to save the gathering and weak-reference-processing operations the effort of dealing with it. So, as the drawing indicates, the collector performs the block-420 operation of splicing out and tying off the weak-reference object before proceeding to the pre-discovery lists' next weak-reference object.

Also remaining to be considered is what happens if the block 416 operation determines that the object to which the weak-reference object refers is no longer located in the collection set. This typically happens because the referred-to object was evacuated, in which case the referred-to object is now a dying object that has been evacuated for the second time. (Actually, a poorly written mutator can result in that referred-to object's having been "resurrected," in which case it would not for most purposes be considered "dying" any more. For the FIG. 28 operation's purposes, though, the illustrated embodiment still treats it as dying.) So, as was explained in connection with the discussion of FIG. 27's block-428 operation, the location of the guarding weak-reference object's Referent field should be listed in the normal remembered set of the car where the guarded object now resides. As block 430 and 420 indicate, the collector therefore does so, and it splices the weak-reference object out of the pre-discovery list and ties it off.

Although the embodiment described above employs only a single dying-object train for any given increment, and any first-time dying object is evacuated to that train, some embodiments may operate differently. As was mentioned above, for example, some embodiments may not use a special, dying-object train at all; some may simply evacuate dying objects to an already-existing train, such as the oldest existing train, the oldest such train that includes no collection-set car, or a train some predetermined number of trains behind that.

Also, some embodiments may treat some types of weak references differently from others. For example, a collector that employs the present invention's teachings may evacuate, say, only objects referred to by FinalReference objects independently of the reference's location but always evacuate objects referred to by PhantomReference objects to those objects' trains. Or it may do just the opposite: it may treat the Referent fields in PhantomReference object as being the references of the independent placement type.

Moreover, even if it performs independent placement for both types of references, a collector that employs the present invention's teachings may make the placement location depend on the reference type; there could be a special dying-object train for objects evacuated in response to weak-reference objects of one class but not for those evacuated in response to weak-reference objects of another class, for instance. Or there could be separate dying-object trains for objects evacuated in response to the different types.

So the present invention can be practiced in a wide range of embodiments that, by making the evacuation of collection-set objects in response to weak references independent of those references' locations, can reduce floating garbage. The present invention therefore constitutes a significant advance in the art.

What is claimed is:

1. A computer system including memory, a mutator and a garbage collector, wherein the garbage collector treats a generation of a heap in the memory as divided into a plurality of car sections grouped into a plurality of trains each ordered in a collection order and configured to collect in collection increments respective collection sets of those car sections in accordance with a train algorithm, wherein the computer system is configured to implement a method wherein, in a collection increment of the collection increments:
    the garbage collector evacuates a first object from a respective collection set in response to the existence of a weak reference associated with the first object,
    wherein an object associated solely with a weak reference is evacuated from the respective collection set, prior to reclamation of the respective collection set, based upon a determination that a predetermined amount of unused space is remaining in the heap, and
    wherein the weak reference is denoted by placement of the weak reference in a second object defined by the mutator as belonging to a predetermined class associated with weak references;
    the garbage collector selects one of the plurality of trains into which the first object is evacuated from the respective collection set in response to determining the existence of a reference to the object located in the generation,
    wherein the one of the plurality of trains is selected independently of the reference's location when the reference corresponds solely to a weak reference; and
    the garbage collector thereafter reclaims the respective collection set as allocatable memory.

2. The computer system of claim 1, wherein when the first object is evacuated from the respective collection set in response to the existence of the weak reference, the first object is placed in one of the plurality of car sections, wherein the one of the plurality of car sections belongs to a dying-object train, which contains only objects thus evacuated and their followers.

3. The computer system of claim 2, wherein the dying-object train's position in the collection order is immediately behind a last train that comprises any objects associated with the respective collection set.

4. The computer system of claim 1, wherein the location to which the first object is evacuated from the respective collection set in response to the existence of the weak reference is independent of the reference's location if the first object has not previously been evacuated in response to the existence of the weak reference prior to the at least one of the collection increments.

5. The computer system of claim 1, wherein one of the plurality of trains to which the first object is evacuated from the respective collection set in response to the weak reference is dependent on the reference's location if the first object has previously been evacuated in response to the existence of the weak reference prior to the at least one of the collection increments more than a predetermined number of times.

6. A storage medium containing instructions readable by a computer system including memory to configure the computer system to implement a mutator and a garbage collector wherein the garbage collector treats a generation of a heap in the memory as divided into a plurality of car sections grouped into a plurality of trains each ordered in a collection order and configured to collect in collection increments respective collection sets of those car sections in accordance with a train algorithm, wherein, a collection increment of the collection increments:
    the garbage collector evacuates a first object from a respective collection set in response to the existence of a weak reference associated with the first object,
    wherein an object associated solely with a weak reference is evacuated from the respective collection set, prior to reclamation of the respective collection set, based upon a determination that a predetermined amount of unused space is remaining in the heap, and
    wherein the weak reference is denoted by placement of the weak reference in a second object defined by the mutator as belonging to a predetermined class associated with weak references;
    the garbage collector selects one of the plurality of trains into which the first object is evacuated from the respective collection set in response to determining the existence of a reference to the object located in the generation,
    wherein the one of the plurality of trains is selected independently of the reference's location when the reference corresponds solely to a weak reference; and
    the garbage collector thereafter reclaims the respective collection set as allocatable.

7. The storage medium of claim 6, wherein when the first object is evacuated from the respective collection set in response to the existence of the weak reference, the first object is placed in one of the plurality of car sections, wherein the one of the plurality of car sections belongs to a dying-object train, which contains only objects thus evacuated and their followers.

8. The storage medium as defined in claim 7, wherein the dying-object train's position in the collection order is immediately behind a last train that comprises any objects associated with the respective collection set.

9. The storage medium as defined in claim 6, wherein the location to which the first object is evacuated from the respective collection set in response to the existence of the weak reference is independent of the reference's location if the first object has not previously been evacuated in response to the existence of the weak reference prior to the at least one of the collection increments.

10. The storage medium as defined in claim 6, wherein the one of the plurality of trains to which the first object is evacuated from the respective collection set in response to the weak reference is dependent on the reference's location if the first object has previously been evacuated in response to the existence of the weak reference prior to the at least one of the collection increments more than a predetermined number of times.

11. A computer system comprising:
a hardware processor;
first means for treating a generation of a heap in a memory, wherein the memory is divided into a plurality of car sections and grouped into a plurality of trains ordered in a collection order; and
second means for collecting in collection increments respective collection sets of those car sections in accordance with a train algorithm by:
evacuating a first object from a respective collection set in response to the existence of a weak reference associated with the first object, wherein an object associated solely with a weak reference is evacuated from the respective collection set, prior to reclamation of the respective collection set, based upon a determination that a predetermined amount of unused space is remaining in the heap, wherein the weak reference is denoted by placement of the weak reference in a second object defined by a mutator as belonging to a predetermined class associated with weak references;
selecting one of the plurality of trains into which the first object is evacuated from the respective collection set in response to determining the existence of a reference to the object located in the generation, wherein the one of the plurality of trains is selected independently of the reference's location when the reference corresponds solely to a weak reference; and
thereafter reclaiming the collection set as allocatable memory,
wherein the mutator performs an application program function using the allocatable memory,
wherein the mutator is separate from the garbage collector in the computer system, and
wherein a portion of the first means and the second means executes on the hardware processor.

* * * * *